US008688575B2

(12) United States Patent
Steiner

(10) Patent No.: US 8,688,575 B2
(45) Date of Patent: Apr. 1, 2014

(54) CUSTOMIZABLE INVESTMENT FUND AND INVESTING EDUCATION

(76) Inventor: Neal Robert Steiner, Los Angeles, CA (US)

( * ) Notice: Subject to any disclaimer, the term of this patent is extended or adjusted under 35 U.S.C. 154(b) by 251 days.

(21) Appl. No.: 12/931,641

(22) Filed: Feb. 7, 2011

(65) Prior Publication Data

US 2011/0258139 A1 Oct. 20, 2011

Related U.S. Application Data

(60) Provisional application No. 61/342,733, filed on Apr. 19, 2010.

(51) Int. Cl.
*G06Q 40/00* (2012.01)
(52) U.S. Cl.
USPC ............................................. 705/40; 705/35
(58) Field of Classification Search
USPC ....................................................... 705/35, 40
See application file for complete search history.

(56) References Cited

U.S. PATENT DOCUMENTS

| | | | |
|---|---|---|---|
| 4,674,044 A | 6/1987 | Kalmus et al. | |
| 5,132,899 A | 7/1992 | Fox | |
| 6,236,972 B1 | 5/2001 | Shkedy | |
| 6,282,520 B1 | 8/2001 | Schirripa | |
| 6,338,047 B1 | 1/2002 | Wallman | |
| 6,484,151 B1 | 11/2002 | O'Shaughnessy | |
| 6,515,681 B1 | 2/2003 | Knight | |
| 6,571,234 B1 | 5/2003 | Knight et al. | |
| 6,601,044 B1 | 7/2003 | Wallman | |
| 6,832,209 B1 | 12/2004 | Karp et al. | |
| 6,996,539 B1 * | 2/2006 | Wallman | 705/36 T |
| 7,110,971 B2 | 9/2006 | Wallman | |
| 7,117,176 B2 | 10/2006 | Wallman | |
| 7,146,335 B2 | 12/2006 | Rose | |
| 7,174,313 B1 | 2/2007 | Martinez | |
| 7,313,540 B1 | 12/2007 | Hueler et al. | |
| 7,340,425 B2 | 3/2008 | Boyle et al. | |
| 7,373,324 B1 | 5/2008 | Engin et al. | |
| 7,447,651 B1 | 11/2008 | Herbst et al. | |
| 7,509,274 B2 * | 3/2009 | Kam et al. | 705/35 |
| 7,546,267 B2 * | 6/2009 | Wallman | 705/37 |
| 7,668,773 B1 * | 2/2010 | Pruitt | 705/36 T |
| 2003/0208432 A1 * | 11/2003 | Wallman | 705/36 |
| 2005/0154662 A1 * | 7/2005 | Langenwalter | 705/35 |
| 2009/0094170 A1 * | 4/2009 | Mohn | 705/36 T |
| 2009/0233718 A1 * | 9/2009 | Shelton | 463/42 |

OTHER PUBLICATIONS

Weaver, Carolyn L. "Creating a new kind of Social Security"; The American Enterprise; Jan./Feb. 1997.*
Cohan, Joy. "T. Rowe Price helps Atlantic Electric employee create individualized investment plans"; Personnel Journal, suppl. Marketplace; Jul 1993.*

* cited by examiner

Primary Examiner — Edward Chang

(57) ABSTRACT

A comprehensive, convenient, cost-effective, and intuitive mechanism for individuals to create, manage, and modify customized portfolios of assets and liabilities based on the individual's investment preferences, weighting schemes, risk tolerance, and timeframe. The mechanism includes a server (64) that has data storage (66) for the individual's data. The individual input (60) is used in asset and liability selections (62). There are investment tools (62) to educate individuals on investing concepts, terms, definitions, and strategies. Individuals, through an on-line discussion group, can discuss their investing questions with knowledgeable investors and access other individuals' investment related issues and comments. Investing can include fractional shares and odd lots. The system associated with the mechanism aggregates and nets the trading orders to reduce transactional costs.

44 Claims, 39 Drawing Sheets

New User Entry Screen

98

Please fill out the following information to set up Your Fund.

| | |
|---:|:---|
| *First Name | [_____] — 220 |
| Middle Name | [_____] |
| *Last Name | [_____] — 222 |
| *Address | [_____] |
| *City | [_____] |
| *State | [_____] |
| *Zip Code | [_____] |
| *Home Telephone Number | [___]-[___]-[_____] |
| Work Telephone Number | [___]-[___]-[_____] |
| *Social Security Number | [___]-[___]-[_____] — 224 |
| Occupation | [_____] |
| 226 — *Age | [___] (Must be 18 or older to join) |
| *E-Mail Address | [_____] — 228 |
| *User ID | [_____] — 230 |

(between 8 to 10 characters and case sensitive)

| | |
|---:|:---|
| *Password | [_____] — 232 |

(between 8 to 10 characters and case sensitive)

| | |
|---:|:---|
| *Please retype Password | [_____] |

\* - Required Field

234 — [ Welcome New User ]

FIG. 5

CREATING THE FUND ← 106

01/19/10
Change Amount to Invest

1) Type the symbol of the stock or mutual fund you want to buy and press Enter.
2) Enter the percentage of the dollar amount you want allocated to that stock or mutual fund. Click "Add to Fund".
3) Continue adding investments until you are finished.
4) When your allocation adds to 100% and you are satisfied with your choices, click "Finished with Fund".

| Symbol | Company/Mutual Fund Name | Allocation % | Money Allocated | Allocated % Total | Total $ Allocated |
|--------|--------------------------|--------------|-----------------|-------------------|-------------------|
|        |                          | 0.00%        | $0.00           | 100.00%           | $2,000.00         |

Back

Cancel Fund — 254

Research Company

Symbol Lookup — 258

Add to Fund

Finished with Fund — 252

Change Percentages — 260

Delete Entry

Amount to Invest
$2,000.00

| # | Symbol | Company/Mutual Fund Name | Allocation % | Money Allocated | Current Price | Number of Shares |
|---|--------|--------------------------|--------------|-----------------|---------------|------------------|
| 1 | JNJ | Johnson & Johnson | 10.00% | $200.00 | $51.23 | 3.9036 |
| 2 | HD | Home Depot | 5.00% | $100.00 | $31.13 | 3.2120 |
| 3 | PFE | Pfizer | 10.00% | $200.00 | $32.78 | 6.1021 |
| 4 | LOW | Lowe's | 10.00% | $200.00 | $38.89 | 5.1430 |
| 5 | BBBY | Bed Bath & Beyond | 15.00% | $300.00 | $31.35 | 9.5703 |
| 6 | CPN | Calpine | 5.00% | $100.00 | $5.16 | 19.3953 |
| 7 | NBR | Nabors Industries | 15.00% | $300.00 | $32.09 | 9.3489 |
| 8 | ABC | AmerisourceBergen | 10.00% | $200.00 | $66.63 | 3.0015 |
| 9 | CAH | Cardinal Health | 10.00% | $200.00 | $58.88 | 3.3969 |
| 10 | YMMF | Your Money Market Fund | 10.00% | $200.00 | $1.00 | 200.0000 |

| UPDATED FUND 110A → | | Home | Purchase Stock | Add Money to Fund | Asset Allocation Graph |
|---|---|---|---|---|---|
| | | Research Company | Sell Stock | Reduce Money in Fund | Logoff |
| Symbol | Company/Mutual Fund Name | Current Price | Number of Shares | Money Allocated | Allocation % |
| ABC | AmerisourceBergen | $66.6333 | 3.0015 | $200.00 | 10.00% |
| BBBY | Bed Bath & Beyond | $31.3469 | 9.5703 | $300.00 | 15.00% |
| CAH | Cardinal Health | $58.8773 | 3.3969 | $200.00 | 10.00% |
| CPN | Calpine | $5.1559 | 19.3953 | $100.00 | 5.00% |
| HD | Home Depot | $31.1330 | 3.2120 | $100.00 | 5.00% |
| JNJ | Johnson & Johnson | $51.2349 | 3.9036 | $200.00 | 10.00% |
| LOW | Lowe's | $38.8877 | 5.1430 | $200.00 | 10.00% |
| NBR | Nabors Industries | $32.0894 | 9.3489 | $300.00 | 15.00% |
| PFE | Pfizer | $32.7754 | 6.1021 | $200.00 | 10.00% |
| YMMF | Your Money Market Fund | $1.0000 | 200.0000 | $200.00 | 10.00% |
| Total | | | | $2,000.00 | 100.00% |

FIG. 8

RESEARCH DETAIL

← 146

Symbol | Name of Company or Fund | Current Price | Previous Close | % Change | 52 Week Range
BBY | Best Buy | $33.8461 | $32.2344 | 5.00% | High: $53.75  Low: $25.25

Research Another Company

| | Annual Dividend | Dividend Yield | Dividend Date | Ex-Dividend Date |
| --- | --- | --- | --- | --- |
| | $0.00 | 0.00% | N/A | N/A |

Back

Business Synopsis
Consumer Electronics Sales to Retail

Logoff

Industry: Consumer Products
Company Type: Growth
Asset Class: Large Cap

| FUNDAMENTAL ANALYSIS | Current Year | Prior Year |
| --- | --- | --- |
| Earnings Per Share | $2.13 | $0.00 |
| Revenue ($Million) | $18,983 | $18,079 |
| Gross Margin % | 2.88% | 3.25% |
| Net Income ($Million) | $417.89 | $409.70 |
| Net Margin % | 2.30% | 2.60% |
| 1 Year Total Return | 64.60% | N/A |
| 3 Year Total Return | 45.30% | N/A |
| Return on Equity | 19.10 | 0.00 |
| Return on Assets | 1.50 | 1.30 |
| Price / Earnings Ratio | 18.37 | 18.37 |
| Standard & Poors Ranking | 9 | 0 |

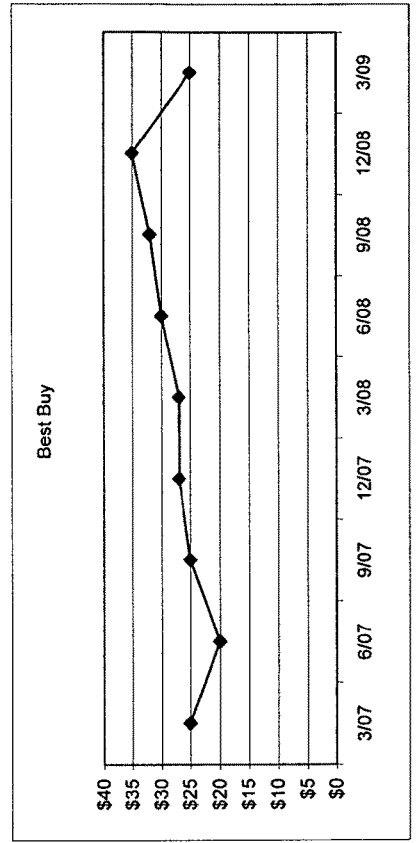

Stock Price Graph

FIG. 12

| | | Home | | Purchase Stock | Add Money to Fund | | Asset Allocation Graph | | | 110B |
|---|---|---|---|---|---|---|---|---|---|---|

FUND STATUS

12/09/09

| | | Research Company | | | Sell Stock | Reduce Money in Fund | | Logoff | | |
|---|---|---|---|---|---|---|---|---|---|---|
| Symbol | Basis Price | Basis # Shares | Basis Total | Basis Percent | Current Price | Current # Shares | Current Total | Current Percent | Gain or (Loss) Amount | Estimated Yield |
| ABC | $66.6333 | 3.0015 | $200.00 | 10.00% | $67.5000 | 3.0015 | $202.60 | 9.94% | $2.60 | 1.30% |
| BBBY | $31.3469 | 9.5703 | $300.00 | 15.00% | $32.5569 | 9.5703 | $311.58 | 15.29% | $11.58 | 3.86% |
| CAH | $58.8773 | 3.3969 | $200.00 | 10.00% | $58.8773 | 3.3969 | $200.00 | 9.82% | $0.00 | 0.00% |
| CPN | $5.1559 | 19.3953 | $100.00 | 5.00% | $6.3750 | 19.3953 | $123.65 | 6.07% | $23.65 | 23.65% |
| HD | $31.1330 | 3.2120 | $100.00 | 5.00% | $28.5690 | 3.2120 | $91.76 | 4.50% | ($8.24) | -8.24% |
| JNJ | $51.2349 | 3.9036 | $200.00 | 10.00% | $52.3595 | 3.9036 | $204.39 | 10.03% | $4.39 | 2.19% |
| LOW | $38.8877 | 5.1430 | $200.00 | 10.00% | $38.6760 | 5.1430 | $198.91 | 9.76% | ($1.09) | -0.55% |
| NBR | $32.0894 | 9.3489 | $300.00 | 15.00% | $32.5000 | 9.3489 | $303.84 | 14.91% | $3.84 | 1.28% |
| PFE | $32.7754 | 6.1021 | $200.00 | 10.00% | $32.8805 | 6.1021 | $200.64 | 9.85% | $0.64 | 0.32% |
| MMF | $1.0000 | 200.0000 | $200.00 | 10.00% | $1.0000 | 200.0000 | $200.00 | 9.82% | $0.00 | 0.00% |
| Total | | | $2,000.00 | 100.00% | | | $2,037.37 | 100.00% | $37.37 | 1.87% |

Company/Fund Name:
- ABC — AmerisourceBergen
- BBBY — Bed Bath & Beyond
- CAH — Cardinal Health
- CPN — Calpine
- HD — Home Depot
- JNJ — Johnson & Johnson
- LOW — Lowe's
- NBR — Nabors Industries
- PFE — Pfizer
- MMF — Money Market Fund

FIG. 17

| YOUR FUND HISTORY | | | | Home | Purchase Stock | | Add Money to Fund | Research Company |
|---|---|---|---|---|---|---|---|---|
| | | | Revise History Timeframe | | Sell Stock | | Reduce Money in Fund | Logoff |

— 150

| Date | Symbol | Company/Fund Name | Price | # Shares | Total | Explanation |
|---|---|---|---|---|---|---|
| 12/06/09 | PFE | Pfizer | $32.7754 | 6.1021 | $200.00 | Buy Pfizer 6.1021 Shares at $32.7754 |
| 12/06/09 | YMMF | Your Money Market Fund | $1.0000 | (200.0000) | ($200.00) | Buy Pfizer 6.1021 Shares at $32.7754 |
| 12/06/09 | NBR | Nabors Industries | $32.0894 | 9.3489 | $300.00 | Buy Nabors Industries 9.3489 Shares at $32.0894 |
| 12/06/09 | YMMF | Your Money Market Fund | $1.0000 | (300.0000) | ($300.00) | Buy Nabors Industries 9.3489 Shares at $32.0894 |
| 12/06/09 | LOW | Lowe's | $38.8877 | 5.1430 | $200.00 | Buy Lowe's 5.1430 Shares at $38.8877 |
| 12/06/09 | YMMF | Your Money Market Fund | $1.0000 | (200.0000) | ($200.00) | Buy Lowe's 5.1430 Shares at $38.8877 |
| 12/06/09 | JNJ | Johnson & Johnson | $51.2349 | 3.9036 | $200.00 | Buy Johnson & Johnson 3.9036 Shares at $51.2349 |
| 12/06/09 | YMMF | Your Money Market Fund | $1.0000 | (200.0000) | ($200.00) | Buy Johnson & Johnson 3.9036 Shares at $51.2349 |
| 12/06/09 | HD | Home Depot | $31.1330 | 3.2120 | $100.00 | Buy Home Depot 3.2120 Shares at $31.1330 |
| 12/06/09 | YMMF | Your Money Market Fund | $1.0000 | (100.0000) | ($100.00) | Buy Home Depot 3.2120 Shares at $31.1330 |
| 12/06/09 | CPN | Calpine | $5.1559 | 19.3953 | $100.00 | Buy Calpine 19.3953 Shares at $5.1559 |
| 12/06/09 | YMMF | Your Money Market Fund | $1.0000 | (100.0000) | ($100.00) | Buy Calpine 19.3953 Shares at $5.1559 |
| 12/06/09 | CAH | Cardinal Health | $58.8773 | 3.3969 | $200.00 | Buy Cardinal Health 3.3969 Shares at $58.8773 |
| 12/06/09 | YMMF | Your Money Market Fund | $1.0000 | (200.0000) | ($200.00) | Buy Cardinal Health 3.3969 Shares at $58.8773 |
| 12/06/09 | BBBY | Bed Bath & Beyond | $31.3469 | 9.5703 | $300.00 | Buy Bed Bath & Beyond 9.5703 Shares at $31.3469 |
| 12/06/09 | YMMF | Your Money Market Fund | $1.0000 | (300.0000) | ($300.00) | Buy Bed Bath & Beyond 9.5703 Shares at $31.3469 |
| 12/06/09 | ABC | AmerisourceBergen | $66.6333 | 3.0015 | $200.00 | Buy AmerisourceBergen 3.0015 Shares at $66.6333 |
| 12/06/09 | YMMF | Your Money Market Fund | $1.0000 | (200.0000) | ($200.00) | Buy AmerisourceBergen 3.0015 Shares at $66.6333 |
| 12/06/09 | YMMF | Your Money Market Fund | $1.0000 | 2,000.0000 | $2,000.00 | Add Money to YMMF |

FIG. 19

SAMPLE RESULTS:
USER SELECTIONS AND INDIVIDUAL FUND TRANSACTION PROCESSING

| RESULT OF USER FUND TRADE TRANSACTIONS | *SECURITY X* | | *SECURITY Y* | | *SECURITY Z* | |
|---|---|---|---|---|---|---|
| | BUY | SELL | BUY | SELL | BUY | SELL |
| USER (i) | | 75 | 300 | | 150 | |
| USER (ii) | 100 | | | 150 | | 200 |
| USER (iii) | 125 | | | 100 | 100 | |
| USER (iv) | | 50 | | 50 | 100 | |
| TOTAL NUMBER OF SHARES FOR BUY AND SELL ORDERS: | 225 | 125 | 300 | 300 | 350 | 200 |
| NUMBER OF TRADES WITH TRADITIONAL BROKERAGE; TOTAL = 12 | 2 | 2 | 1 | 3 | 3 | 1 |

FIG. 29

SAMPLE RESULTS:
AGGREGATING THE INDIVIDUAL FUND'S TRANSACTIONS
PROCESSED THROUGH THE PREFERRED EMBODIMENT'S ALGORITHMS

| RESULT OF USER FUND TRADE TRANSACTIONS | SECURITY X | | SECURITY Y | | SECURITY Z | |
|---|---|---|---|---|---|---|
| | BUY | SELL | BUY | SELL | BUY | SELL |
| TOTALS | 225 | 125 | 300 | 300 | 350 | 200 |
| NET USER TRADES | 100 | | 0 | | 150 | |
| NUMBER OF TRADES WITH THE PRESENT INVENTION (NO NETTING) NON-NETTED = 6 | 1 | 1 | 1 | 1 | 1 | 1 |
| NUMBER OF TRADES WITH NETTING; NETTED =2 | 1 | 0 | 0 | 0 | 1 | 0 |

FIG. 30

ALLOCATING EXPENSES

01/19/10

| Expense Account Menu | Allocation % | Money Allocated | Allocated % Total | Total $ Allocated |
|---|---|---|---|---|
| | 0.00% | $0.00 | 100.00% | $2,000.00 |

Add Expense

Finished with Allocations

Change Percentages

Delete Entry

Expense Account Definition

Amount of Budget: $2,000.00

| | Expense Account | Allocation % | Budget Allocated |
|---|---|---|---|
| 1 | Office Supplies | 10.00% | $200.00 |
| 2 | Marketing | 5.00% | $100.00 |
| 3 | Rent | 10.00% | $200.00 |
| 4 | Utilities | 10.00% | $200.00 |
| 5 | Software Costs | 15.00% | $300.00 |
| 6 | Repairs and Maintenance | 5.00% | $100.00 |
| 7 | Insurance | 15.00% | $300.00 |
| 8 | Outside Services | 10.00% | $200.00 |
| 9 | Miscellaneous | 10.00% | $200.00 |
| 10 | Unallocated Money | 10.00% | $200.00 |

FIG. 37

CUSTOMIZABLE INVESTMENT FUND AND INVESTING EDUCATION

CROSS REFERENCE TO RELATED APPLICATIONS

This application claims the benefit of PPA Ser. No. 61/342,733, filed 2010 Apr. 19 by the present inventor, which is incorporated by reference.

FEDERALLY SPONSORED RESEARCH

Not Applicable

SEQUENCE LISTING OR PROGRAM

Not Applicable

BACKGROUND OF THE INVENTION

1. Field

This application relates to a method and system for individuals to become educated in investing and to create and maintain a customizable investment fund of securities or other assets and liabilities. More specifically, this application relates to improved methods and systems to inexpensively create and manage customizable investment funds and to learn about investment concepts and strategies.

2. Prior Art

A small investor is defined as an entity investing a small amount, whether the investor is an institution or an individual. This applies whether the investor is acting on his/her own behalf or on behalf of another.

As used herein, assets, rights, or liabilities refers to any tradable commodity or item of value in which there exists a market for trading. The definition of tradable commodity or item of value includes, but is not limited to, the following: securities, equities, derivatives, currencies, fungible commodities, insurance contracts, mortgages, or bonds. Although the computer-based system of the present embodiment can be used with any tradable asset or liability, the discussion will focus on its use with securities.

Diversifying one's investments to significantly reduce risk without reducing return on investment is a centerpiece of modern investment theory. The primary purpose of diversification is to manage risk. For example, young investors looking for high returns at high risk would allocate a larger portion of their portfolio to higher risk investments such as growth and international stocks. Older and/or more cautious investors would favor lower risk investments such as bonds and blue-chip stocks. Even with the initial diversified investment portfolio, market fluctuations can change the securities' values over time, causing the investor to be invested in a risk category that he/she may not be comfortable with.

Ideally, a rational investor would choose to invest in securities that yield the highest expected return consistent with the investor's risk tolerance. For example, an investor who is risk averse would choose securities that are lower risk than an investor who is less risk averse. Consequently, the investor who is risk averse would attain a lower expected return than would be attained by the less risk-averse investor.

Until now, small investors generally have two choices in securities investing. First, they can directly acquire shares (i.e. 100 shares of Johnson & Johnson), derivatives on shares (i.e. an option on Johnson & Johnson stock), or a derivative comprised of multiple securities such as an option on the Dow Jones Industrials. In the example of directly purchasing shares, the investor is the owner of that particular security. When the investor owns a derivative security, the investor has no ownership of the underlying securities.

Second, the investor can purchase an interest in an intermediary such as a trust, corporation, or other investment vehicle that derives its value from multiple securities. An example of this is a trust that contains a portfolio such as the stocks comprising the Standard & Poor's (S & P) 500. The intermediary products category includes open-end mutual funds, closed-end mutual funds, unit trusts, and other vehicles. The focus of the intermediary products category will be on mutual funds.

Investors purchase mutual fund shares through a brokerage, dealer, bank representative, insurance agent, or directly from the fund. Brokerages sell securities shares, bonds, options, and other asset and liability products directly to individuals.

If an individual wants to create a customized, diversified portfolio of securities at a brokerage, the individual would have to purchase each security separately and pay a separate transaction cost for creating the diversified portfolio.

Each of these two traditional investment strategies, investing in mutual funds or trading individual securities or derivatives through a brokerage, has disadvantages that are described below.

A. Major Disadvantages Inherent in the Mutual Fund Product:

1. Inability to Select Securities or Monitor Selection of Securities.

An investor in a mutual fund is precluded from selecting the individual securities that make up the mutual fund. An investor can attempt to select the general type of securities to be included in the investor's overall asset allocation by investing in a targeted mutual fund. For example, the targeted mutual fund states it will invest exclusively in companies whose business is primarily biotechnology. That strategy, however, still provides the manager of the selected mutual fund with wide discretion to select from hundreds of securities.

In addition, except for some targeted mutual funds, it is not possible for the investor to express any preferences regarding matters such as social or moral issues (i.e. not wanting to invest in companies that operate in certain sectors, such as defense). When the investor invests in a mutual fund, he/she may be investing in securities that he/she would not prefer. Even in those instances where a targeted mutual fund exists for those types of preferences, the investor will not be able to select specific stocks for the targeted mutual fund.

It is also not possible for the investor to control the weighting or amounts of securities in the mutual fund. An investor could select a mutual fund that reflects an index, but the fund determines the weighting of the individual securities within the index fund.

Also an investor who invests in multiple mutual funds or who owns securities and a mutual fund could be overweighted or under-weighted in particular industries or securities without his/her knowledge, and without any mechanism to correct the allocation.

Thus the centralized, one-size-fits-all investment decision making of mutual funds is not a good fit with the unique investment needs of individual investors. The investment needs of investors are a function of many variables including current age, planned retirement age, tax factors, number and ages of children, desired retirement income, expected education cost per child, current and expected future income, current wealth, risk tolerance, and investment expertise.

2. Inability to Control Tax Effects.

A problem with centralized management of mutual funds is that the timing and amount for the realization of gains is out of the control of the investors of the fund. As a result, investments in funds that are held in taxable accounts can be tax-inefficient for investors. An investor in a mutual fund receives ordinary income distributions at the discretion (subject to certain legal constraints) of the mutual fund manager.

Funds that actively purchase and sell securities generate more transactions than funds that do not, and the taxable distributions depend on the mutual fund's activities, not the investor's. When a mutual fund realizes gains, all investors in the fund are taxed on their portion of the gain.

In most mutual funds, such as open-end mutual funds, net tax gains flow through to the investor. The investor is saddled with whatever flow-through tax gain the manager's activities have generated and such gains are taxed at ordinary income rates. The investor has no control over these and could pay tax on gains earned by the mutual fund even when the investor has not engaged in any transaction in the mutual fund during the year. Only taxable gains can be distributed by a mutual fund, not the taxable loses. Consequently, an investor only receives a tax liability from the mutual fund and not a tax benefit.

An investor can invest in a mutual fund that attempts to limit the fund's uncontrollable tax effects. For example, an index fund or a fund that invests in the largest 500 corporations would have little turnover of securities because the fund manager would not need to actively buy or sell securities in order to adjust the portfolio's holdings.

Even in these mutual funds, however, there are securities sales by the mutual fund to reflect redemptions by investors. As redemptions occur, the manager sells some of the securities to obtain cash to pay the fund holders who are redeeming their interests in the fund. Consequently, if there was a net gain on those transactions, investors in that mutual fund will receive a taxable gain, even if they did not make any trades.

3. Inability to Manage Tax Effects.

Invariably, some securities in a mutual fund will have depreciated while the fund overall has appreciated (or vice-versa). It is not possible for the investor in an appreciated fund to obtain a capital loss by selling depreciated securities. The mutual fund itself cannot pass through losses to the investors. Conversely, it is not possible for an investor to obtain a capital gain by selling the appreciated assets in a fund that has depreciated overall. The transactions in particular securities are made at the discretion of the fund manager and affect all investors in the mutual fund.

The investor can only sell part or all of his/her interest in the mutual fund which will either result in a gain or a loss depending on whether the fund has appreciated or depreciated as a whole relative to the investor's tax basis in the fund. The investor cannot sell specific securities in the fund, and therefore does not have the ability to manage the various tax effects that originate from the underlying securities in the fund.

Any capital losses realized by the mutual fund cannot be passed through to investors. The capital losses must be carried forward within the fund and applied against future capital gains realized by the fund. As a result of this and the centralized control of investment decision making, investors in funds are largely denied the opportunity to realize losses in order to offset them against gains elsewhere.

4. Inability to Exercise Shareholder Rights or Rights Regarding Reinvestment, Distributions, Etc.

Securities held in a mutual fund are owned by the mutual fund, not the investor who only holds an interest in the mutual fund. Consequently, the investor in a mutual fund has no right to vote the underlying securities, tender or not tender the securities in a takeover contest, receive a reinvestment of dividends, receive a dividend as stock instead of cash, exercise any preemptive rights, or otherwise exercise any other shareholder right that may exist with regard to the securities held in the mutual fund.

5. Inability to Modify or Control Costs.

Mutual fund fees and expenses are divided into two groups: transaction expenses and annual operating expenses. Shareholder transaction expenses are fees charged directly to the investor's account for a specific transaction. A front-end sales charge or "load" may be attached to the purchase of mutual fund shares. This fee compensates a financial professional for his/her services. Under present law, this charge may not exceed 8.5% of the investment, although most mutual funds charge less than the maximum.

A contingent deferred sales charge, imposed at the time of redemption, is an alternative way to compensate financial professionals for their services. This fee typically applies to the first few years of ownership and then stops. A redemption fee is a type of back-end charge for redeeming shares. It is expressed as a dollar amount or as a percentage of the redemption price. An exchange fee is a fee that may be charged when transferring money from one fund to another within the same fund family. An account maintenance fee is charged to low-balance accounts.

Annual operating expenses reflect the normal costs of operating the fund. Unlike transaction fees, these expenses are not charged directly to an investor account, but are deducted from the fund's assets before earnings are distributed to shareholders. There are normally two kinds of operating expenses:

(1) Management fees that are ongoing fees charged by the fund's investment advisor for managing the fund and selecting its portfolio of securities.

(2) 12b-1 fees which are deducted from the funds assets to pay marketing and advertising expenses or to compensate sales professionals. Under present law, 12b-1 fees cannot exceed 1% of the fund's average net assets per year.

An investor may be able to regulate the directly incurred charges either by buying or selling less frequently, or by buying directly from a fund as opposed to a broker or other intermediary that charges a fee or load. The investor, however, cannot control the charges levied against the fund. Those charges, which frequently are based on a percentage of assets under management, are paid by the fund and serve to reduce the returns or increase the losses of the fund.

6. Inability to Make Intra-Day Modifications.

An investor in a mutual fund can make only one investment decision; to buy or sell shares in the mutual fund. Because of the structure of open-end mutual funds, that decision is effective only once per day. For example, an investor who believes the market may go down during the morning but then thinks it will go up in the afternoon has no mechanism, through an open-end mutual fund, to buy based on intra-day prices. All open-end mutual funds are priced as of the close of business.

All investors, regardless of when their order was placed during the day, receive a price as of the close of business. This lack of execution flexibility is an important consideration for some investors and one that causes them to purchase securities directly as opposed to utilizing mutual funds for their investing.

Certain funds, such as closed-end mutual funds or some trusts, do trade during the day and therefore can reflect intra-day price movements. Each of these vehicles, however, has negative characteristics that have made them unpopular with investors, including discounts to fair market value of the underlying securities, less transparency than open-end mutual funds, or relatively unchangeable, static portfolios. They are not generally viewed as substitutes for open-end mutual funds.

7. Inability to Monitor and Control Risk Levels and "Styles" of Investing.

An investor in a mutual fund can receive historical information as to risk and returns for the mutual fund. Mutual funds that are actively managed, as opposed to passively managed indexed funds, are managed by individuals or by teams of individuals making buy and sell decisions. When some of those individuals depart the fund, the "style" of investing of the fund may change.

Even if those individual managers never depart the fund, the market may present them with fewer or greater opportunities to buy or sell securities under a particular "style" than they had before. Some investors attempt to select funds based on the fund's supposed risk, sector of interest, or other factors (including previous returns or returns relative to an index). It is not possible to control those factors in these funds in advance unless the mutual fund commits to a mechanical style of investing with extremely limited discretion. This mechanical style is very rare for an actively managed fund.

8. Inability to Switch Funds or Fund Families without Negative Financial Consequences.

Because funds are organized and managed by particular investment company advisers, they are proprietary to a particular fund complex. For example, an investor is invested in a Fidelity S & P 500 fund, but wishes to switch to a Vanguard S & P 500 fund because the investor switched jobs; his/her new employer only offers Vanguard instead of Fidelity. Because of this, the investor would have to sell all his/her interest in the Fidelity fund and buy an interest in the Vanguard fund. Unless the interests were held in tax advantaged accounts like a 401(k) account, those transactions would be taxable. Even switching from one Fidelity fund to another Fidelity fund is taxable unless the interests were held in tax advantaged accounts.

9. Active Fund Management does not Necessarily Translate into Solid Gains.

History shows that active management does not work because the majority of actively-managed mutual funds do not beat the S & P 500. As a result, passive-index fund managers have seen their assets rise from $10 billion in 1980 to over $250 billion in 1990. Many investors are dissatisfied with mutual funds due to high management fees, tax planning issues, and mediocre returns. Advisory and transaction services are bundled in the mutual fund. This attribute of mutual funds diminishes the control that investors have over the management of a personal portfolio and requires them to follow the advisor's recommendations.

Investment decisions for each fund are still centralized in either a management company that runs the fund or in the fund itself. As a result, all investors in a fund share in the same investments and the same investment decision making. Accordingly, investors in a fund cannot expect investment decision making to be tailored to their individual needs and investment decision making is not under their control.

10. Herd Mentality by Fund Managers.

A frequently noted problem with actively-managed funds is the so-called "herd" phenomenon. Professional managers of a mutual fund usually have styles, or the fund has a "style". For example, a fund could be a "growth" fund seeking to invest in high growth stocks. When a stock is viewed as "growth," the growth funds buy it. This selection criterion is similar for other stocks and funds. Moreover, general trends in the economy are tracked by the same information sources which report the same events. Consequently, many professional managers hear and listen to the same things.

Because many money managers are graded and reviewed based on how well they do relative to their peers, there is a tendency to make investment choices that will not be contrary to the decisions of one's peers. It is safer for them not to risk losing money while seeking higher than average returns. For these reasons, there is an observed phenomenon where "smart" money follows the same investments, makes the same decisions—including the same mistakes—and usually performs less well, net of costs, on average than the market as a whole. The result is poorer performance from professionally-managed, actively-managed mutual funds than might otherwise be expected.

Therefore an investor who does not wish to make his/her own investment decisions or provide discretion to a broker or money manager for an individualized account, can either invest in a variety of passively-managed index funds or invest in actively-managed mutual funds where the active management is supplied by a professional fund adviser.

B. Major Disadvantages Inherent in the Brokerage Service:

1. Inability to Create a Diversified Portfolio on a Cost Effective Basis.

In portfolio theory, an investor should seek to create a diversified portfolio when investing. However, few small investors are able to create a diversified portfolio. One obstacle to creating such a diversified portfolio for the small investor is the inability to build such a portfolio on his/her own because of the costs of trading securities to create and maintain such a portfolio. Another obstacle is the inability to consummate trades in small quantities needed to create such a portfolio. Therefore, most investors who understand the benefit of diversification have to turn to mutual funds. The concept underlying the brokerage has been the selection of individual stocks, not the creation of a portfolio of securities.

Some of the expenses for an investor seeking to invest a small amount to create and maintain a diversified portfolio stem from the brokerage costs. An investor buys or sells individual securities by using a broker. The broker purchases the selected securities for the investor directly, from a dealer, or on an exchange. The costs to a small investor of purchasing or selling a security are reflected in charges that generally fall into two categories.

The first category of expenses is those charged directly to the investor. These include the broker's trading commission and fees. The second type of expenses are charges levied upon the transaction itself ("mark up" or "spread"). These charges are the difference between the cost at which the security was acquired by the dealer or exchange specialist from another investor and the cost of the security as it is sold to the purchasing investor. This is a cost that frequently is "hidden" from investors. Investors do not always realize that there is a spread even when they are being charged a commission. This cost can be significant, even exceeding the explicit commission charges.

For example, to create and maintain a diversified portfolio of individual stocks, an investor could purchase 20 to 30 stocks to create the portfolio. The investor would also periodically re-balance the portfolio by purchasing or selling securities as the markets and securities change. Obviously, the basic brokerage costs, even employing the deepest discounted brokerage services, would be prohibitive for the ordinary investor.

As an example, to create and maintain a diversified portfolio, an investor seeking to invest $1,000 would likely incur minimum brokerage costs of $100 for initially purchasing ten stocks (assuming a fee of $10 per transaction). This cost is equivalent to 10% of the initial invested amount.

As another example, if an investor can only afford to invest $100 and wants to diversify, if the investor invests in five stocks, he/she would pay $5 for each order (with discount brokerages). That would only be the commission charge and does not include the all-in-costs from the spreads. Obviously, no one would pay $25 to invest $100.

Brokerage costs and constraints eliminate the possibility that a small investor can create and maintain a diversified portfolio on his/her own, even if the investor has the tools and skill to be able to do so.

2. Lack of Investment Information to Create a Diversified Portfolio.

Ordinary investors usually do not possess the capabilities, skills, or tools necessary to create and maintain a diversified portfolio with the desired risk-return characteristics. To create such a portfolio, an investor needs to understand risk from the perspective of portfolio theory. He or she must have the data and mechanism for analyzing the information in order to employ the theory. That data then needs to be connected with a trading system to enable the cost-effective creation and maintenance of the portfolio. There is no brokerage that deploys and uses the necessary diversification information combined with a trading system that is accessible by an ordinary investor.

There are a variety of systems (i.e. Schwab One Source (www.schwab.com)) that provide advice to investors for creating a portfolio of mutual funds based on risk, style, performance, and ratings. These systems are not designed to enable investors to purchase a portfolio of specific securities.

3. Inability to Purchase Small and Fractional Share Interests.

It is possible to acquire small and fractional share interests through specific dividend reinvestment plans. These plans, however, are run by selected issuers and have a number of limitations including average pricing usually over weeks or a month.

Purchasing or selling a security through a brokerage requires transactions to be effected in minimum units of whole numbers. An investor can purchase no less than one share of Cisco or sell no less than one share of Amgen. In addition, costs are frequently prohibitive for small transactions in a security (such as one or two shares) or even for transactions in less than a round lot of 100 shares. An investor buying a round lot in an ordinary security trading between $20 and $40 would buy at least $2,000 to $4,000 worth of the security.

Buying 20 round lots to create a diversified portfolio requires an investment ($40,000 to $80,000) greater than most investors can make. As an example, an investor wishing to invest $150 could, through an ordinary brokerage, at best buy three shares of a $40 stock or seven shares of a $20 stock and invest the balance in cash. But at a brokerage cost of $5 per security traded, the brokerage costs would range from $15 ($5×3) to $35 ($5×7), a prohibitive 10% to 23% cost of the amount to be invested. Until now, the only reasonable alternative for an investor has been a mutual fund.

4. Inability to Obtain Superior Trade Executions.

Brokers generally execute trades when received, thereby providing "immediate" executions, but there are exceptions. For example, a trade can be a "limit" order meaning that it can be executed only at a specific price or better. Limit orders are generally executed immediately whenever the price reaches the limit. Trades can also be set for execution at "open" or "close", meaning the trade will be executed as part of the opening or closing call auction procedures, or upon the satisfaction of certain other conditions, or at certain other times as the investor may specify.

Generally, under applicable regulatory requirements, investors are required to receive what is called "best execution", but that execution may not be the best price they could have received if the execution system were different. If an investor seeks immediate execution, the price may be less advantageous to the investor than if the investor is willing to wait. If the investor is willing to delay the order execution until there are multiple other orders, then the investor could obtain a better execution because there will be a greater concentration of order flow against which to try to match the order.

There are trading systems that attempt to obtain improved trading performance for their investors, but these systems serve exclusively as various forms of "matching" mechanisms that seek to match buy and sell orders. They hold order flow over time or in accordance with specified preferences. These include the ITG-Posit that operates a crossing system that matches buy and sell orders five times a day, and the Optimark trading system which matches buy and sell orders according to various algorithms. These systems primarily cater to institutions and are not available to the individual investor.

5. Failure to Monitor Portfolio Based Tax Effects.

Brokers generally do not monitor the overall tax effects of a portfolio for their customers. The concept behind a brokerage is usually the selection of individual stocks for purchase or sale, not the creation and maintenance of a diversified portfolio. Consequently, brokerages only record the basis, gains, and losses of individual securities as opposed to recording gains and losses for the portfolio as a whole. If a customer obtains tax advice from the broker, it is usually expensive.

6. Failure to Assist in Exercising Shareholder Rights.

Similar to the problem with tax effects, a brokerage is designed to provide assistance regarding individual security transactions without looking at the portfolio as a whole. Consequently, investors are forwarded materials such as proxy statements without any advice or direction from the broker.

7. Failure to Limit Portfolio Characteristics.

Currently, security trading is permitted in some self-directed retirement accounts established by employers such as 401(k)s, but not permitted in many. Some employers are concerned that employees, especially less financially sophisticated employees, will not understand the risks of investing. The employees may invest in risky securities or not have a sufficiently diversified portfolio. These issues potentially could cause the employees to lose much or all of their expected retirement.

Consequently, employers limit the choices that employees may select by offering a finite number of investment choices. This means only offering limited choices of mutual funds. Trading securities has not been offered because there was no way to ensure that an employee would invest in a diversified portfolio with specified maximum risk levels.

Recap of Disadvantages of Mutual Funds and Brokerages:

Therefore, investing directly in stocks, bonds, and other investments restores control over investment decisions to individual investors. This direct control enables investors to invest in a manner consistent with their unique individual investment goals and their personal tax situation. Currently, direct investment creates an investment performance and/or investment safety problem that is unavoidable for all but the wealthiest investors; the inability to economically achieve adequate diversification to maintain investment risk at acceptable levels.

Investment Education:

There are many individuals who purchase mutual funds because they do not think they are sufficiently informed nor educated to make investment decisions on their own. In addition, there are individuals who purchase securities without researching the securities properly. For example, a neighbor or friend told them about "the next great stock" or a financial website or cable channel touted the security.

As an example, in the summer of 2008, on CNBC, a so-called "investment expert" promoted Bear Stearns as a security investment even though Bear Stearns was having large-scale financial difficulties and the stock price was falling. Bear Stearns went bankrupt within a few weeks after being recommended by this so-called expert.

Many individuals lack financial knowledge to investigate and research securities and their associated companies. Many of the current financial websites (i.e. Yahoo Finance, Motley Fool, CNBC, MarketWatch) aim their articles at those individuals knowledgeable in investing and do not focus on basic investment education. In addition, these websites provide a knowledgeable investor with information, but do not provide mechanisms for creating a tailored basket of securities.

Prior Art Comparisons:

Regarding the financial education of individuals, U.S. Pat. No. 6,515,681 to Knight (2003) focuses only on a message board interface and U.S. Pat. No. 6,571,234 to Knight (2003) focuses only on message boards and querying message board postings. Neither of these patents contains a financial education component, asset allocation system, nor mechanism to create a customized fund.

U.S. Pat. No. 7,146,335 to Rose (2006) discusses only trading one security at a time, but not creating a customized, diversified fund. U.S. Pat. No. 7,373,324 to Osborne (2008) focuses on a recommended minimum investment amount, but the patent uses advisors in selecting investments and strategies. This patent does not allow an individual to create a weighted portfolio of securities and does not offer a financial education component. U.S. Pat. No. 7,174,313 to Martinez (2007) focuses only on rebalancing funds and is geared for companies managing funds. It is not designed for individuals. U.S. Pat. No. 6,236,972 to Shkedy (2001) only focuses on mutual fund trading, not individual creation of a customized fund of securities. U.S. Pat. No. 7,313,540 to Hueler et al. (2007) includes fund customization, but is designed for investment plans (investment contracts) rather than individuals.

U.S. Pat. No. 6,832,209 to Karp et al. (2004) does not enable individual choices of stock selection nor portfolio diversification. U.S. Pat. No. 4,674,044 to Kalmus et al. (1987) focuses on trading only, not customization of a portfolio. U.S. Pat. No. 7,340,425 to Boyle & Craig (2008) focuses on creating unit investment trusts of professionally selected stocks and not customization of a portfolio by an individual investor. U.S. Pat. No. 6,282,520 to Schirripa (2001) does not focus on customized selection of specific investments. The patent's focus is on risk versus return only, but excludes the individual's investment timeframe.

U.S. Pat. No. 6,484,151 to O'Shaughnessy (2002) charges the individual money to see a list of stocks in a strategy. The investor first chooses stocks then determines an amount to invest. This method is not efficient since the investor will not know how much money is invested in each security chosen. In addition, this patent has equal weighting of stocks (i.e. 10 stocks and each gets 10% of the total amount invested) whereas a truly customized fund would enable the investor to designate the weighting. Finally, this patent does not include investment education for the individual.

U.S. Pat. No. 5,132,899 to Fox (1992) is designed for portfolio managers and does not allow individuals to create a customized fund based on his/her timeframe and risk tolerance. In U.S. Pat. No. 7,447,651 to Herbst (2008), the individual is given a set of rules that are created by a computer system, and the patent uses rule-based selections for the investor. This limits the investment choices. In addition, this patent does not include investment education for the individual.

U.S. Pat. No. 6,338,047 to Wallman (2002) is for a collective group to make investment choices to create a portfolio, so an individual cannot design his/her own customized fund of securities based on his/her risk tolerance, timeframe, and goals. The composition of securities included in the portfolio can be modified to reflect changes in the aggregate investment choices of the collaborative group of investors.

U.S. Pat. No. 6,601,044 to Wallman (2003) is designed to have a computer design a portfolio based on the investor's preference data. The computer creates a percentage allocation of investment classes for each investor based on input from that investor. The investor does not choose the investments nor receives an investment education. The allocation model is based on the answers to a user survey. These inputs might not be accurate and the results are dependent on the type of questions asked and the investor's answers. This patent aggregates all the assets in a portfolio, but does not consider the timeframe of the individual's investments (i.e. long term such as saving for retirement, short term such as saving for college) in the overall portfolio.

U.S. Pat. No. 6,996,539 to Wallman (2006) is similar to U.S. Pat. No. 6,601,044 to Wallman (2003) in that a computer selects stocks based on the investor's criteria. The processor also creates a percentage allocation of investment classes for each user based on input from each user, and transmits a resulting percentage allocation of investment classes to each user. Again, the allocation model is based on inputs programmed in. The inputs might not be accurate and the results are dependent on the type of questions asked and the investor's answers. In addition, the system specifies percentages of each stock to allocate to the portfolio, which is not as customized as if the individual set the percentage allocation weightings. There is no investment education component in this patent.

U.S. Pat. No. 7,110,971 to Wallman (2006) is a continuation of the prior patents where an investor provides his/her preferences, the system generates a portfolio that reflects the investor's preferences, or assists the investor in selecting a portfolio. Again, the allocation model is based on the answers from a user survey. These inputs might not be accurate and the results are dependent on the type of questions asked and the investor's answers. With this patent, all stocks/bonds/investments are grouped together into one portfolio, regardless of whether they are in a 401k account, broker account, etc. This does not take into account the timeframe for the individual's investments (i.e. long term such as saving for retirement versus short term such as saving for college). The risk and return of the entire portfolio is meaningless if the investments of various timeframes and their associated risk/return ratios are lumped together.

U.S. Pat. No. 7,117,176 to Wallman (2006) is a continuation of the prior patents where the system will recommend or suggest to the investor the securities that should be included in the investor's portfolio that satisfy the investor's risk and return selections, combined with any other selections or preferences that the investor may have. Again, the allocation model is based on the answers from a user survey. This might not be accurate because the results are dependent on the types of questions asked and the investor's answers. There is no investment education component in this patent.

Advantages of a Proposed System and Method:

Currently there is no mechanism for enabling individuals to gain knowledge in investing. Nor is there a means to cost effectively design, maintain, and modify a customizable investment fund comprising individual securities based on an investor's risk tolerance, timeframe, and specific investment preferences. An investment mechanism differs from the prior art where 1) it is currently not possible for a small investor to acquire or trade individual equities in small or fractional amounts on a cost-effective basis, 2) the individual cannot manage individual equities as an integrated portfolio, and 3) the individual cannot learn investing concepts and strategies, research investments, and network with other investors in one comprehensive place.

The proposed system and method not only enables an individual to inexpensively create a diversified, customizable investment fund of securities, but also enables novice investors to: 1) gain knowledge in investing; 2) research investments to determine if they meet the individual's criteria; 3) discuss investment strategies with more experienced and more knowledgeable investors.

The proposed system solves the problem of individual or small investors creating and managing a portfolio of securities on a cost-effective basis as well as learning about investment concepts, strategies, and techniques.

The proposed system and method is a combination of investing, investment tools and investment education. It is designed for both those knowledgeable in investing and those who are novices in investing. The proposed system helps an individual set up a cohesive, comprehensive investing strategy that is tailored to the investor's goals, risk tolerance, timeframe, and other investment criteria.

In the proposed system, investors can learn about investing and investment strategies by posting messages on an information exchange forum and having other more knowledgeable investors answer questions. The investors can read or search through other questions and the answers posted on the information exchange forum. They can also post their successful investment strategies and discuss potential investments.

The proposed system also aggregates trade orders generated by investors at various times during the day for execution and includes a system for executing the aggregated trade orders, including small numbers and fractional shares of securities. The proposed system further nets the various aggregated transactions to provide better execution and lower costs.

What is needed, but not currently available, is a method that enables individuals to:

1) have the advantages (i.e. economies of scale) of a mutual fund without being subjected to the attendant disadvantages.

2) have an inexpensive process for selecting and weighting securities, based on unique individual investment needs. Fees associated with mutual funds currently make this process prohibitively expensive. Currently, the average fee, called an expense ratio, of all diversified equity funds in the Morningstar database is 1.55%. An investor with a $10,000 investment in the average mutual fund would face annual expenses of $155 before any commissions, sales load, or 12(b)-1 charges.

3) have a system where the individual investor is not affected by the actions of other shareholders. For example, one day an investor buys $1,000 of shares in a mutual fund. The next day, a number of current shareholders of that fund decide to liquidate their holdings. The Net Asset Value (NAV) of the fund would be materially affected as the portfolio manager would be forced to liquidate current holdings to meet the redemptions.

4) gain greater control over their taxes through managing capital gains and losses by having all the information necessary to monitor and manage tax effects.

5) hold on to assets during market downturns. Mutual funds may face forced liquidations at depressed prices or forced recognition of capital gains during a market downturn.

6) incur lower transaction costs through aggregation of multiple investor orders, reducing the market costs, commissions, and bid-ask spreads.

7) maintain all shareholder rights with respect to each security in the portfolio, full ownership and control over all investments, and voting and other decisions regarding the securities.

8) maintain direct control over the charges and expenses incurred by trading and have the ability to make multiple and intra-day investment transactions.

The proposed method and system would allow the investor to ensure that his/her customized fund is diversified and that it reflects the level of risk he/she wishes to assume. It would increase the investor's control over specific matters like stocks owned, taxes owed, and shares voted. It would enable the investor to purchase or sell specific securities as well as fractional shares of securities, all for a low cost that is less than or competitive to trades of single securities through discount brokers.

In contrast to what is offered by existing brokerage services, what is needed is a system and method that: 1) reduces costs because the system aggregates order flow, thereby limiting the number of actual external trades; 2) enables an investor to select individual securities reflecting his/her preferences to be included in a diversified portfolio by taking the investor through the process to create and manage a diversified portfolio; 3) enables an investor to acquire fractional and small numbers of shares, thereby permitting the cost-effective creation and maintenance of smaller, but diversified, portfolios.

In contrast to the functions of mutual funds, what is needed is a system and method that would include: 1) selection of individual securities to be included in a portfolio; 2) management of tax effects; 3) making specific modifications to the portfolio multiple times a day, including buying or selling securities at the open, mid-day or close; 4) exercising voting and other shareholder rights and decisions; 5) controlling reinvestment of dividends; 6) fine-tuning risk-return preferences with complete control over what will be included in the portfolio; 7) modifying risk levels and portfolios with fewer potential costs or tax consequences; 8) better managing costs.

The underlying purpose of the proposed process is that investors should be able to learn about investing as well as inexpensively invest in tradable assets as a fund instead of as a collection of individual assets. The proposed system enables investors to create and maintain a diversified portfolio as well as make investment decisions based on the effect on the investor's portfolio.

The proposed process addresses the need for a comprehensive, intuitive system and method that enables individuals to cost-effectively create a customizable investment fund comprised of directly-owned individual securities. This system has attributes similar to a mutual fund, such as diversification, but with advantages over a mutual fund. In addition, this system has an investment tools component enabling individuals to learn about investing and make better informed investment decisions. This comprehensive system and method is unlike any prior art in that it combines investing and education together.

These and other advantages of one or more aspects will become apparent from a consideration of the ensuing description and accompanying drawings.

SUMMARY

In accordance with one embodiment, this consists of a computer-based system that provides individuals a comprehensive, convenient, cost-effective, and intuitive mechanism for investing small amounts, including periodically, as well as learning about investment concepts and strategies. The embodiment includes a personal computer-based or accessible program to create and manage a customizable investment fund of securities based on the individual's investment preferences and allocation weighting strategies.

This includes the ability to sell or purchase securities to modify the customizable investment fund, monitor tax effects, pass through voting rights of the securities, analyze investments held by the investor on an integrated portfolio basis, educate individuals on investing concepts and strategies, and enable investors to discuss their investing questions with other knowledgeable investors.

This system enables small investors, at a reasonable cost, to create and manage a customized, diversified fund of securities or other assets, rights, or liabilities, and learn about investing with investment tools. The system provides netting and aggregating trades to reduce costs. Securities traded include stocks, mutual funds, bonds, and options. Investors gain investment knowledge via information exchange forums and investment education components. The system may include an investor computer, a brokerage computer, and a third party computer, all linked together by a network.

The present embodiment, compared to mutual funds, provides the individual investor:

1. Complete control over the selection, weighting and amounts of securities.
2. Control over the tax effects of purchases or sales of the securities included in the portfolio.
3. Information necessary to monitor and manage tax effects.
4. All shareholder rights with respect to each security in the portfolio and full ownership and control over all investments, voting, and other decisions regarding such securities.
5. Direct control over the charges and expenses incurred.
6. Ability to make multiple intra-day investment decisions by the individual.
7. Control over modifying the portfolio.
8. Education in investing concepts and strategies, as well as the ability to discuss investments with other investors.

Compared to brokerage services, the present embodiment enables the individual investor to:

1. Reduce costs because the system aggregation and netting limits the number of actual trades that need to be made external to the system.
2. Select individual securities reflecting his/her preferences to be included in a customizable, diversified portfolio.
3. Acquire fractional and small numbers of shares, thereby permitting the cost-effective creation and maintenance of smaller, but diversified, portfolios.
4. Monitor the portfolio's tax effects. The computer-based system of the present embodiment can track the basis in each of the securities in the portfolio and use that basis to determine the tax consequences at any point in time.

5. Assist in the exercise of shareholder rights. The computer-based system offers assistance to users in voting or other rights.

DRAWINGS

Figures

In the drawings, closely related figures have the same number but different alphabetic suffixes.

Figure 3:
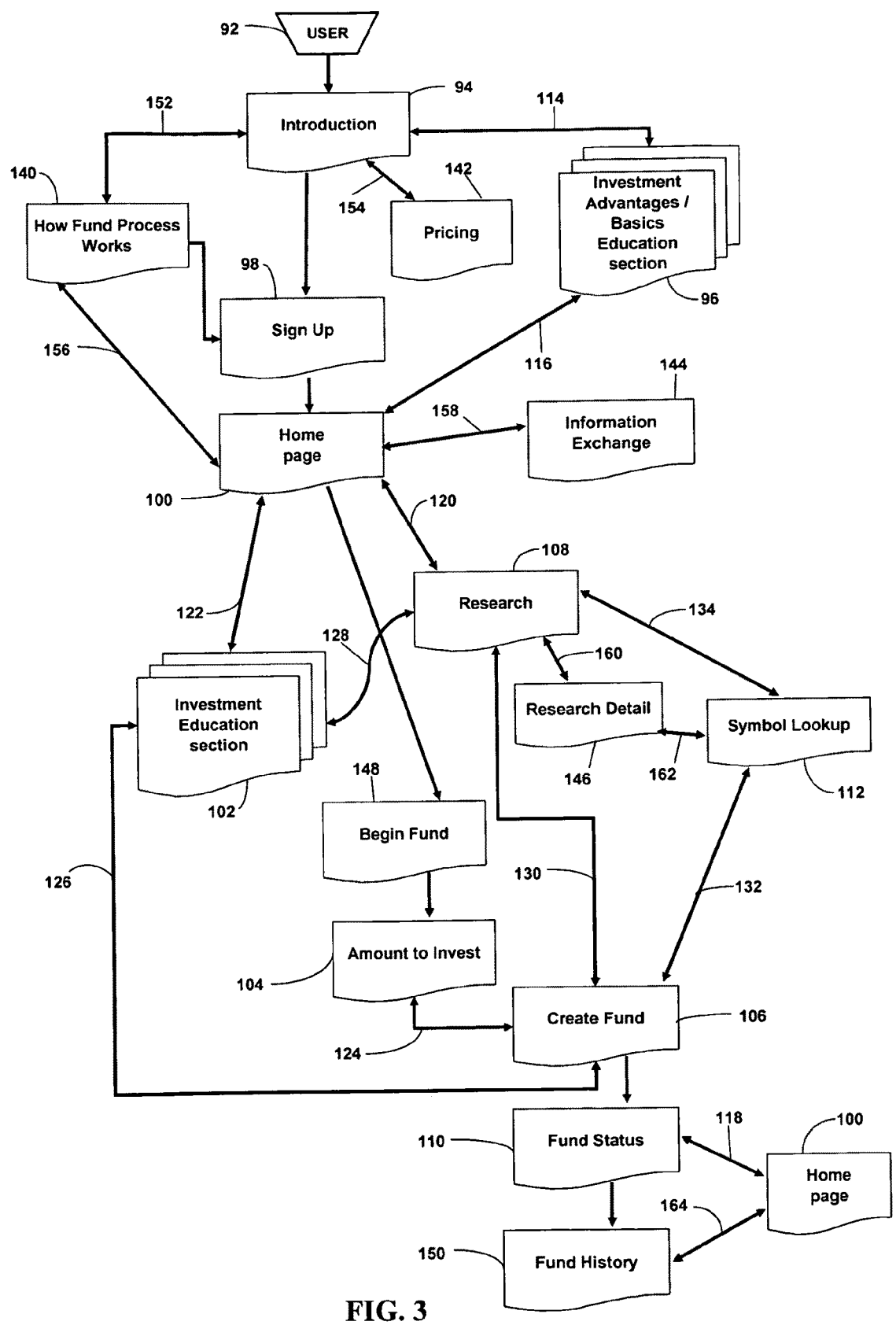
FIG. 3 depicts the preferred embodiment's detailed process flowchart for a new user.
Figure 3A:
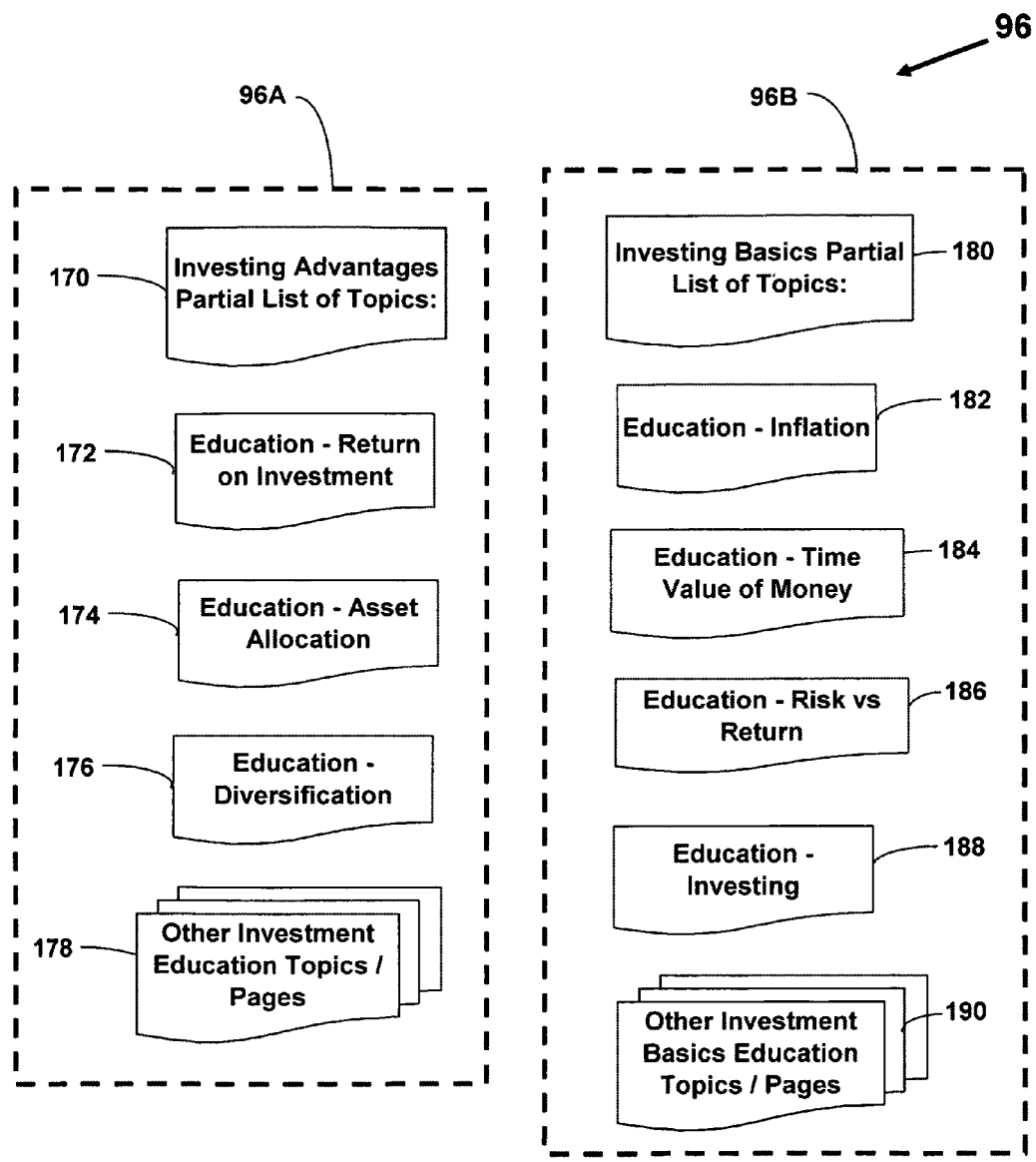

FIG. 3A details a sample of the components of the Investment Tools' Investing Advantages and Basics Education sections in the preferred embodiment.

Figure 3B:
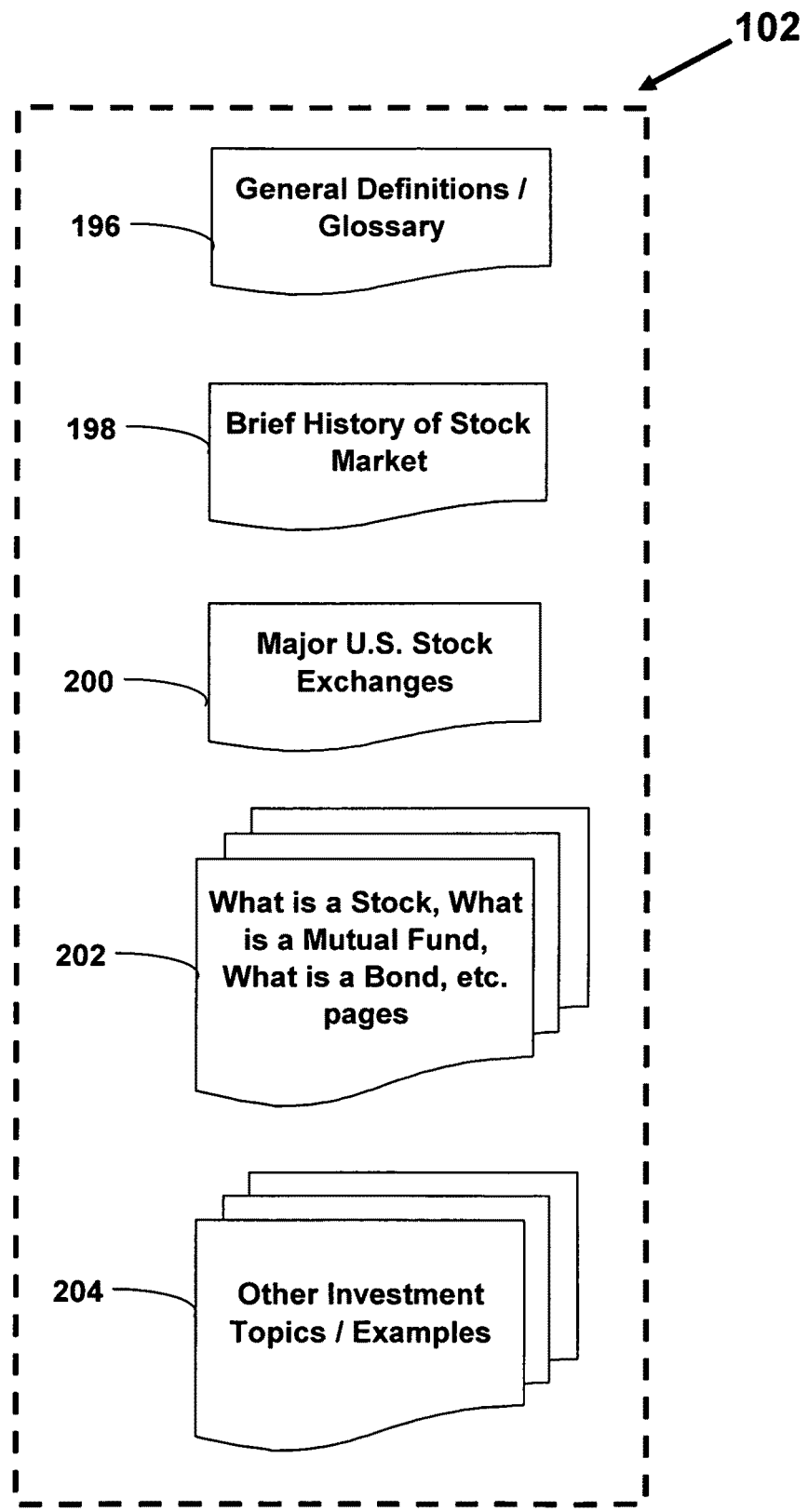

FIG. 3B details a sample of the components of the Investment Tools' Investment Education section in the preferred embodiment.

Figure 4:
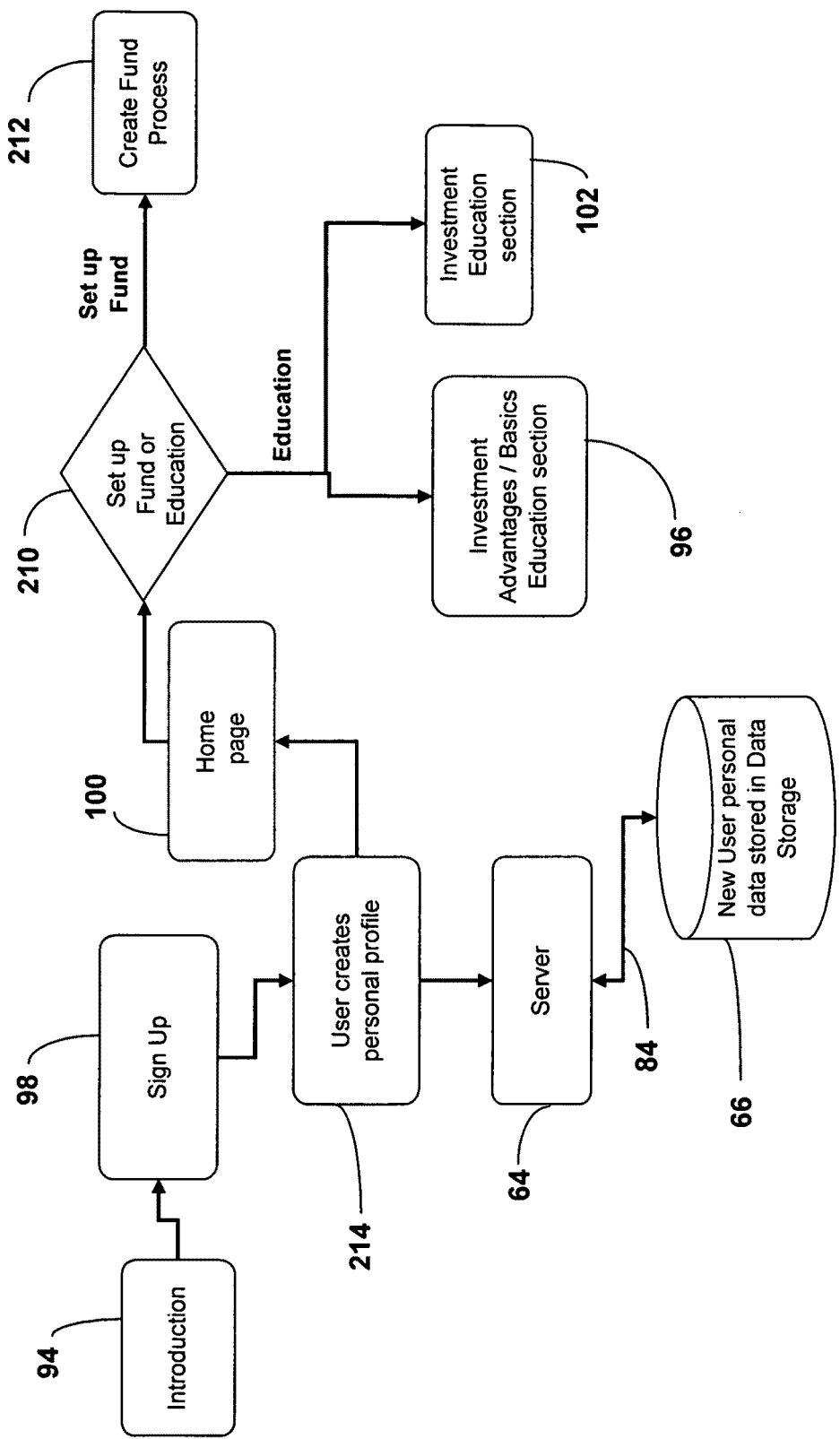

FIG. 4 illustrates in block diagram form the preferred embodiment's process for a user to create an account, then create a customizable investment fund or select the Investment Tools' education sections.

FIG. 5 depicts a sample New User Entry page used to create a new account in the preferred embodiment.

Figure 6:
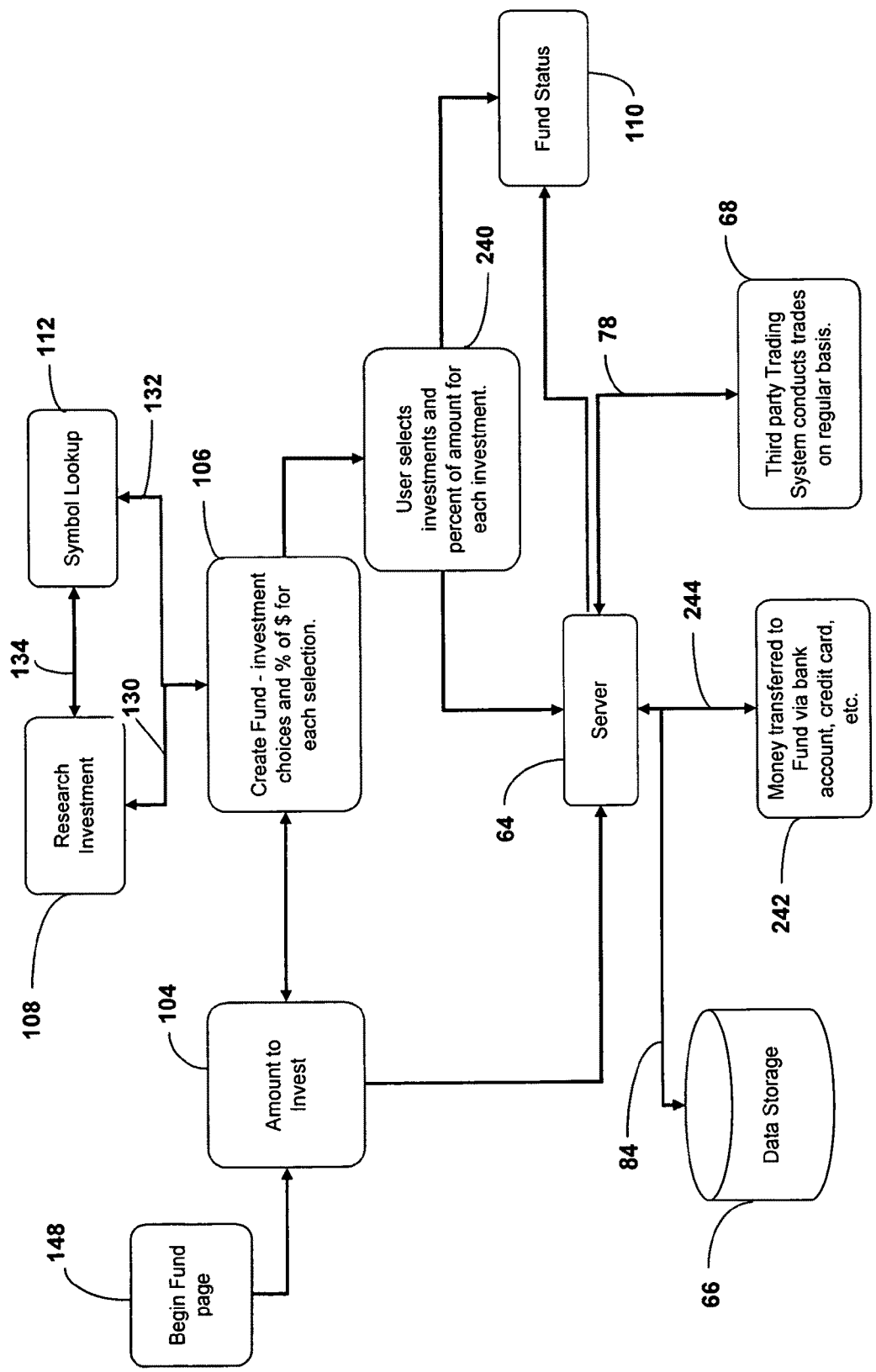

FIG. 6 shows in block diagram form the preferred embodiment's process of a new user selecting a money transfer strategy to transfer money into the user's account and then create a customizable investment fund.

FIG. 7 illustrates the preferred embodiment's sample Fund Creation page where the user selects investment vehicles and develops a weighting strategy by assigning allocation percentages to the selected investment vehicles.

FIG. 8 depicts a sample Fund Status page where the initial investment fund has been created.

Figure 9:
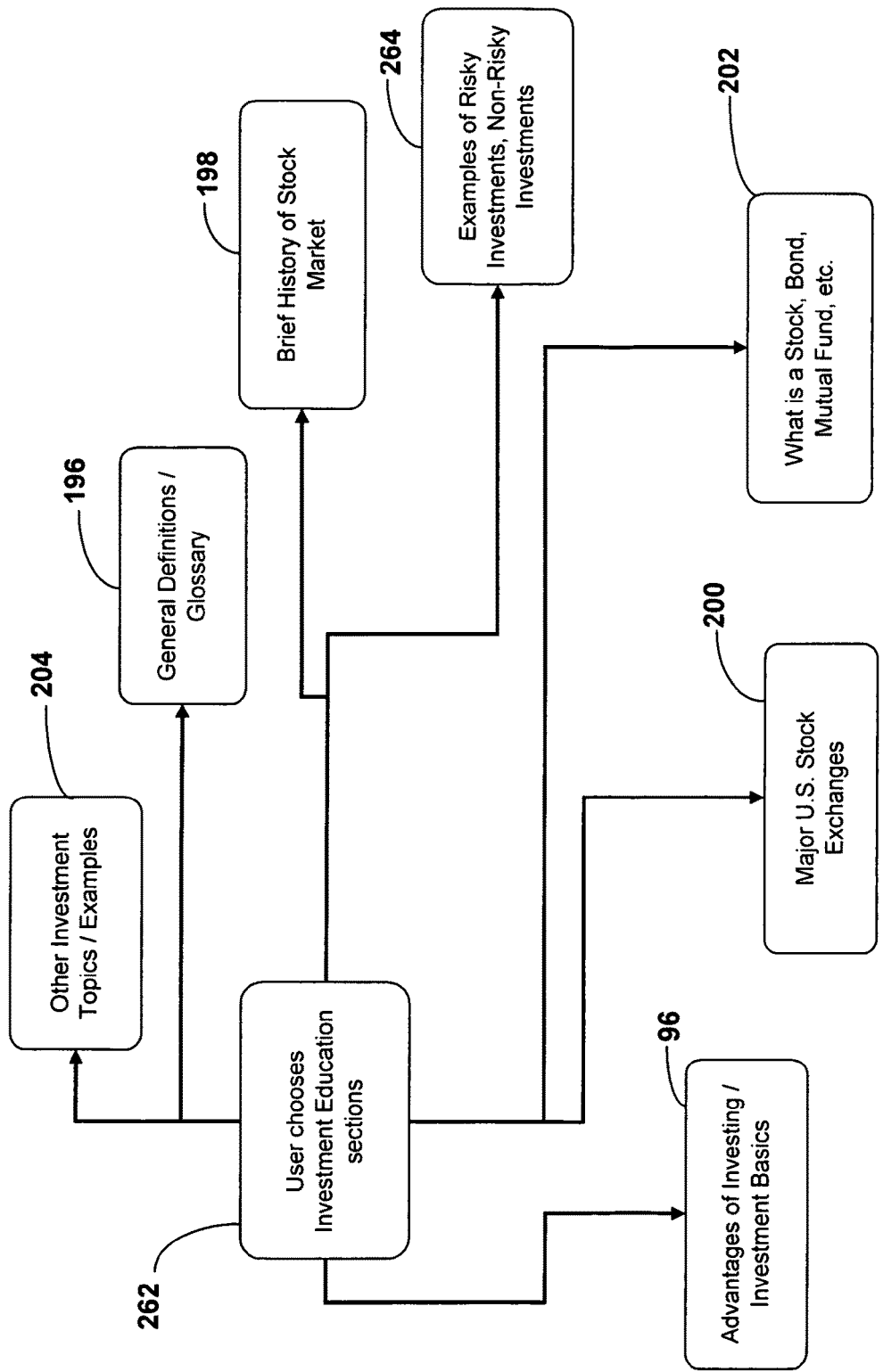

FIG. 9 shows a sample of the preferred embodiment's Investment Tools' investment education components in block diagram form.

Figure 10:
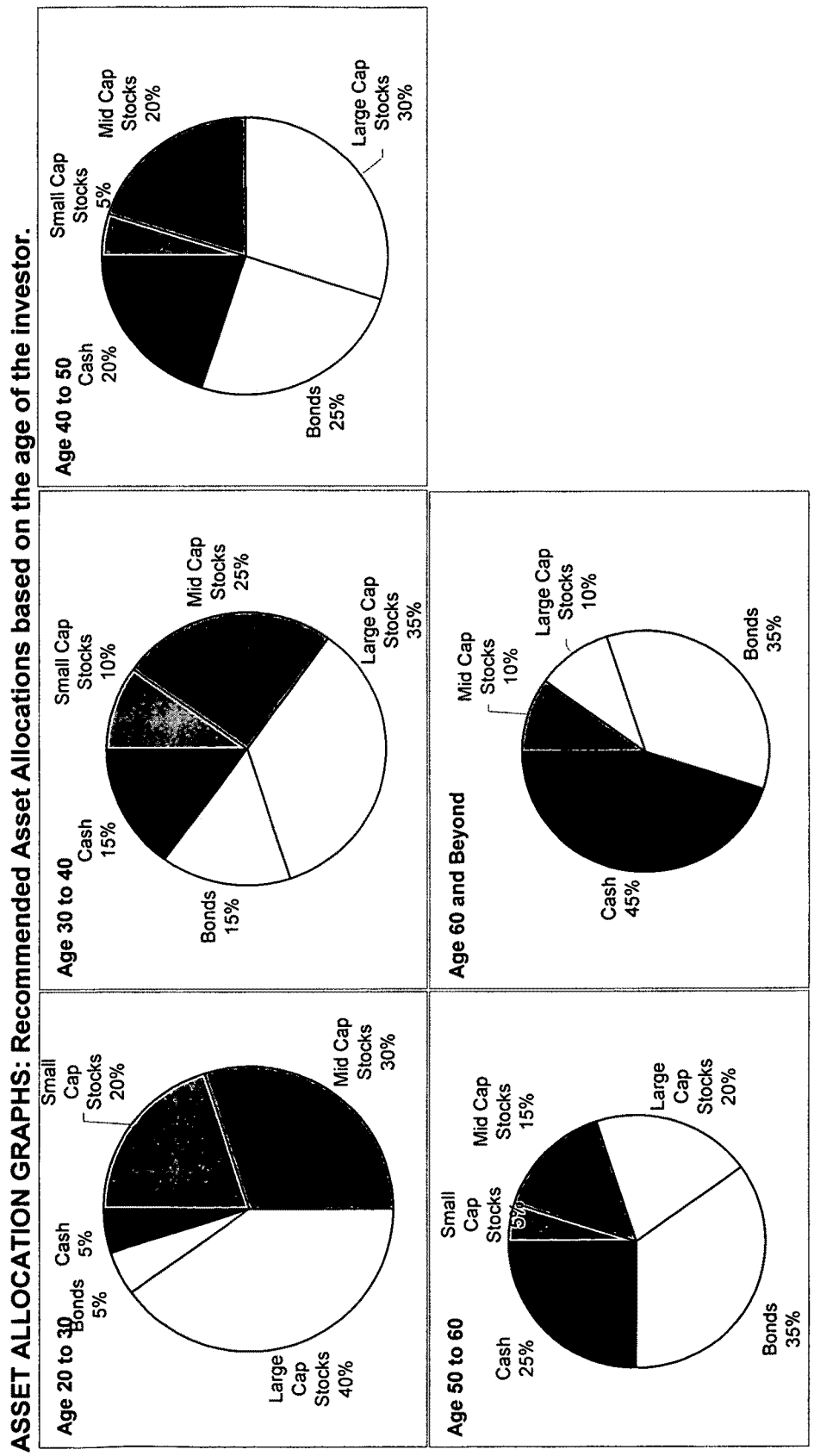

FIG. 10 depicts a sample page of the preferred embodiment's Investment Tools' investment education component showing recommended asset allocation graphs based on the user's age.

Figure 11:
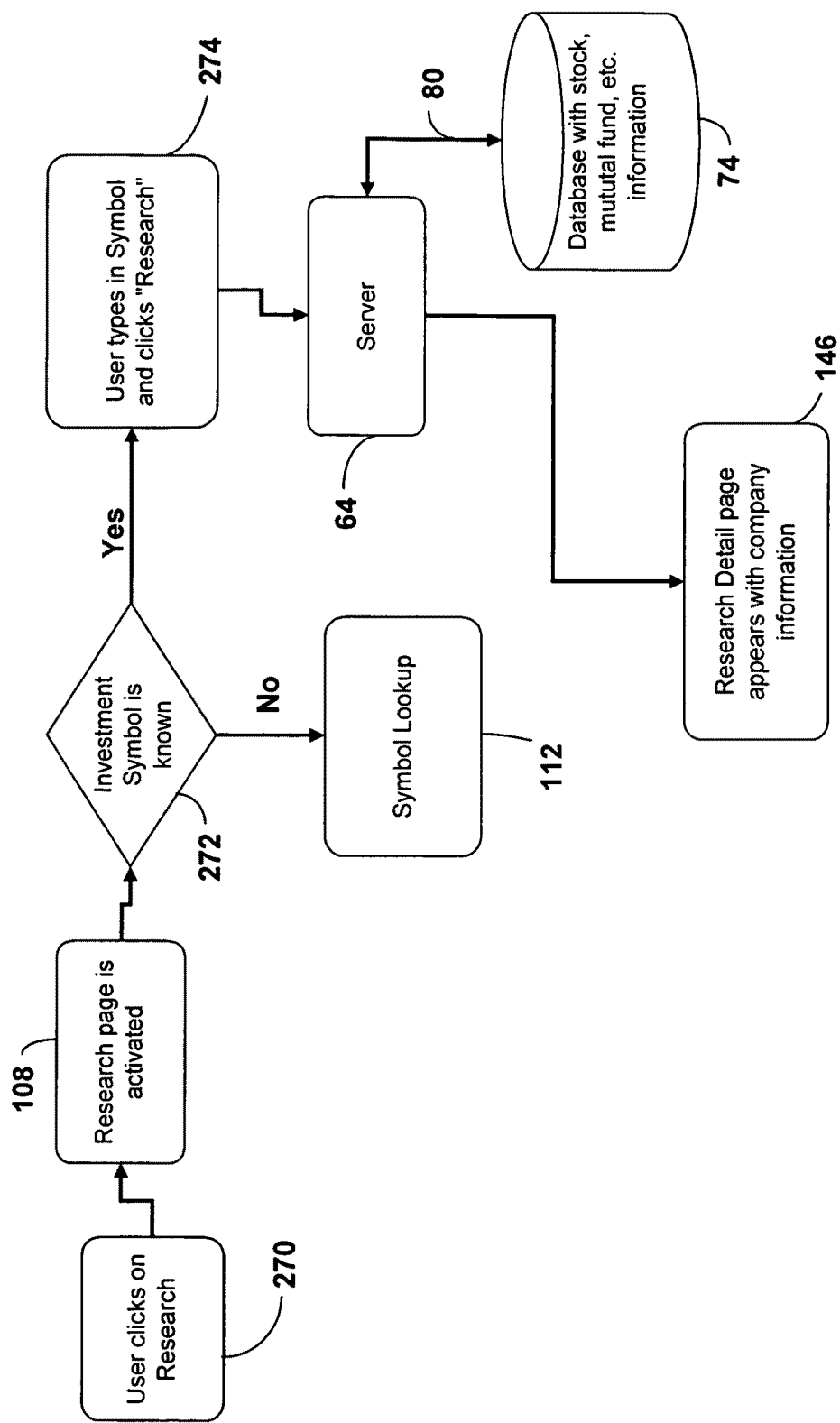

FIG. 11 shows in block diagram form the research investment vehicle process of the preferred embodiment.

FIG. 12 illustrates an example of the preferred embodiment's Research Detail page displaying the company's financial metrics.

Figure 13:
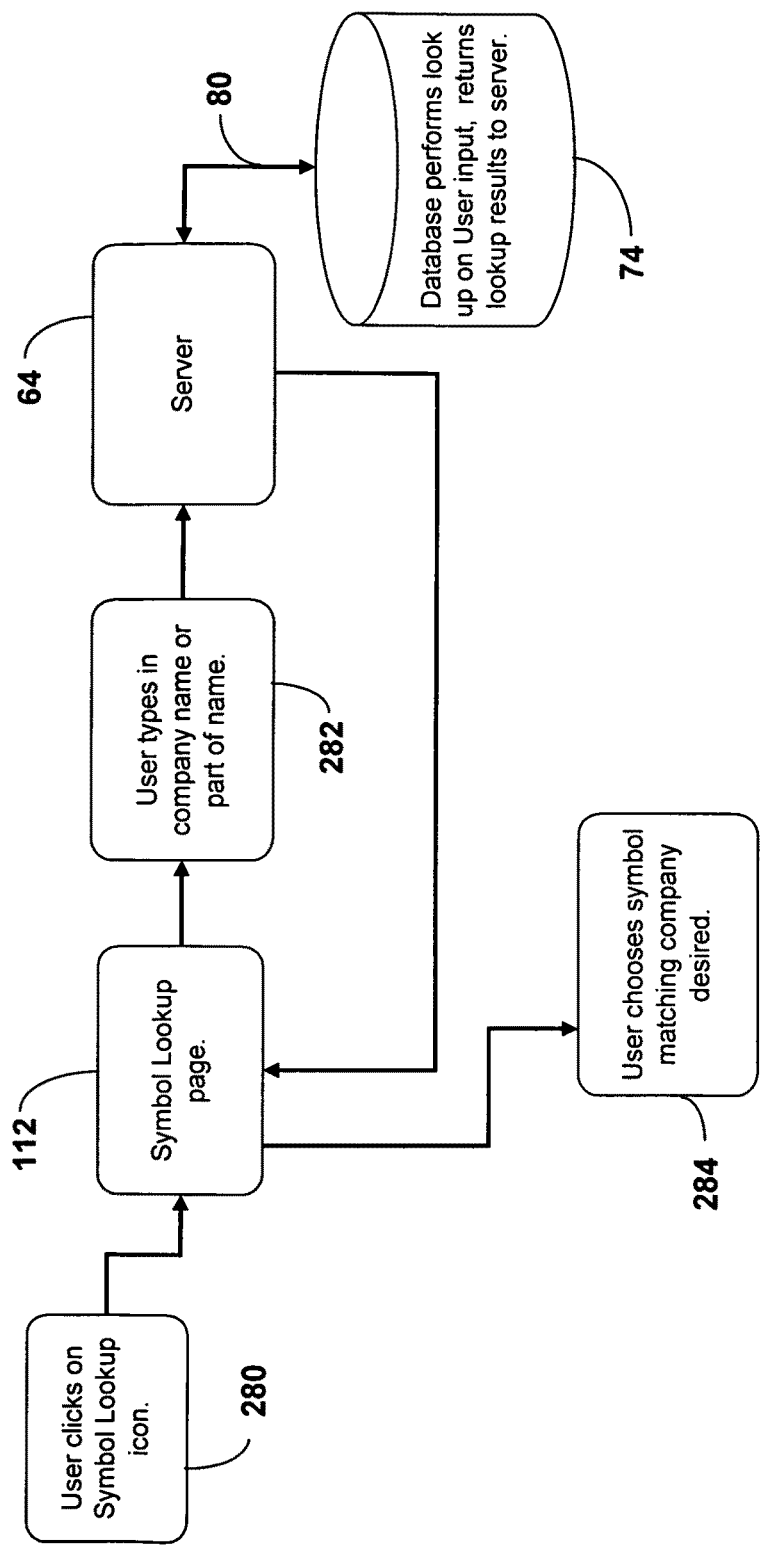

FIG. 13 depicts the preferred embodiment's Symbol Lookup process in block diagram form.

Figure 14:
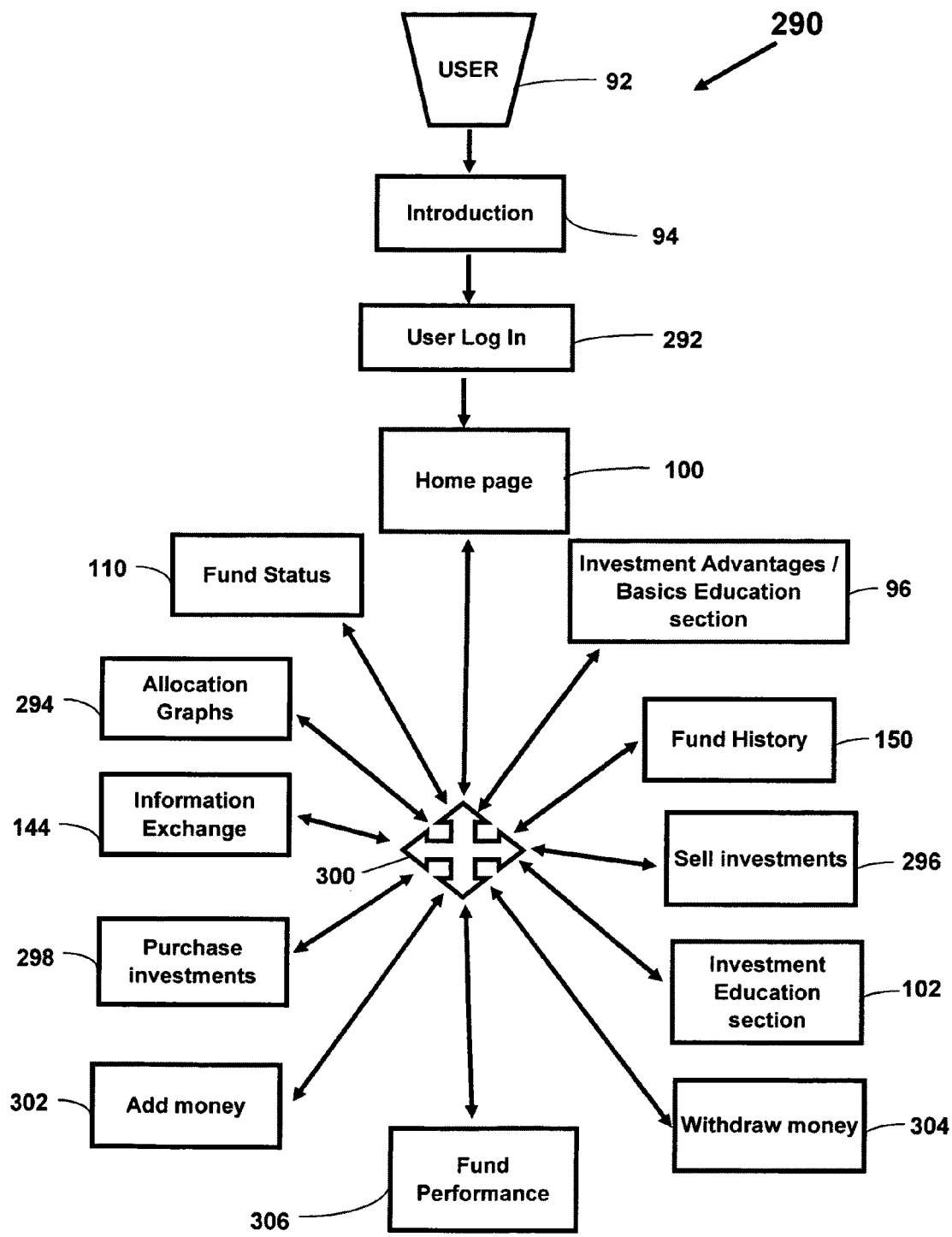

FIG. 14 shows the preferred embodiment's process flow chart for a returning user displaying pages and their corresponding links to one another.

Figure 15:
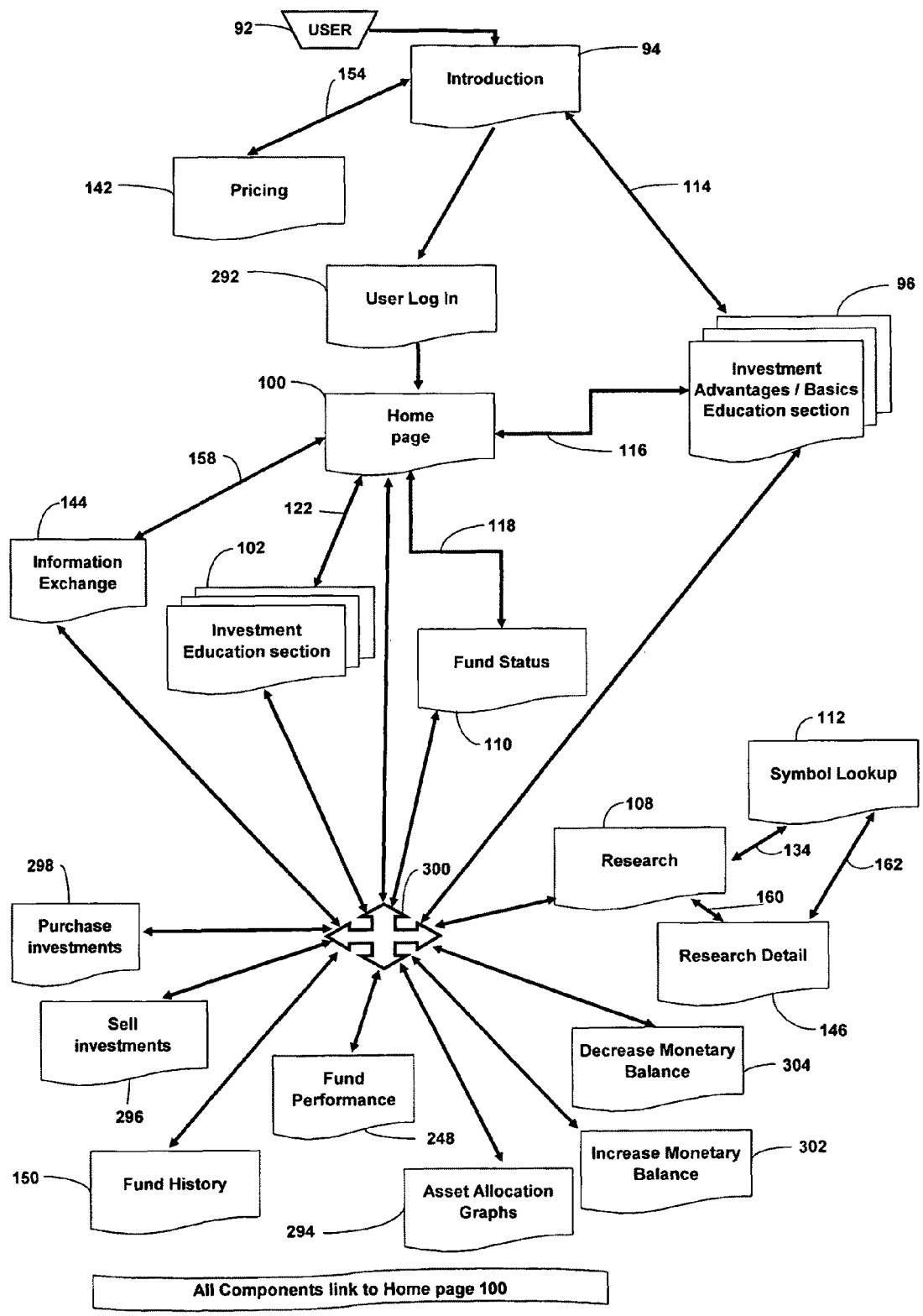

FIG. 15 illustrates the preferred embodiment's detailed process flowchart listing the pages and processes available to a user who already has an account and fund(s).

Figure 16:
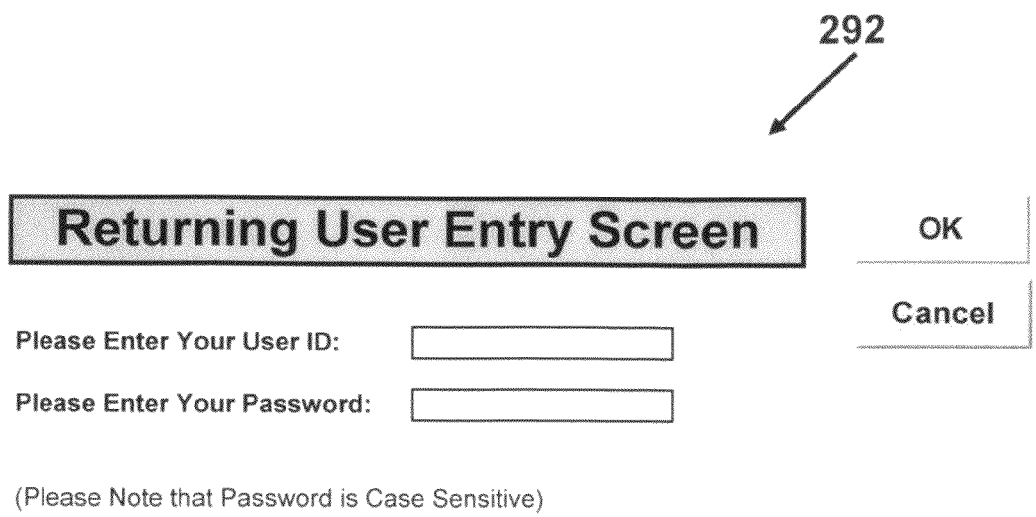

FIG. 16 shows the preferred embodiment's sample Returning User Entry page.

FIG. 17 depicts the preferred embodiment's sample Fund Status page for a returning user detailing the cost basis and current status of the customizable investment fund.

Figure 18:
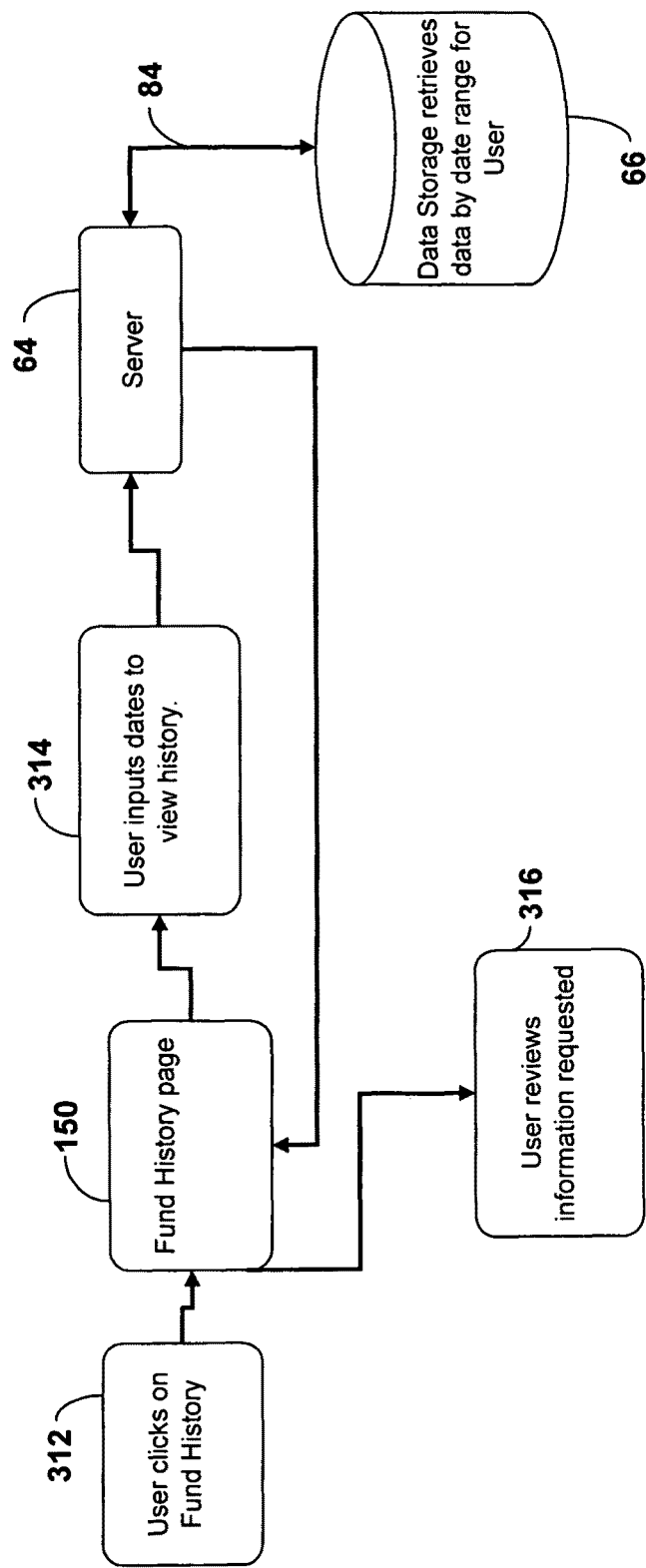

FIG. 18 illustrates the preferred embodiment's fund history process in block diagram form.

FIG. 19 shows the preferred embodiment's sample Fund History page.

Figure 20:
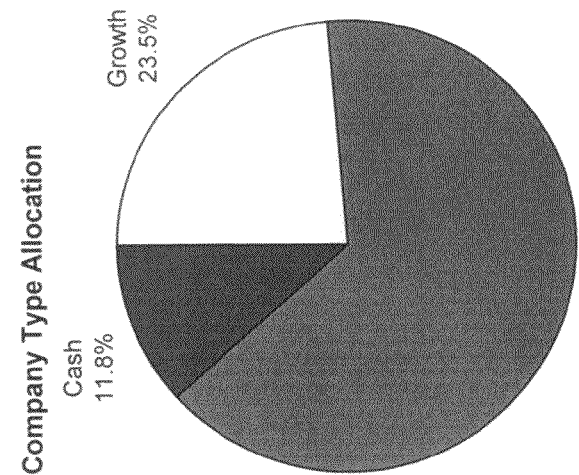

FIG. 20 depicts the preferred embodiment's sample fund allocation graphs based on 1) the investment vehicle size and 2) the investment vehicle type.

Figure 21:
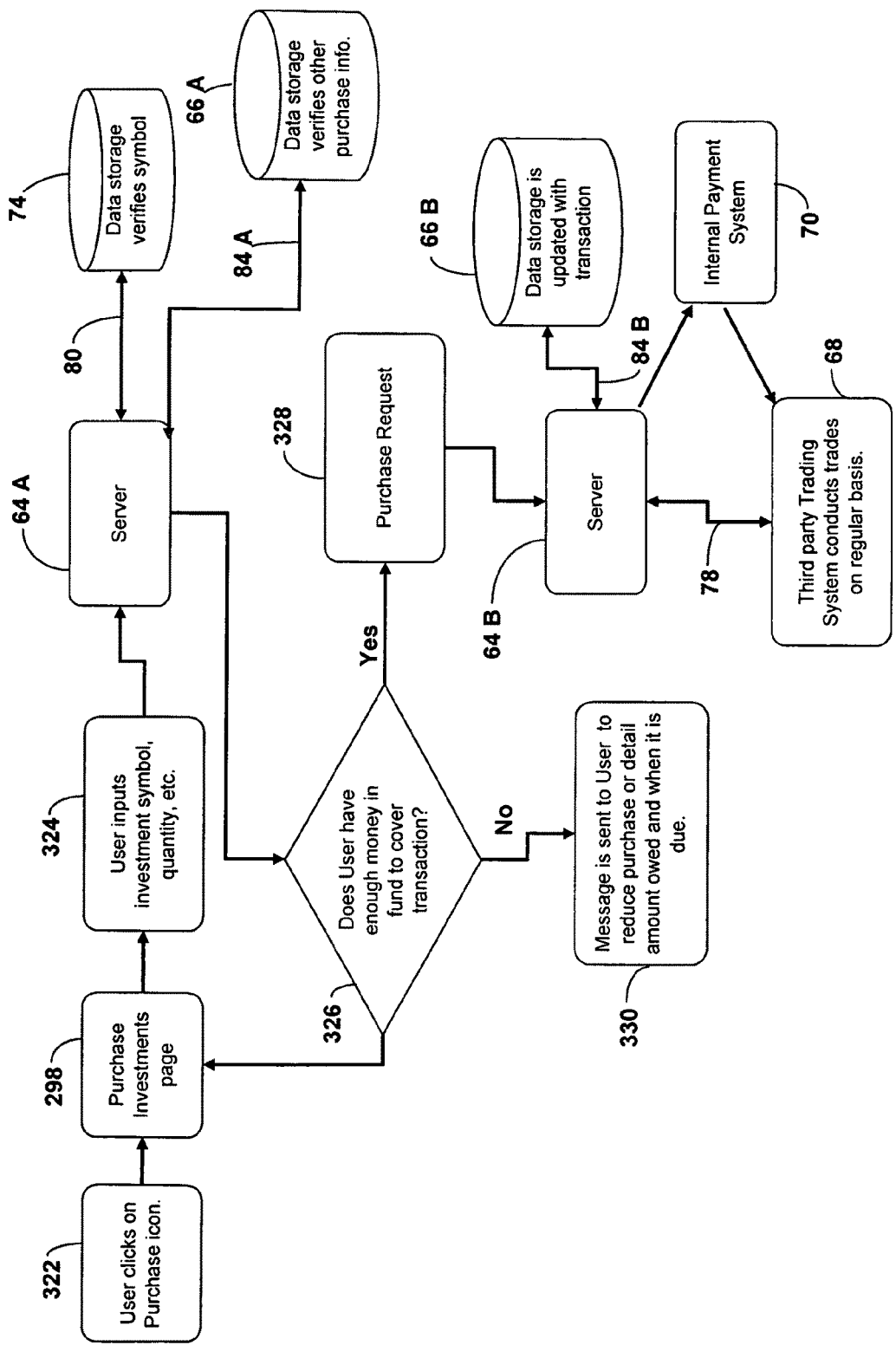

FIG. 21 illustrates the preferred embodiment's purchase of additional investment vehicles process in block diagram form.

Figure 22:
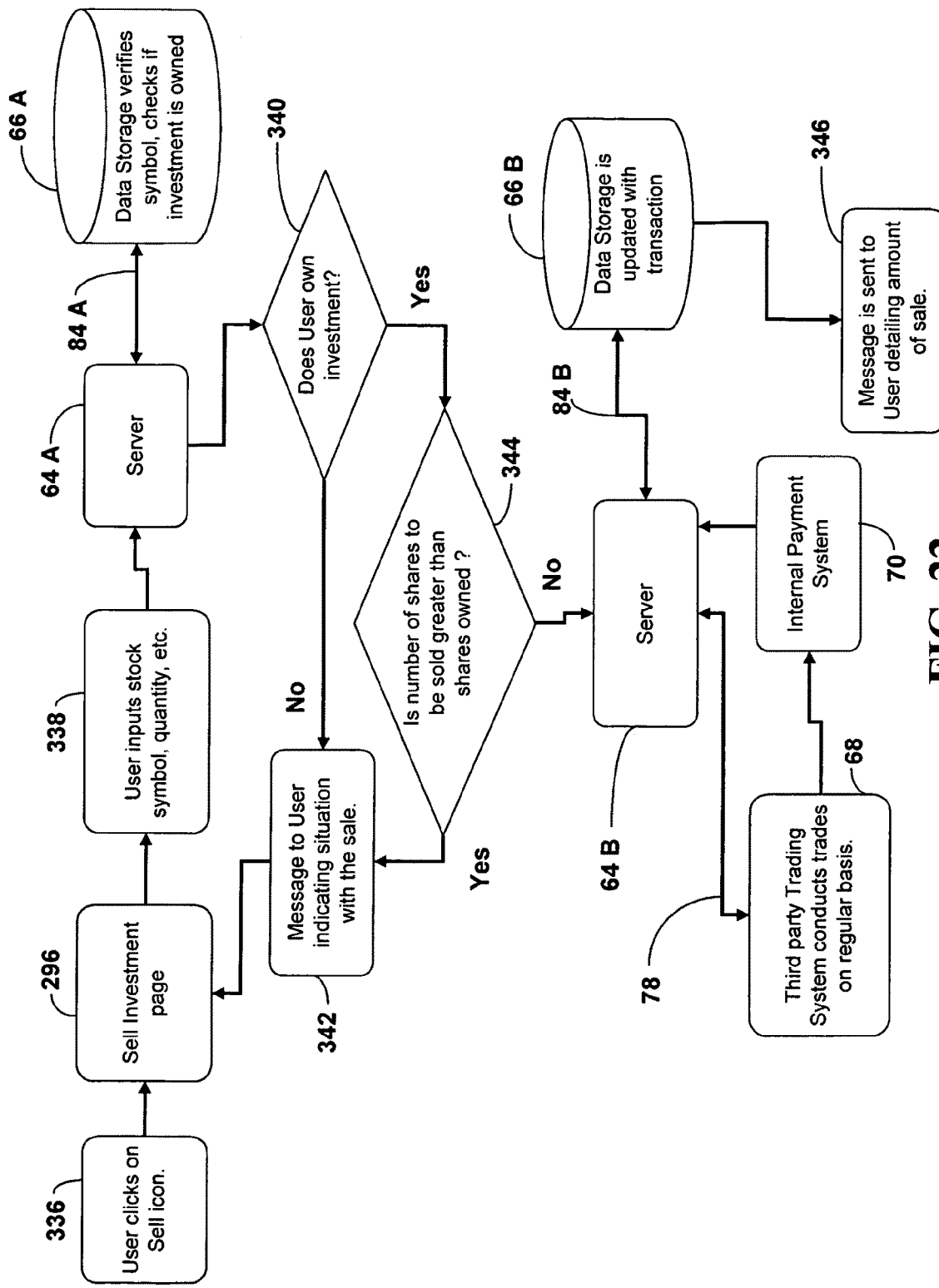

FIG. 22 depicts the preferred embodiment's sale of investment vehicles process in block diagram form.

Figure 23:
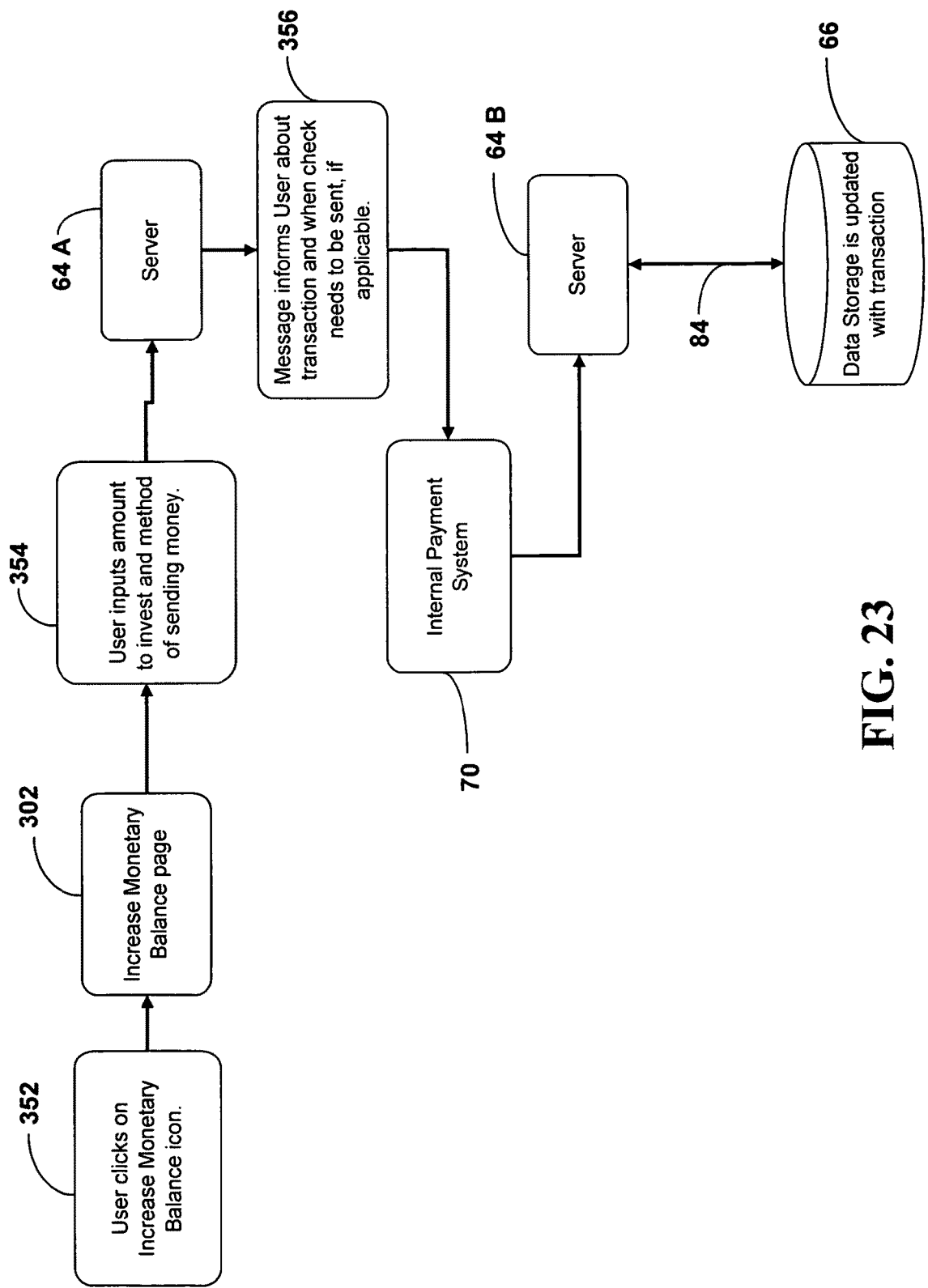

FIG. 23 shows the preferred embodiment's increase monetary balance process in block diagram form.

Figure 24:
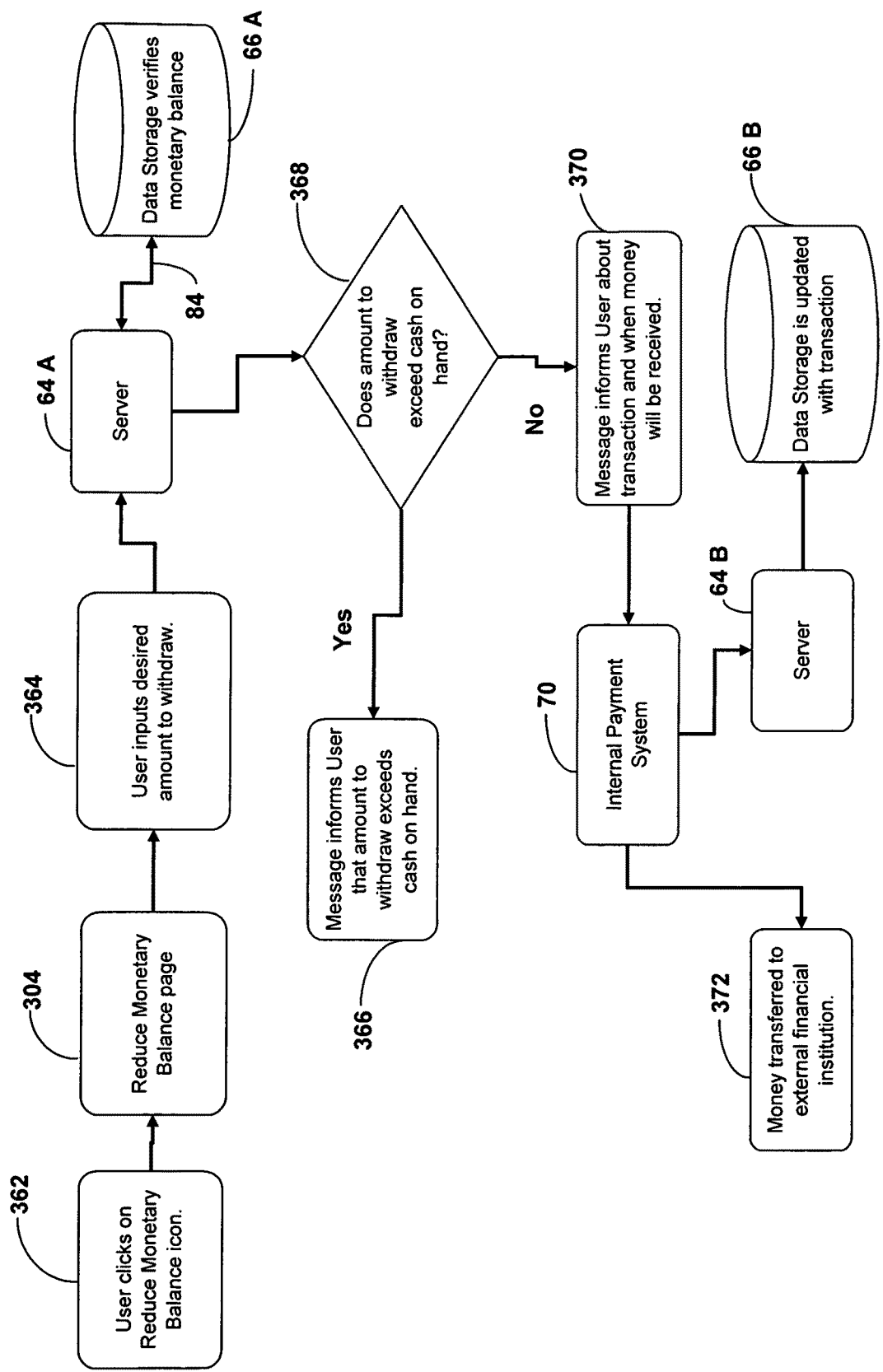

FIG. 24 depicts the preferred embodiment's decrease monetary balance process in block diagram form.

Figure 25:
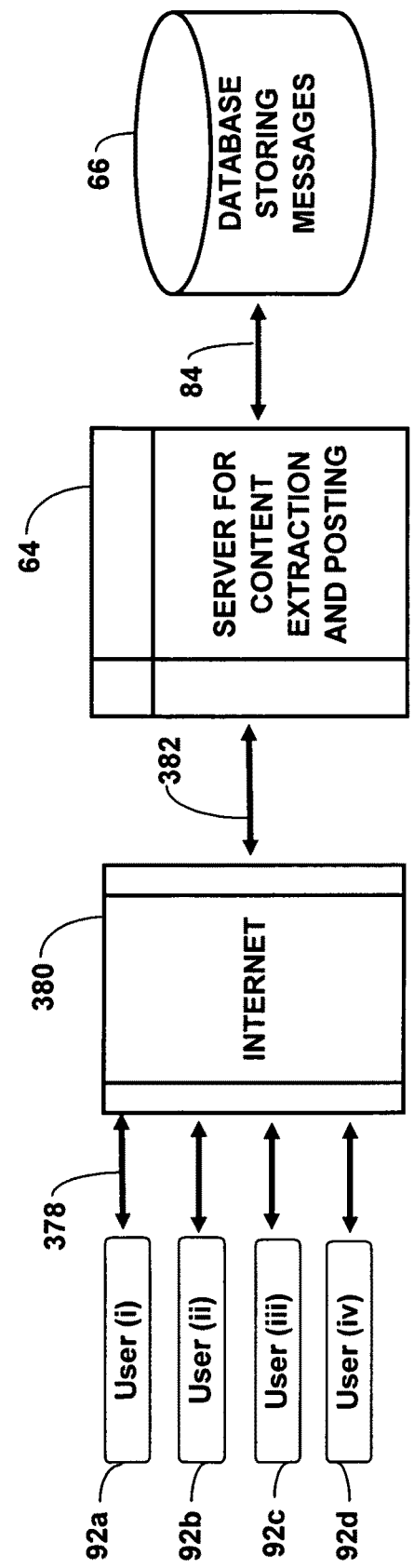

FIG. 25 illustrates a block diagram of the computer-based system for the Information Exchange on-line forum component of the preferred embodiment.

Figure 26:
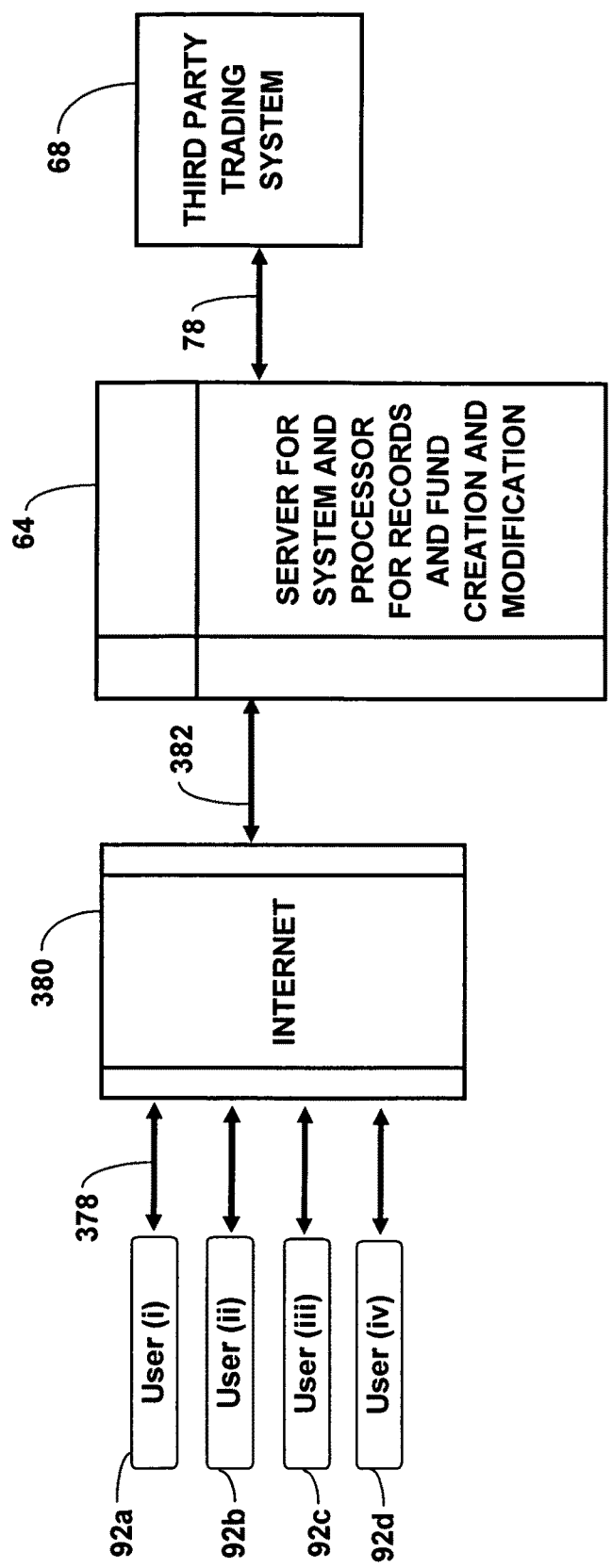

FIG. 26 shows an overall block diagram of the computer-based system of the preferred embodiment.

Figure 27:
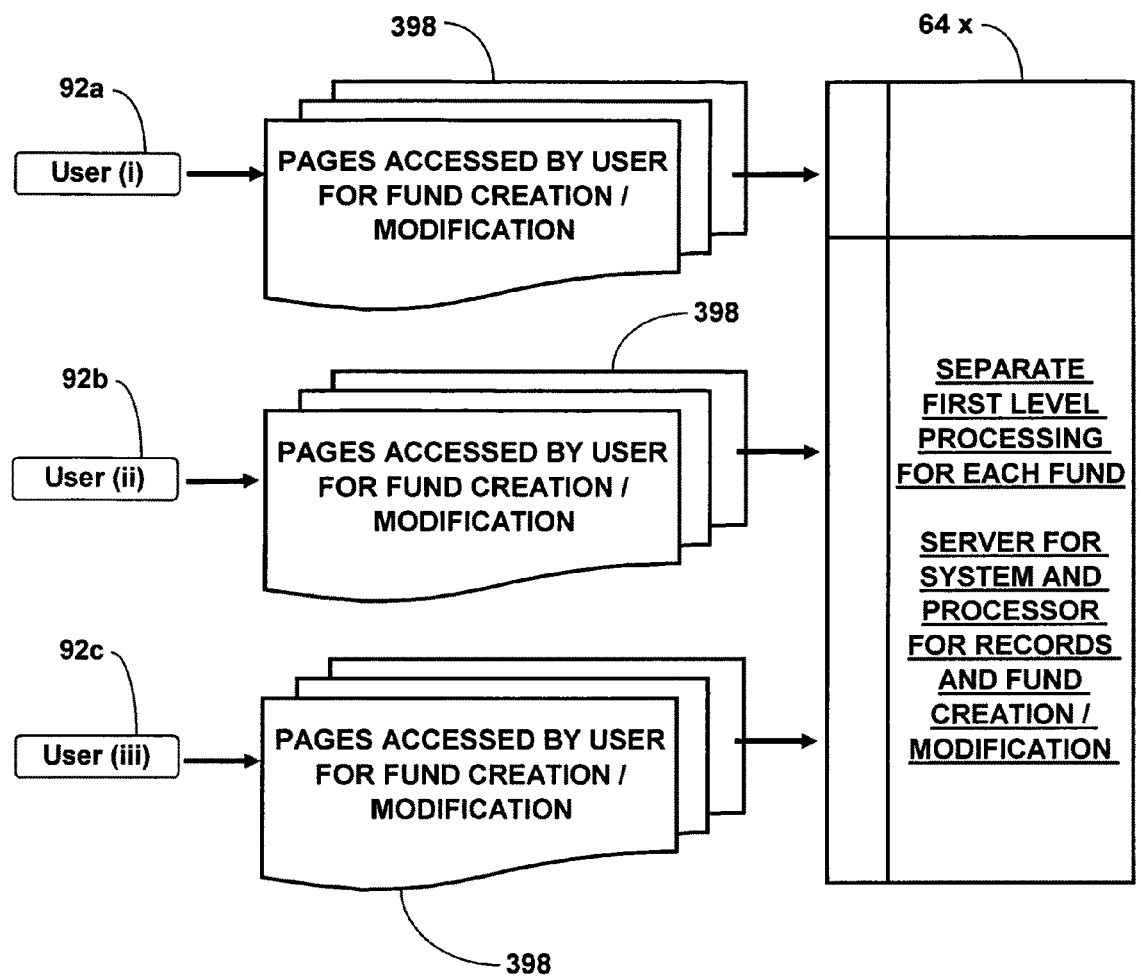

FIG. 27 shows a flowchart of the processing that occurs at a server processor for creating or modifying a fund according to the computer-based system of the preferred embodiment.

Figure 28:
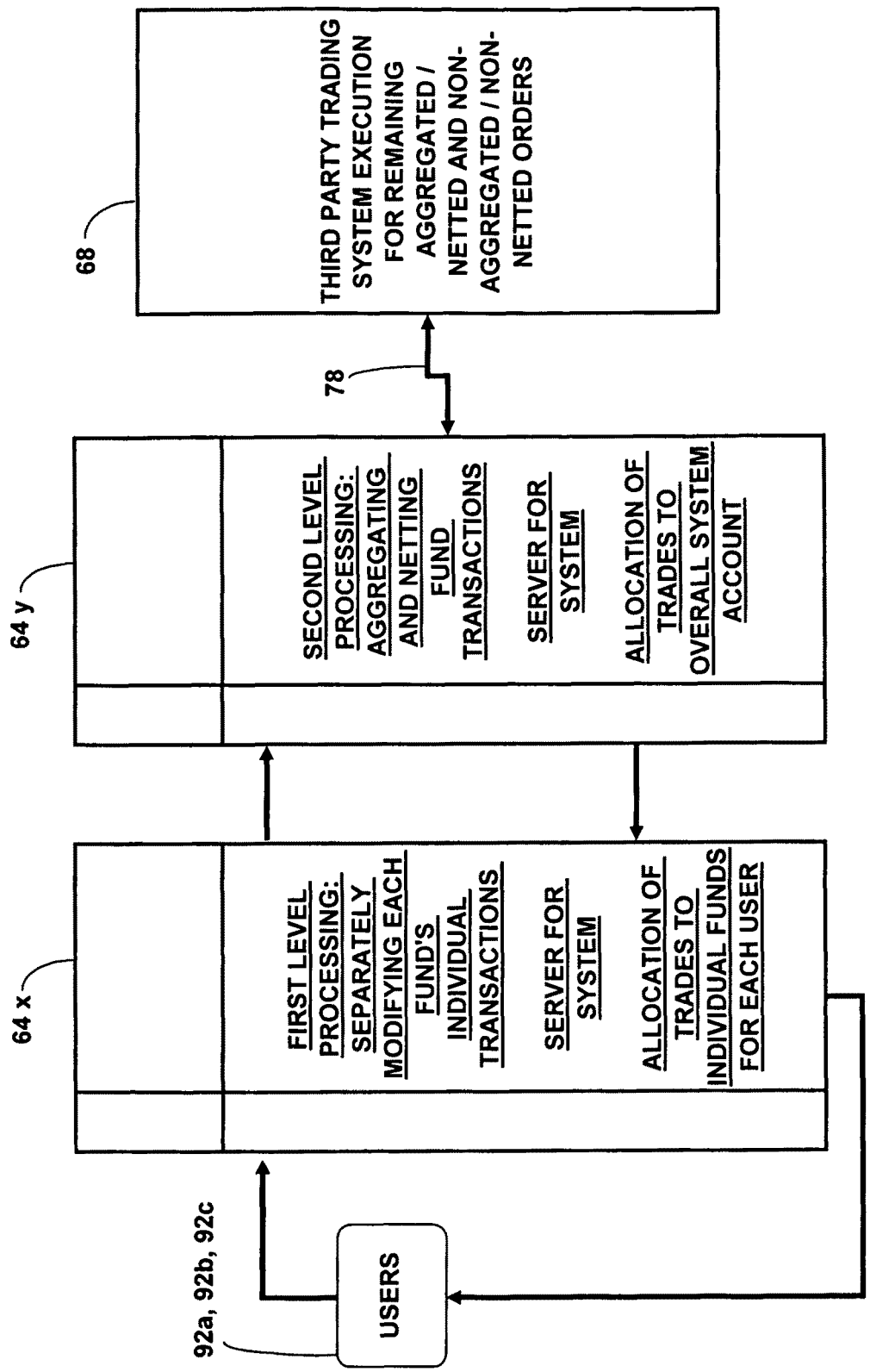

FIG. 28 depicts a flowchart of the trading order and transaction processing that occurs at the first level and second level with aggregating and netting trades of the preferred embodiment.

FIG. 29 depicts an example of the preferred embodiment's fund trade order and transaction processing for sample users.

FIG. 30 illustrates the preferred embodiment's aggregating and netting multiple funds' transactions and the inherent benefit.

Figure 31:
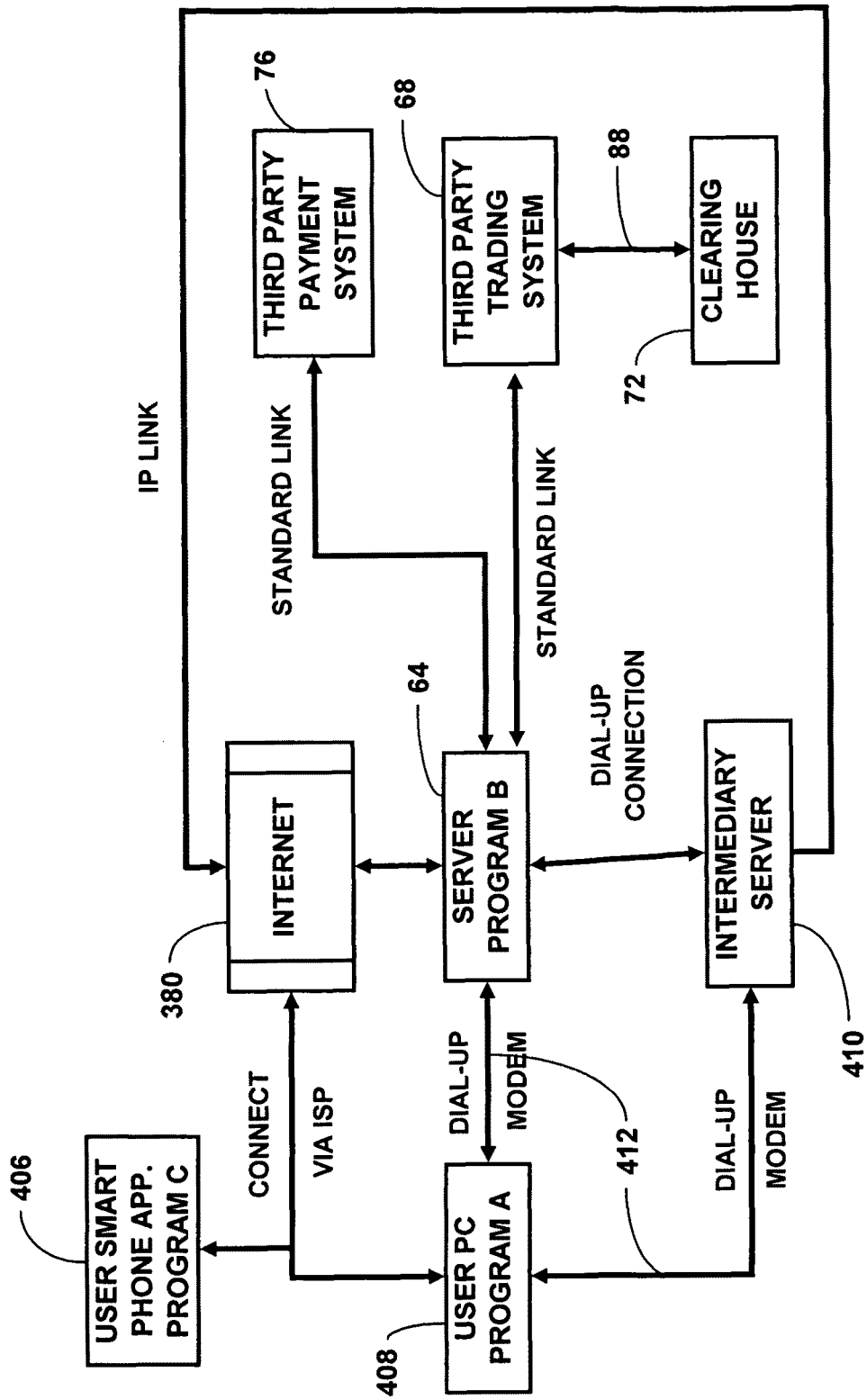

FIG. 31 depicts a block diagram of the preferred embodiment's computer-based system and the system links.

Figure 32:
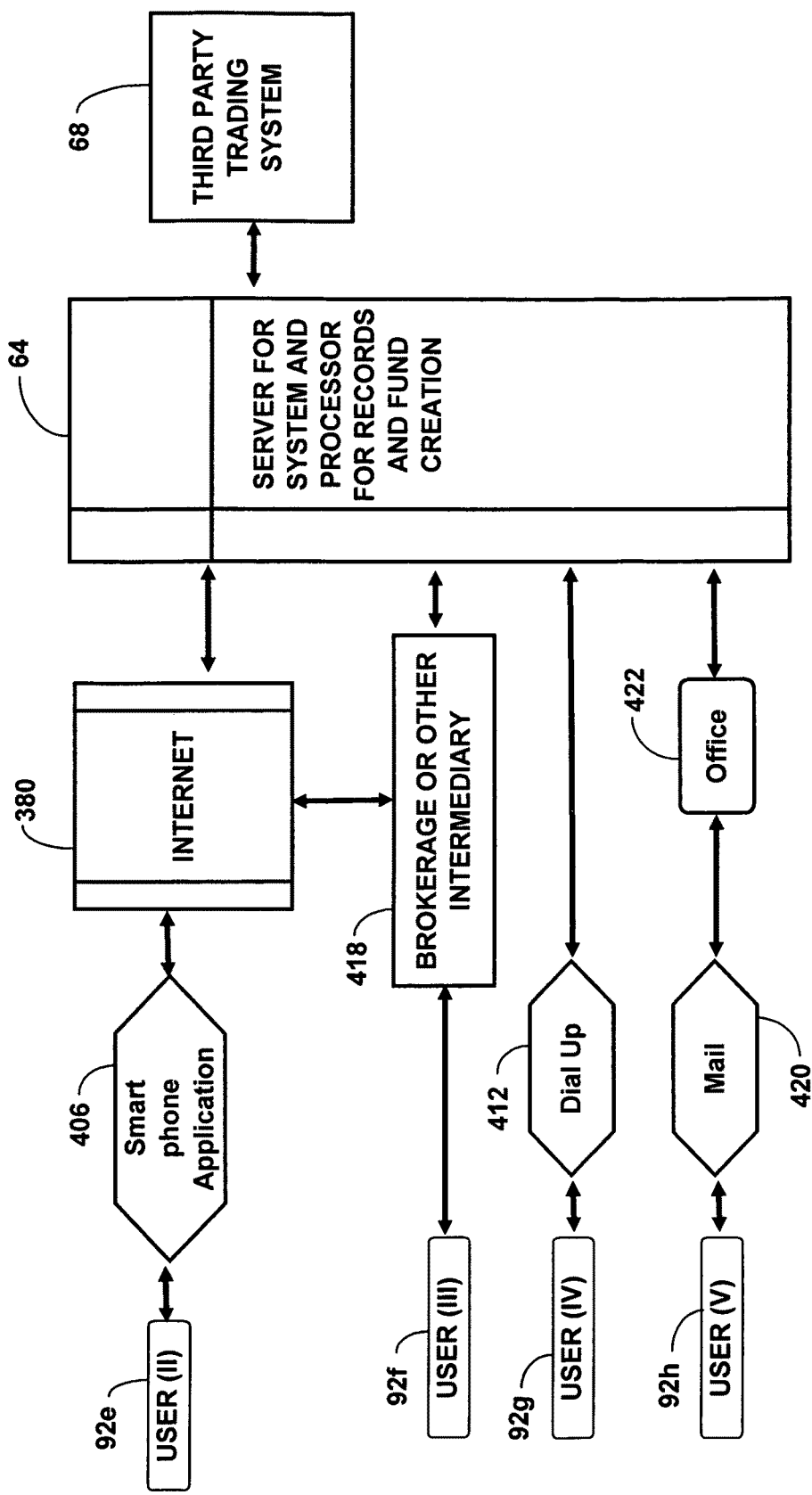

FIG. 32 illustrates in block diagram form various alternative embodiments to set up an account and create a fund.

Figure 33:
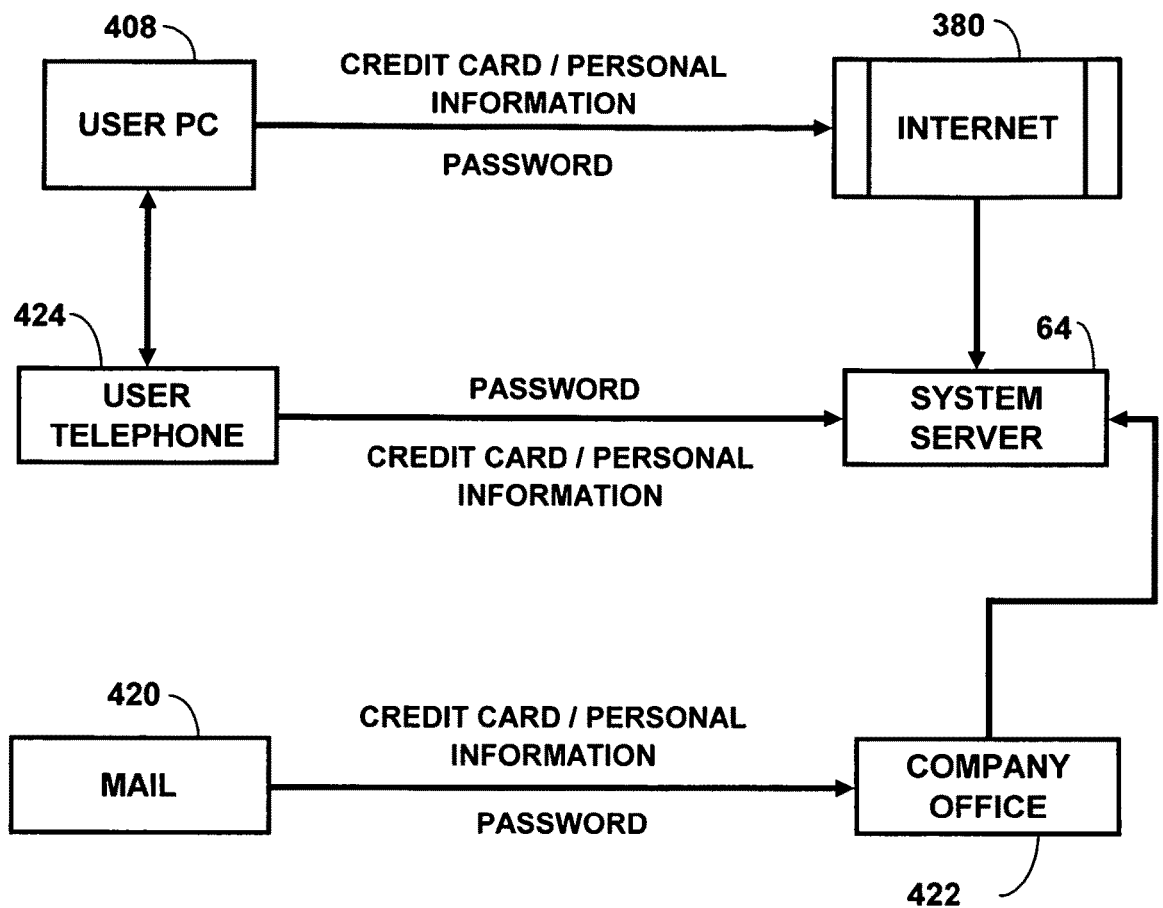

FIG. 33 shows various security mechanisms for transmitting sensitive information.

Figure 34:
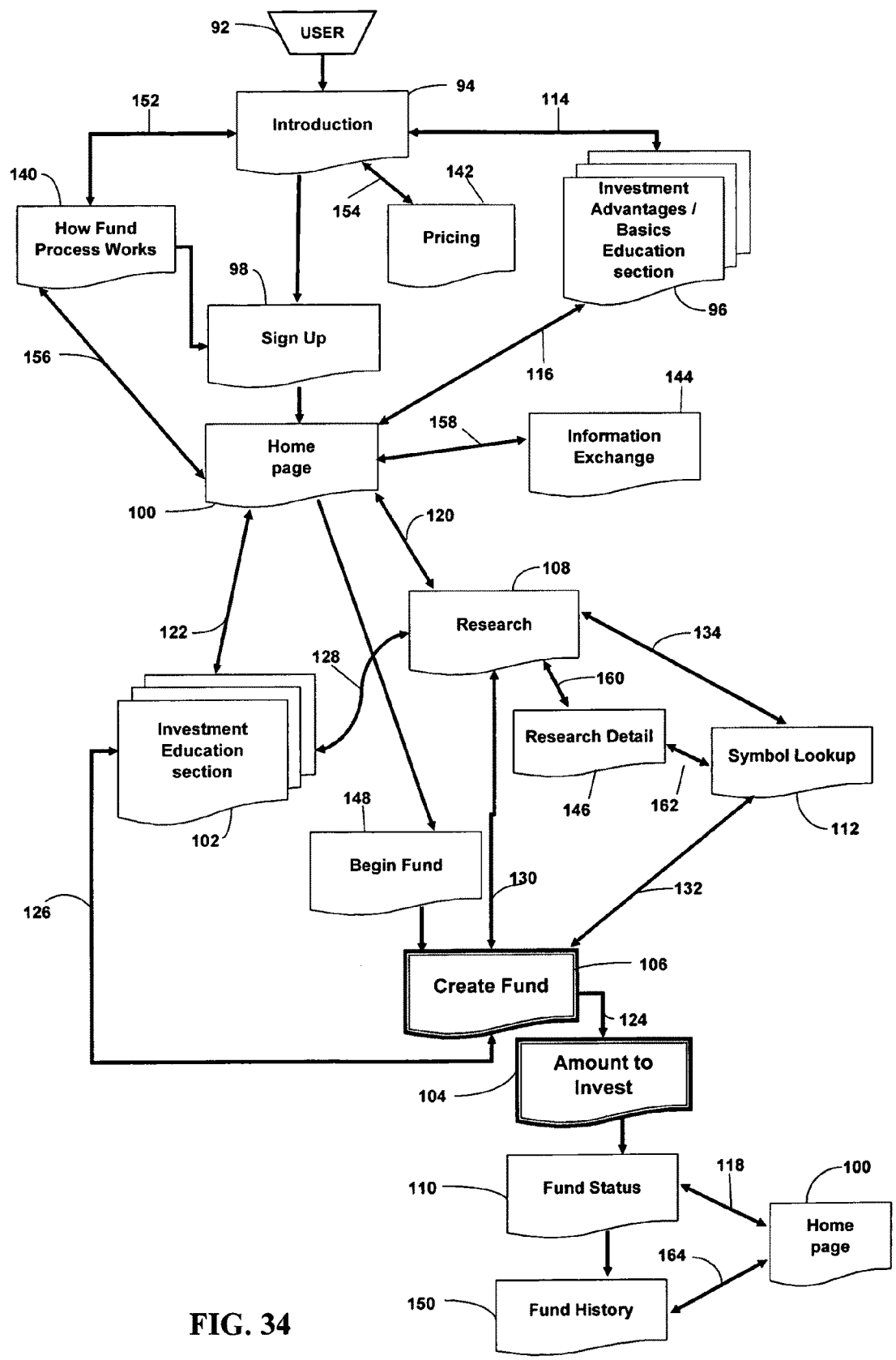

FIG. 34 depicts an alternative embodiment process flowchart for a new user.

Figure 35:
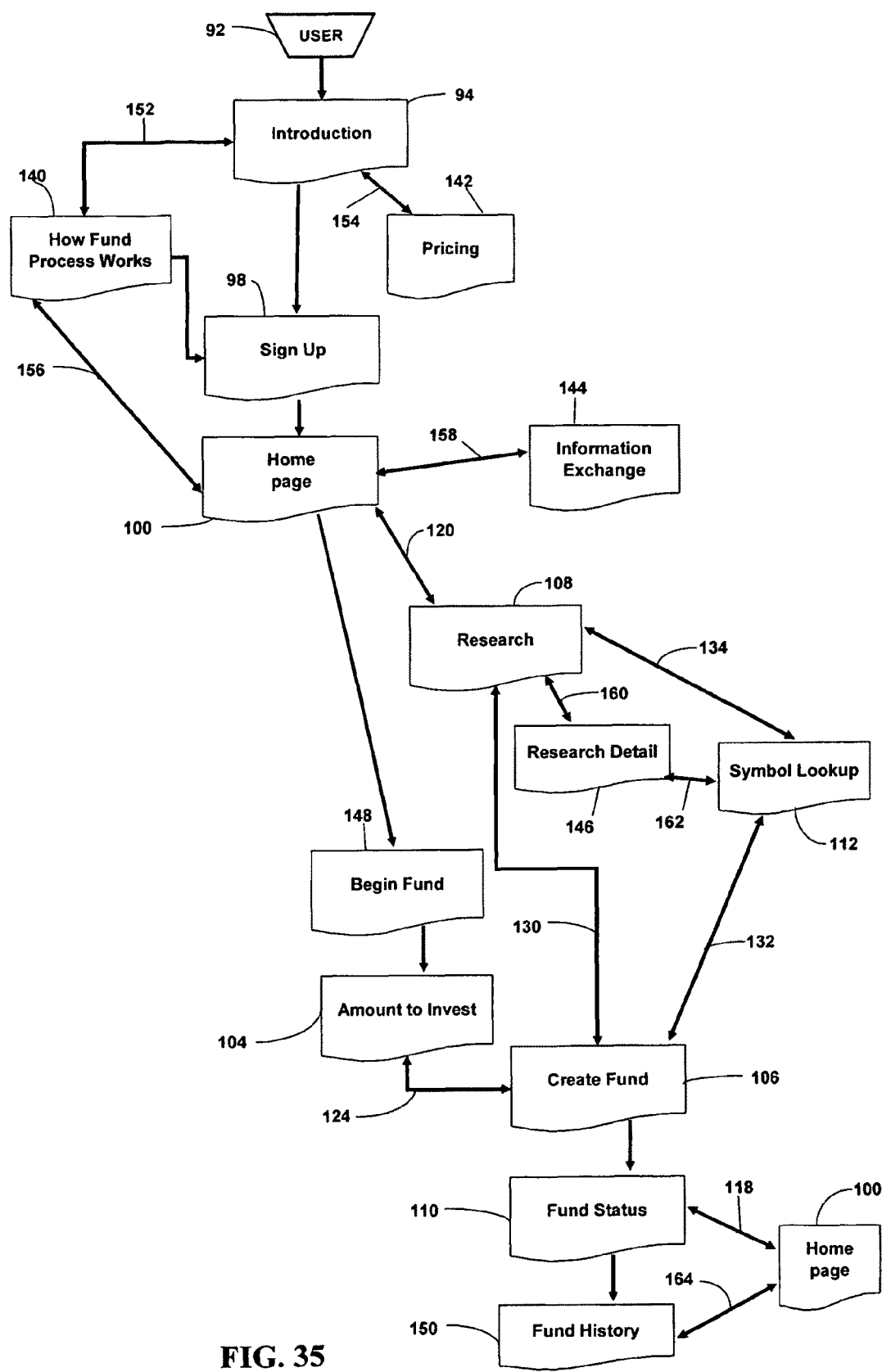

FIG. 35 details an alternative embodiment process flowchart excluding the Investment Tools' investment education components.

Figure 36:
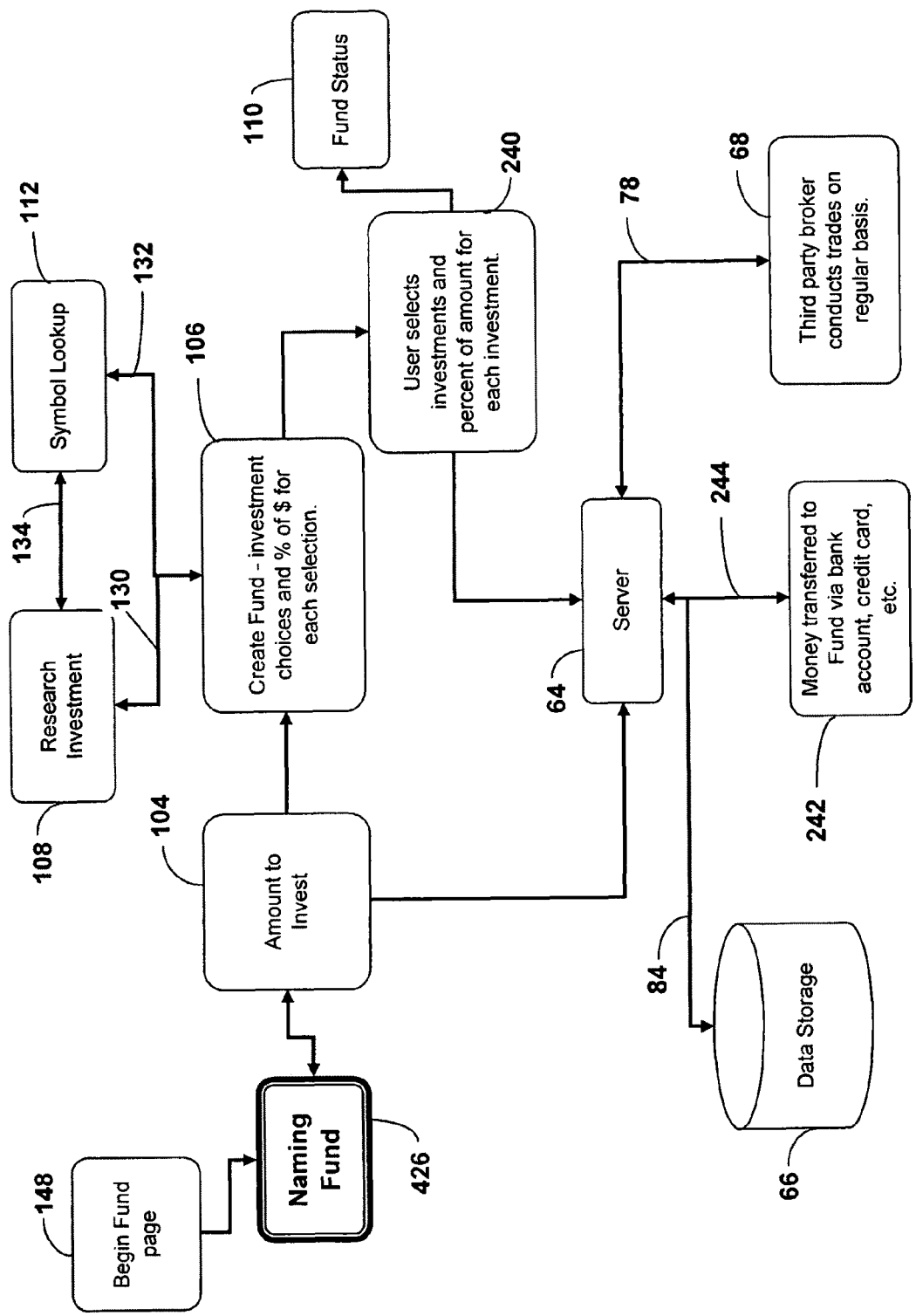

FIG. 36 shows an alternative embodiment block diagram where multiple funds can be created per user.

FIG. 37 is an example of an alternative embodiment use of the allocation process.

DRAWINGS

Reference Numerals

| # | PART NAME |
|---|---|
| 60 | User Input |
| 62 | Asset Selection/Invest Education Model |
| 64 | Server Processor |
| 66 | Data Storage |
| 68 | Third Party Trading System |
| 70 | Internal Payment System |
| 72 | Clearing House |
| 74 | Data Storage of Equities, Mutual Funds, Etc. |
| 76 | Third Party Payment System |
| 78 | 64 to 68 Connector |
| 80 | 64 to 74 Connector |
| 82 | 64 to 76 Connector |
| 84 | 64 to 66 Connector |

-continued

| # | PART NAME |
|---|---|
| 86 | 64 to 70 Connector |
| 88 | 68 to 72 Connector |
| 90 | New User Process Flow to Create Fund |
| 92 | User |
| 94 | Introduction |
| 96 | Invest Advantages/Basics Education section |
| 96A | Invest Advantages Education section |
| 96B | Investment Basics Education section |
| 98 | Sign Up |
| 100 | Home page |
| 102 | Investment Education section |
| 104 | Amount to Invest |
| 106 | Create Fund |
| 108 | Research |
| 110 | Fund Status |
| 110A | Fund Status New Fund |
| 110B | Fund Status Existing Fund |
| 112 | Symbol Lookup |
| 114 | 94 to 96 Connector |
| 116 | 96 to 100 Connector |
| 118 | 100 to 110 Connector |
| 120 | 100 to 108 Connector |
| 122 | 100 to 102 Connector |
| 124 | 104 to 106 Connector |
| 126 | 102 to 106 Connector |
| 128 | 102 to 108 Connector |
| 130 | 106 to 108 Connector |
| 132 | 106 to 112 Connector |
| 134 | 108 to 112 Connector |
| 136 | Unassigned |
| 138 | Unassigned |
| 140 | How Fund Process Works |
| 142 | Pricing |
| 144 | Information Exchange |
| 146 | Research Detail |
| 148 | Begin Fund |
| 150 | Fund History |
| 152 | 94 to 140 Connector |
| 154 | 94 to 142 Connector |
| 156 | 100 to 140 Connector |
| 158 | 100 to 144 Connector |
| 160 | 108 to 146 Connector |
| 162 | 112 to 146 Connector |
| 164 | 150 to 100 Connector |
| 166 | Unassigned |
| 168 | Unassigned |
| 170 | Investing Advantages Partial List of Topics: |
| 172 | Education - Return on Investment |
| 174 | Education - Asset Allocation |
| 176 | Education - Diversification |
| 178 | Other Investment Education Topics/Pages |
| 180 | Investing Basics Partial List of Topics: |
| 182 | Education - Inflation |
| 184 | Education - Time Value of Money |
| 186 | Education - Risk vs. Return |
| 188 | Education - Investing |
| 190 | Other Investment Basics Education Pages |
| 192 | Unassigned |
| 194 | Unassigned |
| 196 | General Definitions/Glossary |
| 198 | Brief History of Stock Market |
| 200 | Major U.S. Stock Exchanges |
| 202 | What is Stock, Mutual Fund, etc. pages |
| 204 | Other Investment Topics/Examples |
| 206 | Unassigned |
| 208 | Unassigned |
| 210 | Set up Fund or Education Decision Tree |
| 212 | Create Fund Process |
| 214 | User Creates Personal Profile |
| 216 | Unassigned |
| 218 | Unassigned |
| 220 | First Name input |
| 222 | Last Name input |
| 224 | Social Security Number input |
| 226 | Age input |
| 228 | E-Mail Address input |
| 230 | User ID input |
| 232 | Password input |

-continued

| # | PART NAME |
|---|---|
| 234 | Welcome New User icon |
| 236 | Unassigned |
| 238 | Unassigned |
| 240 | User selects investments, percentages |
| 242 | Money transferred from external account |
| 244 | 64 to 242 Connector |
| 246 | Unassigned |
| 248 | Unassigned |
| 250 | Symbol input |
| 252 | Allocation Percentage input |
| 254 | Total Allocated to Investments - running total |
| 256 | Created fund of investments |
| 258 | Symbol Lookup icon |
| 260 | Change Percentages icon |
| 262 | User chooses Investment Education sections |
| 264 | Examples of Risky, Non-Risky Investments |
| 266 | Unassigned |
| 268 | Unassigned |
| 270 | User clicks on Research icon |
| 272 | Investment Symbol decision tree |
| 274 | User types in Symbol and clicks Research |
| 276 | Unassigned |
| 278 | Unassigned |
| 280 | User clicks on Symbol Lookup icon |
| 282 | User types in part of company name |
| 284 | Choose symbol matching desired investment |
| 286 | Unassigned |
| 288 | Unassigned |
| 290 | Returning User General Process Flow |
| 292 | Returning User Sign On page |
| 294 | Allocation Graphs |
| 296 | Sell Investments |
| 298 | Purchase Investments |
| 300 | Transactions lead to all other transactions |
| 302 | Increase Monetary Balance page |
| 304 | Decrease Monetary Balance page |
| 306 | Fund Performance |
| 308 | Unassigned |
| 310 | Unassigned |
| 312 | User clicks on Fund History |
| 314 | User inputs dates to view history |
| 316 | User reviews history information |
| 318 | Unassigned |
| 320 | Unassigned |
| 322 | User clicks on Purchase icon |
| 324 | User inputs symbol, quantity, etc. |
| 326 | Does User have money decision tree |
| 328 | Purchase Request |
| 330 | Message: reduce purchase/money owed |
| 332 | Unassigned |
| 334 | Unassigned |
| 336 | User clicks on Sell icon |
| 338 | User inputs symbol, quantity to sell, etc. |
| 340 | User owns stock decision tree |
| 342 | Message indicating problem with sale |
| 344 | Number of shares in fund decision tree |
| 346 | Message sent to User detailing sale |
| 348 | Unassigned |
| 350 | Unassigned |
| 352 | Increase Monetary Balance icon |
| 354 | Input amount, method to send money |
| 356 | Message regarding monetary transaction |
| 358 | Unassigned |
| 360 | Unassigned |
| 362 | Reduce Monetary Balance icon |
| 364 | User inputs desired amount to withdraw |
| 366 | Amount to withdraw decision tree |
| 368 | Message: amount exceeds cash balance |
| 370 | Message: monetary transaction |
| 372 | $ transferred to External Financial Institution |
| 374 | Unassigned |
| 376 | Information Exchange message board |
| 378 | 92 a-d to 380 Connector |
| 380 | Internet |
| 382 | 380 to 64 Connector |
| 384 | 64 to 386 Connector |
| 386 | Database storing message board data |
| 388 | Unassigned |

-continued

| # | PART NAME |
|---|---|
| 390 | Unassigned |
| 392 | Unassigned |
| 394 | Unassigned |
| 396 | Unassigned |
| 398 | Pages accessed for fund create/modify |
| 400 | Unassigned |
| 402 | Unassigned |
| 404 | Unassigned |
| 406 | Smart Phone Application |
| 408 | User Personal Computer |
| 410 | Intermediary Server |
| 412 | Dial Up Modem Connection |
| 414 | Unassigned |
| 416 | Unassigned |
| 418 | Brokerage or Other Intermediary |
| 420 | Mail |
| 422 | Office |
| 424 | User Telephone |
| 426 | Naming Fund |

DETAILED DESCRIPTION

Figure 1:
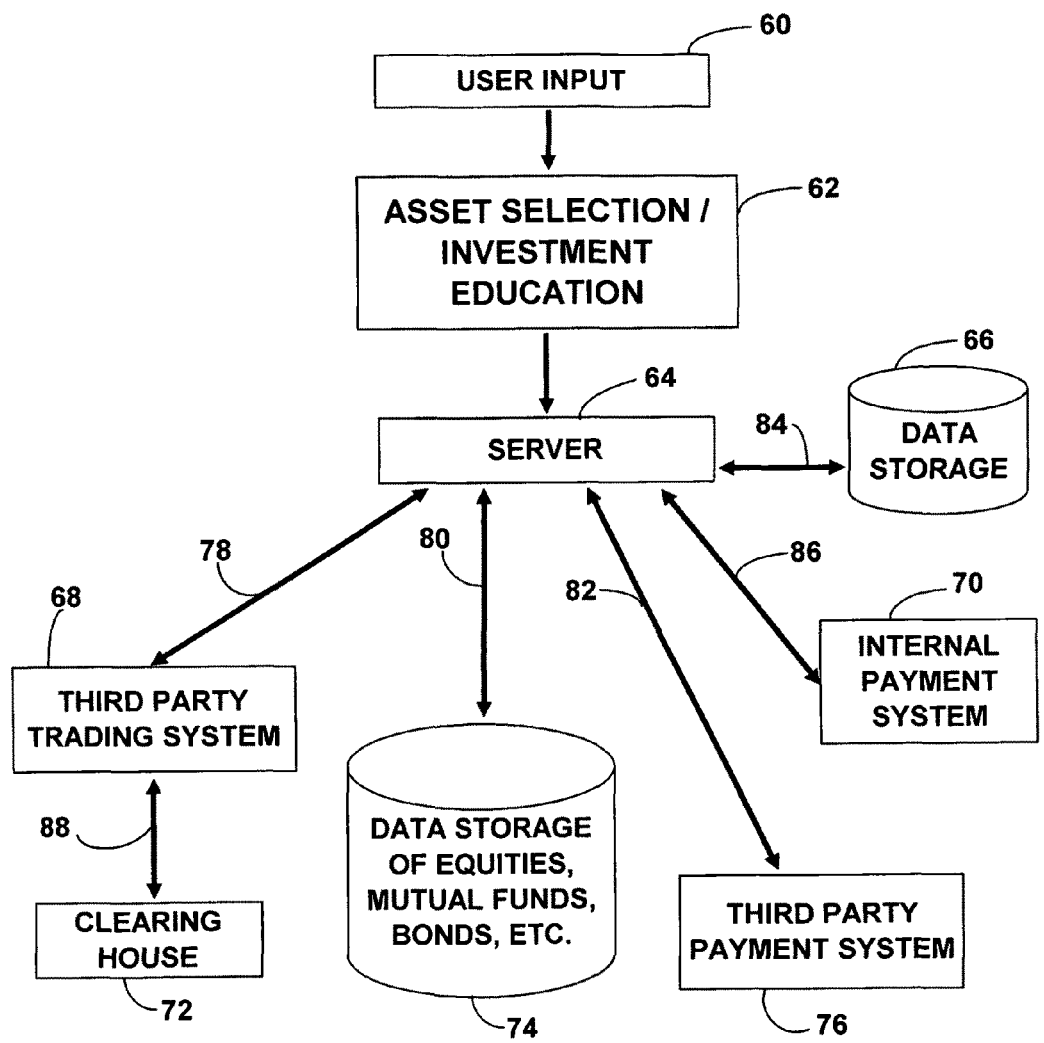
FIG. 1 illustrates, in block diagram format, the preferred embodiment of the basic process and system.
Figure 2:
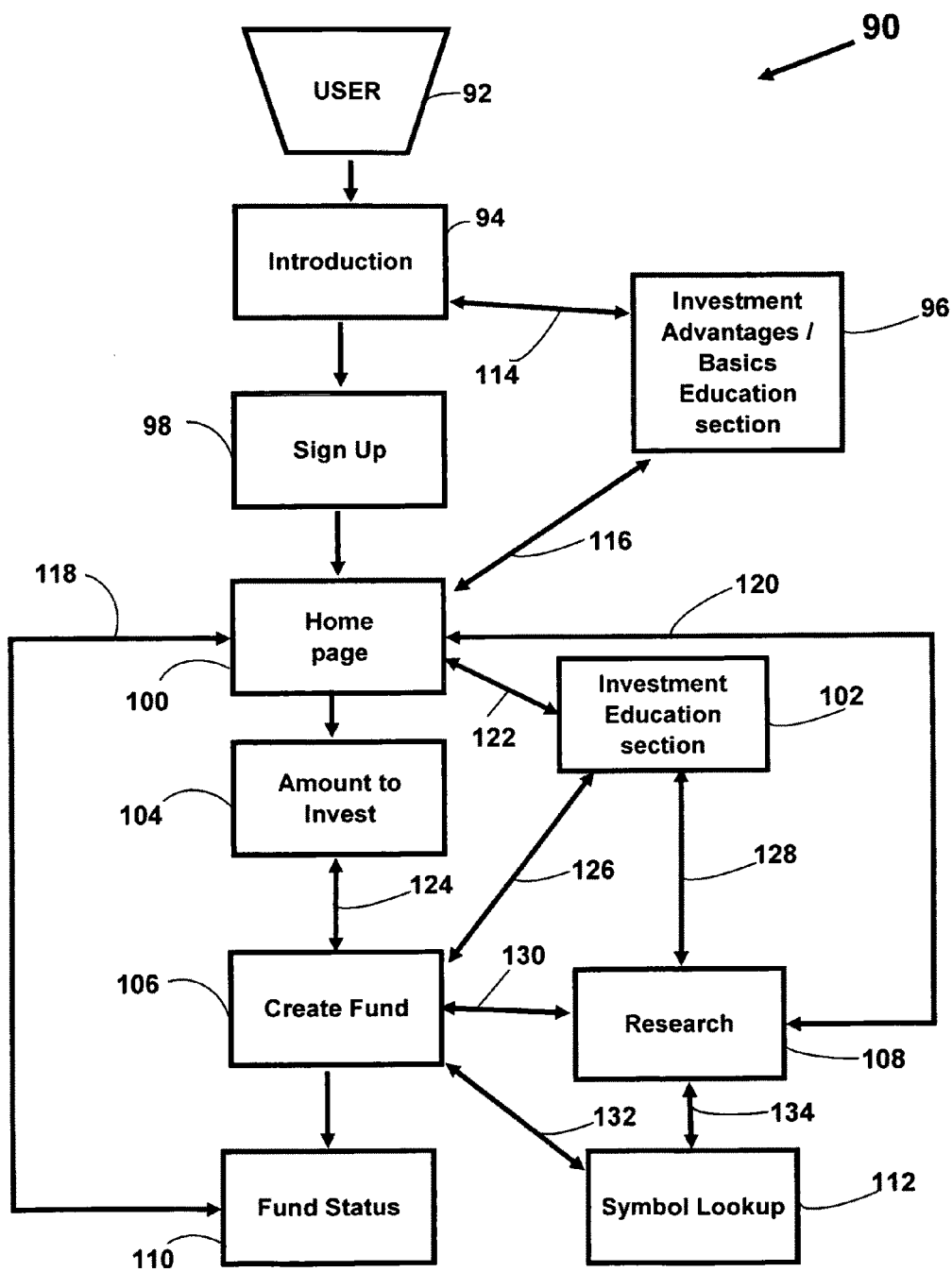
FIG. 2 shows the preferred embodiment's process flowchart for a new user proceeding through the primary pages to create an account and a customizable investment fund.

First Embodiment—FIG. 1 and FIG. 2

System Overview

One embodiment of the investment education and fund creation/modification/maintenance process and system is illustrated in FIG. 1. The system is comprised of a user input 60, an asset selection/investment education model 62, a server processor 64 with a data storage device 66, a second data storage device containing information regarding tradable assets and liabilities such as equities, mutual funds and bonds 74, a third party trading system 68 coupled with a clearing house 72, an internal payment system 70, and a third party payment system 76. The user provides input information 60 to the computer-based system and communicates with other system users through a user interface which is part of server processor 64. The computer-based system is networked with third party payment system 76 as well as third party trading system 68.

Server processor 64 transfers information back and forth to third party trading system 68 through a connector 78. Server processor 64 transfers information back and forth to data storage of tradable assets and liabilities 74 through a connector 80. Server processor 64 transfers information back and forth to third party payment system 76 through a connector 82. Server processor 64 transfers information back and forth to internal payment system 70 through a connector 86. Server processor 64 transfers information back and forth to data storage device 66 through a connector 84. Third party trading system 68 transfers information back and forth to clearing house 72 through a connector 88.

Process Flow Overview—User New to the Process and System

FIG. 2 depicts the general process flowchart for a user 92 who is new to the system, setting up an account, and creating a customizable investment fund or using the investment tools components in the preferred embodiment. User 92 accesses the preferred embodiment and is directed to an "Introduction" page 94. "Introduction" page 94 links to pages including investment concepts, how to create a customizable investment fund, fund pricing, investment tools components, and opening a new account.

From "Introduction" page 94, user 92 can choose investment tools such as an "Investment Advantages/Basics Education" section 96 where user 92 can learn about the advantages of investing including diversification and risk versus return. User 92 can return to "Introduction" page 94 through a connector 114.

To open an account in the preferred embodiment, from "Introduction" page 94, user 92 clicks on an icon to go to a "Sign-up" page 98. At "Sign-up" page 98, user 92 enters pertinent personal identification information and creates a unique ID (i.e. user name) and password. Next user 92 is directed to a "Home" page 100. From "Home" page 100, user 92 can choose options such as an "Investment Education" section 102 or a "Research" page 108.

If user 92 wants to design his/her own fund and select his/her own investments of market tradable items including assets and liabilities based on such factors as his/her risk tolerance, investment time horizon and financial situation, user 92 would choose the process to create a customizable investment fund and proceed to an "Amount to Invest" page 104.

To create a customizable fund, from "Home" page 100, user 92 first selects "Amount to Invest" page 104, chooses a money transfer strategy, and decides on a monetary amount to invest. The money transfer strategy enables user 92 to select a method to transfer a monetary amount from user 92's bank account, brokerage account, credit card, or via commercial paper (defined as a check or money order). The money transfer strategy can be electronic funds transfer or a physical funds transfer. After the amount to invest has been entered in "Amount to Invest" page 104, user 92 goes to a "Create Fund" page 106. On "Create Fund" page 106, user 92 selects the investment vehicles to purchase for the customizable investment fund and develops a weighting strategy by choosing the percentage of the investment amount he/she wants to allocate to each investment vehicle. During the fund creation process, user 92 can increase or decrease the amount to invest by returning to "Amount to Invest" page 104 via a connector 124.

User 92 can research investment vehicles by going to "Research" page 108, or if user 92 does not know the investment vehicle symbol, user 92 can look up an investment vehicle symbol in a "Symbol Lookup" page 112. From "Research" page 108 or "Symbol Lookup" page 112, user 92 can return to "Create Fund" page 106 with a connector 130 and a connector 132 respectively. User 92 can access "Home" page 100 from "Research" page 108 via a connector 120. User 92 can go back and forth between "Research" page 108 and "Symbol Lookup" page 112 with a connector 134.

On "Create Fund" page 106, user 92 clicks a "Finished with Fund" icon and the system retrieves and stores the buy and sell trade orders for execution, executes the trading orders, and then reports the trade order details to user 92. After the customizable investment fund is created, user 92 is directed to a "Fund Status" page 110 where user 92 views the fund he/she just created. From "Fund Status" page 110, user 92 has the option to go to "Home" page 100 through a connector 118.

"Investment Education" section 102 can be accessed from "Create Fund" page 106 and "Research" page 108 with a connector 126 and a connector 128 respectively. "Investment Education" section 102 can be accessed from "Home" page 100 through a connector 122. From "Home" page 100, user 92 can access "Investment Advantages/Basics Education" section 96 through a connector 116. User 92 can also be directed to other pages, for example, if user 92 wants to view the fund history or logoff the system.

Operation

First Embodiment—FIG. 3 Through FIG. 31

Process Flow Detail—New User

FIG. 3 depicts the detailed process flowchart of the preferred embodiment for user 92 who is new to the process. User 92 accesses the preferred embodiment and is directed to "Introduction" page 94. "Introduction" page 94 explains the concept of designing one's own fund of investments based on user 92's criteria, risk tolerance, timeframe, and investment selections.

From "Introduction" page 94, user 92 can access a "Pricing" page 142. "Pricing" page 142 provides pricing for creating and modifying the fund, including the price of the initial fund set-up as well as prices for additional investment transactions. "Pricing" page 142 links back to "Introduction" page 94 via a connector 154. User 92 can access a "How Fund Process Works" page 140 from "Introduction" page 94 through a connector 152. "How Fund Process Works" page 140 describes the process of creating an inexpensive, customized investment fund based on user's 92 investment criteria, investment choices, timeframe, and risk tolerance.

Another option from "Introduction" page 94 is "Investing Advantages/Basics Education" section 96. "Investing Advantages/Basics Education" section 96 is part of the investment tools educational component of the preferred embodiment. "Investing Advantages/Basics Education" section 96 explains investing concepts such as return on investment, diversification, risk versus return, and inflation. "Investing Advantages/Basics Education" section 96 also explains investing concepts such as time value of money and the basics of investing. All pages connected from "Introduction" page 94 link back to "Introduction" page 94. For example, as seen in FIG. 3, user 92 on "Pricing" page 142 can link back to "Introduction" page 94 through connector 154. Finally, "Introduction" page 94 links to "Sign Up" page 98.

At "Sign Up" page 98, user 92, who is new to the system, enters his/her personal identification information as well as a unique User ID and password to create an account. This personal identification information includes user 92's first name, middle name, last name, street address, city, state, various personal phone numbers, social security number, and age. After user 92's personal identification information has been entered into the data input fields on "Sign Up" page 98, user 92 is then directed to "Home" page 100. "Home" page 100 links to "How the Fund Process Works" page 140 through a connector 156. "Home" page 100 also links to investment tools' "Investment Education" section 102 through link 122. "Investment Education" section 102 includes topics such as General Investment Definitions, Glossary of Investing Terms and Concepts, a Brief History of the Stock Market, Major U.S. Stock Exchanges, What is a Stock, What is a Mutual Fund, What is a Bond, and other investment education components. "Investment Education" section 102 also contains pages where user 92 can view educational videos on how to invest, examples of investing, and what to look for when researching stocks, bonds, mutual funds, and other investment vehicles. "Home" page 100 links directly to investment tools' "Investment Advantages/Basics Education" section 96 through connector 116.

Another option from "Home" page 100 is an "Information Exchange" component 144. "Information Exchange" component 144, which is an on-line message board system, enables user 92 to interact with other users of the preferred embodiment. User 92 can pose questions on "Information Exchange" component 144, answer questions, locate and view other questions and answers posted on the on-line message board system, and discuss investment tools, investment vehicles, investing strategies such as focusing on certain stocks given a specific investment timeframe, and other investment topics with other users who are members of the preferred embodiment.

"Home" page 100 links to "Research" page 108 through connector 120. "Research" page 108 enables user 92 to research investment vehicles. When user 92 is on "Research" page 108 and enters an investment vehicle symbol in "Research" page 108, user 92 is directed to a "Research Detail" page 146. "Research Detail" page 146 enables user 92 to view pertinent investment information, financial ratios, and current news on an investment vehicle. If user 92 does not know the symbol of the investment vehicle, user 92 can go from "Research" page 108 to "Symbol Lookup" page 112 via connector 134 and manually input part of an investment vehicle name. "Symbol Lookup" page 112 then shows a list of investment vehicle names either matching or including the partial name that user 92 entered in "Symbol Lookup" page 112. "Research Detail" page 146 links to "Symbol Lookup" page 112 via a connector 162.

All aforementioned pages that can be accessed from "Home" page 100 also link back to "Home" page 100.

If user 92 wants to create a customized investment fund based on his/her timeframe, risk tolerance and investment choices, then from "Home" page 100, user 92 accesses a "Begin Fund" page 148. "Begin Fund" page 148 links to "Amount to Invest" page 104 where user 92 enters the amount he/she wants to invest in the initial fund. User 92 selects a money transfer strategy by choosing a method to transfer money. The method to transfer money includes an electronic funds transfer from a bank account, brokerage account, or credit card funds transfer, or a non-electronic commercial paper (i.e. check or money order) funds transfer to the preferred embodiment.

"Amount to Invest" page 104 then links to "Create Fund" page 106. On "Create Fund" page 106, user 92 selects the investments and the percentage of the total amount invested to be allocated to the investments in user 92's fund. The investments used in this example are market tradable items including assets and liabilities. The investments selected for the customizable investment fund are based on user's 92 personal specifications such as risk tolerance, timeframe, investment strategies, and personal preferences. The cost of creating this diversified individual fund is dramatically less expensive than the fees associated with existing diversified portfolios such as mutual funds. On "Create Fund" page 106, user 92 can access "Amount to Invest" page 104 through connector 124, change the amount to invest before the fund is finalized, and return back to "Create Fund" page 106 through connector 124.

Once user 92 is satisfied with the investment choices and amount to invest, user 92 finalizes the fund on "Create Fund" page 106. User 92 is directed to "Fund Status" page 110 which details the fund he/she created. From "Fund Status" page 110, user 92 can go to a "Fund History" page 150 which shows all the trading orders and transactions for user 92's fund. From either "Fund Status" page 110 or "Fund History" page 150, user 92 can return to "Home" page 100 through connector 118 or a connector 164, respectively.

Investment Tools—Investment Education

"Investment Advantages/Basics Education" section 96 shown in both FIG. 2 and FIG. 3 is detailed in FIG. 3A. Investment tools are designed to enable user 92 to gain investing knowledge and make better investing decisions. Investment tools encompass "Investment Advantages/Basics Education" section 96, "Investment Education" section 102, and "Information Exchange" component 144. An "Investing Advantages" section 96A includes various "advantages of investing" concepts and topics. "Investing Advantage" section 96A includes a "Return on Investment" 172 component which explains the concept of return on investment, understanding the concept, and using the return on investment concept when comparing investment vehicles. "Investing Advantage" section 96A includes an "Asset Allocation" module 174 which discusses various asset classes and the benefits of allocating investments to various asset classes; a "Diversification" component 176 that defines diversification, explains the benefits of diversifying investments as opposed to investing all the money into one investment vehicle, and gives examples of diversification. "Investing Advantage" section 96A also contains an "Other Investment Educational Topics" section 178 with other investing advantage topics.

"Other Investment Educational Topics" section 178, for example, discusses various strategies for investing. An example of a strategy that user 92 can employ in creating his/her fund is a strategy to invest in the ten of the thirty stocks comprising the Dow Jones Industrial Index that have performed the most poorly in the past calendar year. The expectation is that these ten stocks, also known as "Dogs of the Dow", will then outperform the index in the succeeding calendar year.

Ordinarily, an individual who wants to follow this strategy purchases an interest in a unit investment trust. Each year the trust liquidates and an individual wishing to continue the strategy must purchase a new interest in a new trust in the next year. If an individual wants to buy nine stocks instead of ten stocks that most under-performed, there is currently no good mechanism for doing so. But with the preferred embodiment, user 92 can create a fund based on this strategy.

As another example, a selection of securities that is prepackaged could be recommended to user 92, such as an investing magazine's picks, an analyst or investment bank's selections, or an organization's preferences. In each case user 92 obtains the benefits directly owning selected securities as opposed to an interest in a fund or trust.

An "Investing Basics Education" section 96B discusses the basics of investing if user 92 is not educated in investing, but wants to learn. "Investing Basics Education" section 96B includes investing topics such as an "Inflation" section 182 which defines inflation, contains graphs charting inflation over time, and gives examples of inflation and how inflation affects money and savings. "Investing Basics Education" section 96B also includes a "Time Value of Money" component 184 which explains the concept of time value of money and gives examples of the concept; a "Risk versus Return" module 186 which explains risk versus return, risk tolerance levels, risk aversion, how to determine your level of risk tolerance, and examples of risk versus return; an "Investing" component 188 which includes videos on investing strategies and investing examples, and an "Other Investment Basics Educational Topics" module 190.

"Investment Education" section 102 shown in both FIG. 2 and FIG. 3 is detailed in FIG. 3B. "Investment Education" section 102 includes sections such as a "General Definitions and Glossary of Investing Terms and Concepts" module 196 which contains many definitions of investing concepts and terms as well as a glossary of investment and finance terms and acronyms; a "Brief History of the Stock Market" section 198 which gives a history of the origins of the stock market from its inceptions to the present day; a "Major U.S. Stock Exchanges" component 200 which lists the major U.S. stock exchanges, their uses, and the types of companies that are listed on each exchange; a "What is a Stock, What is a Mutual Fund, and What is a Bond" module 202 which defines stocks, mutual funds, and bonds and lists the advantages and disadvantages of each one; and an "Other Investment Topics/Examples" component 204. "Other Investment Topics/Examples" component 204 can provide user 92 with financial news, alerts on investment vehicles, investment quizzes, and links to other financial websites.

New User Account Creation and Money Transfer Strategy

FIG. 4 details the process flowchart for user 92 to create an account and then create a fund or choose the investment tools' investment education sections. In the preferred embodiment, user 92 accesses "Introduction" page 94. User 92 chooses to create an account and is directed to "Sign Up" page 98. User 92 completes the personal identification information on "Sign Up" page 98 and creates a unique profile 214. Unique profile 214 includes a unique User ID and password. User personal identification information in unique profile 214 is sent to server processor 64 then to data storage 66 where it is securely stored. User 92 is then directed to "Home" page 100. In a decision tree 210, user 92 has the option of going to a create fund process 212 or going to the investment tools components. These investment tools components include "Investment Advantages/Basics Education" section 96 and "Investment Education" section 102.

FIG. 5 depicts a sample "Sign Up" page 98 which is accessed to create a new account and personal profile in the preferred embodiment. All users 92 new to the system must create a new account and enter their personal identification information in "Sign Up" page 98.

As can be seen in FIG. 5, "Sign Up" page 98 requests personal identification information such as first name, middle name, last name, address, city, state, zip code, home and work phone telephone numbers, social security number, occupation, age, and e-mail address. This personal identification information is entered by user 92 into the data entry fields. Some of the data entry fields are required for user 92 to sign up for an account. These fields include a First Name data entry field 220, a Last Name data entry field 222, a Social Security Number data entry field 224, an Age data entry field 226, an E-Mail Address data entry field 228, a User ID data entry field 230, and a Password data entry field 232.

User 92 must be at least 18 years old to create an account in the preferred embodiment. User 92's age that is entered into Age data entry field 226 in "Sign Up" page 98 will be validated to determine if user 92 is under the age of 18. If the age entered into Age data entry field 226 is computed to be less than 18, a message shown to user 92 specifies that user 92 must be at least 18 years old to sign up.

In "Sign Up" page 98, user 92 is required to create a unique User ID and password that will be used by the system to identify user 92, and will be used in the preferred embodiment when user 92 creates the initial fund as well as accesses the system in the future. The use of a unique User ID and password for each user 92 of the system will help ensure that no other user can access or modify the fund created by the specific user 92. The User ID that is entered into User ID data entry field 230 will be checked to see if it meets the criteria of being between a certain minimum and maximum length and will be checked against data storage 66 of existing users 92 to verify and authenticate that the User ID is unique. This ensures the security of user 92's personal identification information.

The password that user 92 creates in Password data entry field 232 will also be checked to see if it meets the criteria of being between a certain minimum and maximum length. This will also ensure the security of user 92's information.

When user 92 clicks on a "Welcome New User" icon 234 at the bottom of "Sign Up" page 98, all the data entry fields that user 92 completes in "Sign Up" page 98 are checked to ensure that the required fields are completed and accurate (i.e. no letters in the telephone fields).

After user 92 clicks on "Welcome New User" icon 234 at the bottom of "Sign Up" page 98 and after all the data entry fields are completed and accurate, a confirmation e-mail will be sent to new user 92 verifying that he/she successfully signed up on the preferred embodiment.

Customized Investment Fund Creation

FIG. 6 shows the preferred embodiment's process flowchart for a new user transferring money into user 92's account and creating a fund. When user 92 who is new to the system chooses to create a fund, user 92 is directed to "Begin Fund" page 148. From "Begin Fund" page 148, user 92 is directed to "Amount to Invest" page 104 where user 92 inputs the amount he/she wants to invest in the fund. The input amount must be a positive value. For the deposit, user 92 selects a money transfer strategy to transfer funds from his/her bank account, brokerage account, credit card, or by commercial paper (i.e. check or money order).

After user 92 finalizes the amount to invest, "Amount to Invest" page 104 communicates the amount entered to server processor 64. Server processor 64 then communicates with data storage 66 through connector 84. Server processor 64 also communicates with an Institution (i.e. bank, brokerage, etc.) that is Transferring Money 242 to the preferred embodiment through a connector 244. Institution that is Transferring Money 242 transfers the money to the preferred embodiment and the transaction detail information is sent through connector 244 to a monetary tracking system in server processor 64. Server processor 64 communicates the transaction information to data storage 66 where the transaction information is securely stored.

User 92 is then directed to "Create Fund" page 106 from "Amount to Invest" page 104. On "Create Fund" page 106, user 92 selects the investment vehicles he/she wants in the customizable investment fund and develops a weighting strategy by selecting a percentage of the total amount in the fund to be allocated to each of the selected investment vehicles as seen in a process step 240.

User 92 can access "Research" page 108 or "Symbol Lookup" page 112 from "Create Fund" page 106 through connectors 130 and 132 respectively if user 92 wants to research an investment vehicle or needs to look up the symbol of an investment vehicle he/she wants to select for his/her customizable fund creation. User 92 can link back to "Create Fund" page 106 from "Research" page 108 through connector 130 and user 92 can link back to "Create Fund" page 106 from "Symbol Lookup" page 112 through connector 132.

In "Create Fund" page 106, user 92 can change the total amount to invest by linking back to "Amount to Invest" page 104 before the fund is finalized. User 92 can modify the percentage allocated to each investment vehicle during the create fund process on "Create Fund" page 106. Any unallocated money will go to the money market fund housed in user 92's fund. User 92 can invest the unallocated money in the future. In "Create Fund" page 106, user 92 has the option to reinvest the dividends if the investment vehicle selected allows for dividend reinvestments.

There is a dollar cost averaging feature for user 92 who wants to invest on a regularly scheduled basis such as weekly, monthly, etc. User 92 issues a standing order that money is to be transferred automatically from a personal account into the fund on a regular (i.e., semi-monthly) basis. When the automatic transfers are made, the money is invested according to a standing allocation order that user 92 issues. The periodic monetary contribution order can be modified at any time in the event user 92 decides to shift his/her investment strategy.

This periodic monetary contribution feature is useful for utilizing the fund as a tax-deferred payroll deduction type of investment vehicle (i.e., for use with 401(k) plans).

When user 92 is satisfied with his/her investment choices for the customizable investment fund in process step 240, user 92 clicks a "Finished with Fund" icon on "Create Fund" page 106. This single instruction via the computer user interface sets in motion the trading orders and user 92 is then directed to "Fund Status" page 110. The orders in "Fund Status" page 110 are based on the current per-share prices because the trading orders are not yet final. User 92 has the option of immediate trade execution or user 92 can select the normal fund creation option where the orders to trade would be performed later that day and would be aggregated with other user's trading orders. The information containing the investment vehicle selections and number of shares—including odd lots, single shares, and fractional shares—is sent to server processor 64 from process step 240. Server processor 64 sends the share transaction requests to third party broker 68 through connector 78. Third party broker 68 conducts the trades of the investment vehicles on a regular basis, possibly hourly. The actual trading price information and share amounts are sent from third party broker 68 to server processor 64. The investment name, investment symbol, purchase price and share amount information for each trade transaction is sent from server processor 64 to data storage 66 where the transaction information is securely stored, and "Fund Status" page 110 is updated with the actual trade prices and share quantities.

For those investment vehicles in the customizable fund that have special items such as dividends, the dividend transactions modify the customizable investment fund by increasing the number of shares (if the dividends are reinvested) for that investment vehicle or by increasing the money market fund with the dividend proceeds.

The information stored represents the transaction rather than the cumulative results of the transactions. It is better to store data representing the transactions rather than to store the cumulative results (i.e., user's 92 fund balances of earnings, principal, money, etc.) of the transactions.

FIG. 7 illustrates a sample "Create Fund" page 106 where user 92 selects the investment vehicles and assigns allocation percentages to each selected investment. On "Create Fund" page 106, as shown in FIG. 7, user 92 enters the investment vehicle symbol into a "Symbol" data entry field 250. Server processor 64 looks up the symbol to verify if it is valid (i.e. if the symbol is associated with a publicly traded stock, mutual fund, etc.). If the symbol is not valid, user 92 is instructed to go to "Symbol Lookup" page 112 (as seen in FIG. 3) via a "Symbol Lookup" icon 258 on "Create Fund" page 106 to look up the correct investment symbol for the investment vehicle user 92 wants. If the symbol is valid, the name of the investment vehicle (i.e. stock, bond, mutual fund, or other investment vehicle) is automatically filled in to the right of "Symbol" data entry field 250 in the "Company/Mutual Fund Name" data field directly below the "Company/Mutual Fund Name" title.

User 92 then creates a weighting strategy by entering the allocation percentage of the total fund's monetary amount he/she wants to allocate to that specific investment vehicle into an "Allocation Percentage" data entry field 252. The percentage allocation for each selected investment vehicle must be positive and less than or equal to 100%. For example, user 92 has $2,000 to invest into his/her fund as seen in the example in FIG. 7. If user 92 wants to invest in the company Johnson & Johnson and have the company in his/her initial fund, user 92 would type "JNJ" into "Symbol" data entry field 250. If user 92 wants to allocate 10% of the total fund's monetary amount to Johnson & Johnson's stock, user 92 would type "10" into "Allocation Percentage" data entry field 252.

The amount in the "Money Allocated" data field is automatically computed. The "Allocated % Total" data field computes a running summary of the total percentage of the money invested by user 92. User 92 can only allocate up to 100% of his/her money invested in the fund. Once user 92 decides on a specific investment vehicle and the allocation percentage for that investment vehicle, user 92 clicks the "Add to Fund" icon located to the right of "Symbol Lookup" icon 258. The specific investment vehicle and corresponding percentage allocation is added to the fund. A "Total Money Allocated" data field 254 tracks an automatic running summary of the money that has been allocated to the fund. This is updated automatically when user 92 clicks the "Add to Fund" icon.

User 92 can then select another investment vehicle and its corresponding allocation percentage in the same method as described above. User 92 repeats this process until the allocation percentage equals 100%, or if user 92 does not want to invest 100% of the monetary amount, the unallocated monetary amount will be kept in a money market fund in user 92's customizable fund.

User 92 can change the percent allocations for each of the investment vehicles selected by clicking on a "Change Percentages" icon 260 on "Create Fund" page 106. Also, user 92 has the option to reinvest dividends if the investment vehicle selected allows for dividend reinvestments. During the fund creation process, user 92 can delete a selected investment vehicle he/she does not want in the fund by clicking on the "Delete Entry" icon located on the right hand side of "Create Fund" page 106.

In the example in FIG. 7, $2,000 is the amount to invest. The example shows "Create Fund" page 106 with a completed fund 256 which contains 9 investment vehicles in user 92's customized fund and the Money Market Fund containing the remaining amount that was not invested. Completed fund 256 shows the investment vehicle symbol, investment vehicle name, user 92's selected percentage allocations for each investment vehicle, the money allocated based on user 92's selected percentage allocations multiplied by the customizable investment fund's total "Amount to Invest", the current per share price for each investment vehicle, and the subsequent number of shares and fractional shares that will be purchased for each selected investment vehicle. Once user 92 is satisfied with his/her investment choices for the fund, user 92 selects the "Finished with Fund" icon in the upper middle of "Create Fund" page 106.

FIG. 8 is an example of "Fund Status" page 110 that shows either an initial customizable investment fund created by user 92 or a customizable investment fund recently modified by returning user 92. After user 92 creates a fund, user 92 is directed to "Fund Status" page 110 which shows the completed fund as seen in the example in FIG. 8. "Fund Status" page 110 details, from left to right, the fund's investment vehicle "Symbol", the investment vehicle's full "Name", "Current Price" per share of the selected investment vehicles, "Number of Shares" purchased by user 92 for each selected investment vehicle, "Money Allocated" to each investment vehicle, and "Percent of the total fund's money Allocated" to each investment vehicle. "Fund Status" page 110 also displays the total amount in the fund and the total percentage of the allocations.

From "Fund Status" page 110, user 92 can access any of the other pages including home, the investment tools sections, investment research, purchase or sale of an investment vehicle, add or reduce the monetary balance, user 92's fund history, or the fund's asset allocation graphs.

If user 92 has logged back on to the preferred embodiment after creating the initial fund, user 92 can performed additional transactions such as purchasing additional investments or selling investments in the existing fund. If user 92 has performed a transaction such as a purchase or sale of an investment vehicle or added or reduced the monetary balance of the fund, then "Fund Status" page 110 following the transaction will appear like the example displayed in FIG. 8 and will show the current customizable investment fund's information.

Investment Tools—Investment Education Topics and Research

FIG. 9 shows a diagram of the various investing tools' investing education sections that are available in the preferred embodiment. When user 92 wants to gain investing knowledge, he/she goes to a process step "Chooses Investment Education sections" 262. User 92 can select Advantages of Investing/Investment Basics 96 which was detailed in FIG. 3A. User 92 can also select one of the financial education icons, each icon representing a page. The components include the following that were described in FIG. 3B: "General Definitions/Glossary" of finance terms and concepts 196, "Brief History of the Stock Market" 198, "What is a Stock, Bond, Mutual Fund" 202, description of "Major U.S. Stock Exchanges" 200, or Other Investment Topics and Examples component 204.

Other Investment Topics and Examples component 204 in the preferred embodiment includes sections that describe risk versus reward of an investment, how to analyze an investment vehicle's financial information, finance, retirement, goal setting, descriptions and examples of types of investments such as growth versus income versus growth/income. In addition, the preferred embodiment contains other investment education pages describing and showing examples of large capitalization versus medium capitalization versus small capitalization investment vehicles, how to invest for short term goals versus how to invest for long term goals, and choosing investments based upon user 92's risk tolerance, timeframe, and goals with various examples.

A Risky Investments and Non-Risky Investments component 264 will show real world examples or risky investments such as start-up biotechnology companies and non-risky investments such as large capitalization companies and U.S. government bonds.

The preferred embodiment also contains videos and podcasts of how to invest, how to research an investment vehicle, examples of investing, and what to look for in investing in stocks, bonds, mutual funds, or other investments. These videos and podcasts can be e-mailed to user 92 and are available at the preferred embodiment. Also associated with the investment tools is "Information Exchange" component 144 which is shown in FIG. 3. "Information Exchange" component 144 is an on-line message board system which enables user 92 of the preferred embodiment to discuss investment strategies, investment vehicles, investment concepts and terms, or other financial/investing topics with other users 92 who are members of the preferred embodiment.

FIG. 10 depicts a sample investment education component page of the preferred embodiment showing recommended asset allocation graphs based on the age of user 92. As part of the investment education component of the preferred embodiment, user 92 can learn about diversification, investing, investment vehicle analysis, finance, retirement, goal setting, investing definitions and terms, and other investing concepts.

An example of one of the concepts is diversification which includes allocating investment assets among various asset classes to reduce risk instead of investing in one asset class. The graph in FIG. 10 shows recommended asset allocations to various asset classes based on the age of user 92. The asset classes in this example include cash, bonds, small capitalization stocks, middle capitalization stocks, and large capitalization stocks.

FIG. 11 depicts the flowchart of the preferred embodiment's research investment process. If user 92 wants to research an investment vehicle, user 92 accesses "Research" page 108 via a process step 270 of the preferred embodiment. On "Research" page 108, an Investment Symbol decision tree 272 specifies that if the investment symbol is not known, user 92 types part of the investment vehicle name into a "Company Name" data entry field on "Research" page 108 and clicks on a "Symbol Lookup" icon on "Research" page 108. User 92 is directed from "Research" page 108 to "Symbol Lookup" page 112 where user 92 can look up the symbol for the corresponding investment vehicle he/she is interested in researching. On the other branch of Investment Symbol decision tree 272, if the investment symbol is known, user 92 types the investment vehicle symbol into an "Investment Vehicle Symbol" data entry field on "Research" page 108 and clicks a "Research" icon as seen in a process step 274.

Next, server processor 64 accesses data storage 74 with the investment vehicle query parameters and data storage 74 generates the information requested. The investment vehicle information is communicated from data storage 74 back to server processor 64 through connector 80, and server processor 64 sends the investment vehicle information to "Research Detail" page 146. User 92 is shown "Research Detail" page 146 which contains the investment vehicle information that was requested by user 92. User 92 can view the pertinent investment vehicle information to help user 92 decide if a specific investment vehicle is worth investing in.

FIG. 12 illustrates an example of "Research Detail" page 146 which shows a sample of the research detail for a specific investment vehicle. When user 92 wants to research an investment vehicle as seen in the process in FIG. 11, user 92 accesses "Research" page 108. User 92 would type in the investment vehicle symbol and click on a "Research" icon which links to "Research Detail" page 146.

In the preferred embodiment, "Research Detail" page 146 would exhibit pertinent investment information as seen in FIG. 12 including the current price, previous day's closing price, percentage change from the previous day's close, 52 week range with the high and low prices, annual dividend, dividend yield, dividend date, ex-dividend date, business synopsis, industry type, company type, and asset class.

In addition, there are other fundamental investment analysis metrics on "Research Detail" page 146 that can be seen in the example in FIG. 12. These investment analysis metrics include the comparison of the current year to the prior year for certain financial metrics including earning per share, annual revenue, gross margin percentage, net income, net margin percentage, one year total return, 3 year total return, return on equity, return on assets, price to earnings ratio, and the Standard & Poor's ranking. A stock price trend graph is included in "Research Detail" page 146. These items will be useful to user 92 to research the quality of the investment vehicle and evaluate the financial strength of the investment vehicle. It can be used in addition to the investment tools components of the preferred embodiment to learn about investing. "Research Detail" page 146 contains more information than shown in the example on FIG. 12. "Research Detail" page 146 is linked to investment education sections such as the glossary and general definitions pages so user 92 can look up the definitions of the terms on "Research Detail" page 146.

FIG. 13 depicts the symbol lookup process flowchart. If user 92 wants to see if an investment vehicle has an associated symbol to verify it is publically traded, user 92 clicks on a "Symbol Lookup" icon 280. "Symbol Lookup" page 112 is linked to the majority of the other pages in the preferred embodiment. When "Symbol Lookup" page 112 appears, user 92 types the investment vehicle name or part of the investment vehicle name into a "Company Name" data entry field as seen in a process step 282. The partial investment vehicle name that was input via a computer interface is communicated from server processor 64 to data storage 74 which contains a database of investment vehicle names. Data storage 74 performs a look up on user 92 input. The results of any matching words from investment vehicle names are returned to server processor 64 from data storage 74 through connector 80. Server processor 64 then sends the information to "Symbol Lookup" page 112 where a list of investment vehicle names and associated symbols is displayed. User 92 chooses the symbol matching the investment vehicle that user 92 desires to research as seen in a process step 284.

Process Flow Overview—Returning User

FIG. 14 depicts the general process flowchart for user 92 who previously created both an account and a customized investment fund, logged off the preferred embodiment, and is returning to the system of the preferred embodiment. FIG. 14 displays the pages that user 92 returning to the preferred embodiment would see as well as the links between the pages. In the preferred embodiment, returning user 92 accesses "Introduction" page 94 and clicks on a "Returning User" icon. User 92 is directed to a "User Log In" page 292 and logs on using user 92's unique User ID and password. If the User ID is found in data storage 66 of the preferred embodiment and the password matches the unique password for that specific User ID, user 92 is directed from "User Log In" page 292 to "Home" page 100.

Returning user 92 has the ability to modify his/her customizable investment fund through features including additional purchases or sales of investments in the fund or changing the money market fund by adding or withdrawing money. From "Home" page 100, user 92 can access components of the preferred embodiment including "Fund Status" page 110, "Information Exchange" section 144, "Investment Advantages/Basics Education" section 96, "Investment Education" section 102, an "Asset Allocation Graphs" section 294, a "Purchase Investment" page 298, a "Sell Investment" page 296, an "Add Money" page 302, a "Withdraw Money" page 304, "Fund History" page 150, or a "Fund Performance" page 306 for user 92's fund.

Each of the pages/components that user 92 chooses links to all aforementioned pages as seen by a linking symbol 300 which represents the links among all the pages and components to one another. The linking among all pages gives endless flexibility to user 92; in other words user 92 does not need to go to "Home" page 100 to link to another page or component, but can link directly from one page to another.

FIG. 15 details the process flow for user 92 who has previously created both a user account and a customized fund of investment vehicles in the preferred embodiment, and who wants to perform a transaction or task. In the preferred embodiment, user 92 accesses "Introduction" page 94 of the preferred embodiment. "Introduction" page 94 explains the concept of designing one's own fund of investments based on user 92's criteria and selections.

From "Introduction" page 94, an option available to user 92 is "Pricing" page 142, which details the prices for creating and modifying the fund including prices for additional transactions. Another option available from "Introduction" page 94 is "Investment Advantages/Basics Education" section 96. As was seen in FIG. 3A, "Investment Advantages/Basics Education" section 96 is part of the investment tools component of the preferred embodiment and explains concepts such as Return on Investment, Diversification, Time Value of Money, Investing, Inflation, Risk, and other investing education topics and terms.

"Pricing" page 142 links back to "Introduction" page 94 through connector 154. "Investment Advantages/Basics Education" section 96 links back to "Introduction" page 94 through connector 154. Finally, Introduction page 94 links to "User Log In" page 292.

"User Log In" page 292 enables returning user 92 to enter his/her unique User ID and password. The User ID is compared to data storage 66 storing the User IDs and other personal identification information. If the User ID is found in data storage 66 and the password entered matches the password associated with that specific User ID, user 92 is directed to "Home" page 100.

"Home" page 100 links to "Investment Advantages/Basics Education" section 96 through connector 116, and links through connector 122 to "Investment Education" section 102. "Investment Education" section 102 includes various investment education components such as "General Definitions and Glossary of Investing terms" 196, "Brief History of the Stock Market" 198, Major U.S. Stock Exchanges 200, What is a Stock, What is a Mutual Fund, What is a Bond 202, and other investing topics and concepts.

In addition, "Home" page 100 links to "Research" page 108. "Research" page 108 enables user 92 to input an investment vehicle symbol and go to "Research Detail" page 146 to research investments and view pertinent investment information such as financial ratios, trend graphs, and current news on the investment vehicle. "Research" page 108 links to "Symbol Lookup" page 112 where user 92 can type part of an investment vehicle name in "Symbol Lookup" page 112 and see which companies match the partial name.

Another option from "Home" page 100 is "Information Exchange" section 144. "Information Exchange" section 144 enables user 92 to interact with other user 92s of the preferred embodiment. At "Information Exchange" page 144, user 92 can post investment related questions, receive answers to the post, answer questions, and discuss investment vehicles, strategies, and other investment topics with other user 92s who are members of the preferred embodiment.

"Home" page 100 also links to "Fund Status" page 110. "Fund Status" page 110 details the customized fund information for user 92 including the investment vehicle symbol and name, number of shares owned by user 92 in each investment vehicle in the fund, current and basis share price, cost basis, and calculated current total monetary amount by investment vehicle and total fund. User 92 can view the gains or losses by each investment vehicle, the monetary change in value, and the percentage change over the cost basis value for each investment vehicle and the total investment fund.

From "Home" page 100, there is a variety of transactions and tasks that can be performed by user 92. These include the following:

"Purchase Investments" page 298 enables returning user 92 to purchase additional shares of an investment vehicle that is in the investment fund or purchase shares of a new investment vehicle. On "Purchase Investments" page 298, when user 92 enters the investment vehicle symbol and number of shares to purchase, the computed transaction amount is compared to the money market fund balance in user 92's existing fund. If the fund's existing money market fund balance is not enough to pay for the asset/liability purchase, user 92 has the option to reduce the number of shares to purchase or add additional money to the cash portion of the fund to be able to complete the desired transaction.

User 92 has the option of immediate execution for the trades or user 92 can select the normal trade option where the trades would be performed later that day and would be aggregated with other user's trades.

There is a dollar cost averaging feature in "Purchase Investments" page 298 for user 92 who wants to invest on a regularly scheduled basis such as weekly, monthly, etc. User 92 issues a standing order that money is to be transferred automatically from a personal account into the fund on a scheduled basis. When the automatic transfers are made, the funds are invested according to a standing allocation order that user 92 issues. The standing order can be modified at any time in case user 92 decides to change his/her investment strategy.

"Sell Investments" page 296 enables returning user 92 to sell shares including fractional shares of investment vehicles that are currently in user 92's fund. User 92 enters the investment symbol and number of shares to sell. The entered investment symbol and number of shares are compared to user 92's existing fund's investment vehicles. If the symbol does not match, a message is displayed informing user 92 that the symbol does not represent an investment vehicle in the existing fund. If the symbol matches an investment in user 92's current fund, but the number of shares to be sold is higher than user 92's existing number of shares for that investment vehicle, a message is displayed to user 92 explaining the situation, and informs user 92 of the current number of shares owned in the specific investment vehicle. The money market fund is the depository of the proceeds from the fund's investment sales.

"Increase Monetary Balance" page 302 enables user 92 to add money to the money market fund portion of the investment fund. User 92 can transfer money to the fund via bank transfer, credit card, brokerage transfer, or via commercial paper (i.e. check or money order).

"Decrease Monetary Balance" page 304 enables user 92 to withdraw money from the money market fund in the customizable investment fund. User 92 enters an amount to withdraw on "Decrease Monetary Balance" page 304. That information is compared to the money market balance of user 92's fund. If the amount requested to withdraw is higher than the existing money market balance of the fund, user 92 receives a message informing user 92 that the requested withdrawal amount is higher than the existing money market balance of the fund and the message specifies the fund's existing money market balance. If the amount requested to withdraw is less than or equal to the existing money market balance of the fund, the amount is transferred to user 92's bank or brokerage account or a check is issued to user 92.

"Fund Performance" page 248 shows the initial fund amount that was invested and the current fund value. The return on investment is computed to show the customizable investment fund's performance over the timeframe that user 92 has owned the fund.

"Asset Allocation Graphs" page 294 shows a variety of graphs of user 92's fund. The asset class allocation graph on "Asset Allocation Graphs" page 294 details the percentage breakdown of the fund by asset class such as Large Capitalization stocks, Middle Capitalization stocks, Small Capitalization stocks, Bonds, Cash, etc. The investment type allocation graph on "Asset Allocation Graphs" page 294 details the investment vehicles percentage proportion of the fund by cash, growth investment vehicles, income investment vehicles, growth/income investment vehicles, and other investment types.

"Fund History" page 150 shows the entire history of transactions in user 92's fund from inception date to the current date. "Fund History" page 150 details all the transactions for the fund including cash deposits and withdrawals, investment purchases and sales, reinvested dividends, dividend payments, stock splits, interest earned on the money market balance, and transactional costs associated with sales and purchases of investment vehicles in the fund. User 92 can select the beginning and ending dates of the fund history to be viewed.

Each of the pages/components that user 92 chooses also links to all other aforementioned pages as seen by linking symbol 300 which represents the links between all the pages and components to one another. The linking between pages gives endless flexibility to user 92; in other words user 92 does not need to go to "Home" page 100 to link to another page or component. User 92 can easily link from one page to any other page in the preferred embodiment.

FIG. 16 depicts the preferred embodiment's sample "User Log In" page 292 used to access user 92's account. "User Log In" page 292 is for an existing user 92 who wants to log in to the system of the preferred embodiment. "User Log In" page 292 enables user 92 to enter the User ID and password into a User ID data entry field and a Password data entry field, respectively.

The User ID input is compared to the user IDs in data storage 66 through an authenticating device. Data storage 66 stores all the User IDs and user 92's other personal and investment fund information, and also authenticates the personal identification information of all users 92. If the User ID does not match a User ID in the system, a message is shown stating the situation. If the password does not match an associated User ID, a message is shown indicating an incorrect password. If the User ID input is found in data storage 66 and the password input by user 92 matches the password associated with that specific User ID, user 92 is directed to "Home" page 100.

Process Flow—Returning User Options

FIG. 17 depicts a sample of "Fund Status" page 110 for returning user 92 showing the cost basis and current value of the fund. "Fund Status" page 110 is viewed when user 92 wants to check the status of his/her fund. The cost basis is the initial purchase price of each investment vehicle, the purchase price of any dividend reinvestments, cash deposits, cash withdrawals, non-reinvested dividends, and interest earned on the money market fund balance.

The left side of "Fund Status" page 110 illustrated in FIG. 17 shows the cost basis of the fund's investment vehicles including reinvested dividends and the cost basis of any additional purchases, sales, cash withdrawals, and cash deposits. The basis items include, from left to right, the investment vehicle's symbol, investment vehicle's name, initial basis price for each investment vehicle including reinvested dividends, number of original shares purchased including reinvested dividends, the cost basis for each investment vehicle, and percentage of the basis total monetary amount allocated to each of the investment vehicles in user 92's fund. The total basis amount for the entire fund and total percentage allocated for the fund are also shown in the left side at the bottom of the "Basis Total" and "Basis Percent" columns, respectively.

In FIG. 17, the right side of "Fund Status" page 110 shows the current fund's investment vehicle's share price, current number of shares, current amount invested in each investment vehicle, and percentage of the current total monetary amount allocated to the investment vehicles in user 92's fund. The total current amount for the entire fund and total percentage allocated for the fund is also shown on the right side of the page at the bottom of the "Current Total" and "Current Percent" columns respectively.

The far right side of "Fund Status" page 110 shows the monetary gain or loss and percentage change over the basis cost for each investment vehicle and also for the total fund. "Fund Status" page 110 enables user 92 to see which investment vehicles have had a monetary change in value and the percentage change since inception.

FIG. 18 illustrates the preferred embodiment's fund transaction history process. If user 92 wants to check the history of his/her customized investment fund, including all transactions and trading orders, user 92 clicks on a "Fund History" icon 312 from any of the pages in the preferred embodiment. "Fund History" page 150 appears and user 92 has the option to either view the entire history of the fund from the inception date or select the beginning and ending dates for the fund's transaction history to be viewed.

When user 92 inputs the date parameters to view the fund history as seen in a process step 314, server processor 64 communicates the date parameter information to data storage 66 of the preferred embodiment. Data storage 66 contains all the recorded and tracked trading order and transaction data for all users 92. The requested date parameter information is accessed in data storage 66 and the transaction information for the date ranges is retrieved and sent to server processor 64 through connector 84. This information is sent to "Fund History" page 150 where user 92 can view the fund's transaction information that was requested as seen in a process step 316.

FIG. 19 illustrates an example of "Fund History" page 150 of the preferred embodiment. "Fund History" page 150 of the preferred embodiment is modifiable by user 92 where the timeframe of the fund's history can be any date between the fund's inception date and the present day. "Fund History" page 150 details all recorded transactions and trading orders that have occurred in the fund including cash deposits and withdrawals, purchases and sales of investment vehicles, reinvested dividends, dividend payments, stock splits, interest earned on the money market balance, and transactional costs associated with sales and purchases of investment vehicles in the fund.

The categories shown on "Fund History" page 150 as shown in FIG. 19 include the date of the transaction, investment vehicle symbol, investment vehicle name, transaction price and number of shares for each transaction, total amount of each transaction, and detailed explanation of each transaction.

The present embodiment also provides tax preparation information. Specifically, the system provides the gain and loss information because the system tracks the tax basis information, including acquisition date, of securities purchased through the system, the sales price for such securities, and any costs involved in maintaining the investment fund.

FIG. 20 depicts an example of "Allocation Graphs" page 294 showing allocation graphs by asset class and asset type for user 92. User 92 can view graphs of the fund that he/she composed with his/her investment vehicle selections. By viewing the various fund allocation graphs representing user 92's fund, user 92 can determine how diversified the fund is, which asset category has the majority of the invested fund amount, and how the allocation graphs compare to the standard "recommended asset category graphs by age" as shown in FIG. 10.

On "Allocation Graphs" page 294, as seen in the example in FIG. 20, the graph on the left side shows the asset allocations by class. These classes include cash, bonds, small capitalization stocks, middle capitalization stocks, and large capitalization stocks.

The graph on the right side of FIG. 20 shows the asset allocations by type. These types include cash, "growth" investment vehicles, "income" investment vehicles, and "growth/income mix" investment vehicles.

FIG. 21 illustrates the preferred embodiment's purchase of additional investments as a process flowchart. If user 92 wants to purchase additional investment vehicles for the customized fund, user 92 clicks on a "Purchase" icon 322 in any of the pages shown in FIG. 14, below "User Log In" page 292 in the preferred embodiment, and "Purchase" page 298 appears. User 92 then inputs the investment vehicle symbol that he/she wants to purchase, the quantity of shares including fractional shares to purchase, and then clicks on a "Purchase" icon as seen in a process step 324. In "Purchase" page 298, user 92 has the option to reinvest the dividends if the investment vehicle selected allows for dividend reinvestments.

Server processor 64A communicates the requested information to both data storage 74 and data storage 66A. Data storage 74 verifies the symbol to see if it is legitimate. Data storage 66A checks the money market balance of the fund and communicates the results back to server processor 64A.

If the symbol is not legitimate, server processor 64A sends a message to user 92 indicating the symbol is not correct and to check the symbol or perform a symbol look up on the investment vehicle. User 92 remains on "Purchase" page 298.

If the symbol is legitimate, server processor 64A verifies if user 92 has enough money in the money market fund balance in the customizable fund to cover the transaction as seen in a decision tree 326. If user 92 does not have enough money in the fund to cover the transaction, a message is sent to user 92 informing user 92 of the situation and enables him/her to reduce the number of shares to purchase or specify the amount that is owed when the transaction is complete and when that amount is due. This is seen in a process step 330. User 92 remains on "Purchase" page 298.

If user 92 has enough money in the fund to pay for the transaction, the purchase request is initiated as seen in a process step 328. Server processor 64B communicates the trade order information to third party broker 68 through connector 78 and third party broker 68 executes the trade order. The executed trade order information is communicated from third party broker 68 through connector 78 to server processor 64B and from server processor 64B to data storage 66B through connector 84B. The purchase amount is communicated from server processor 64B to internal payment system 70. Internal payment system 70 electronically transfers the purchase amount to third party broker 68. The purchase amount is deducted from the money market cash portion of user 92's fund. Data storage 66B and user 92's investment fund are both updated with the transaction information. A trade order confirmation message is sent to user 92 detailing the transaction results.

For those investment vehicles in the customizable fund that have special items such as dividends, the dividend transactions modify the customizable investment fund by increasing the number of shares (if the dividends are reinvested) for that investment vehicle or by increasing the money market fund with the dividend proceeds.

FIG. 22 depicts the preferred embodiment's process flowchart of the sale of an investment vehicle. If user 92 wants to sell a number of shares of one of the investment vehicles in the customized fund, user 92 clicks on a "Sell Investments" icon 336 in any of the pages shown in FIG. 14, below "User Log In" page 292 in the preferred embodiment. "Sell Investment" page 296 appears, user 92 inputs the investment vehicle symbol and quantity of shares to sell, and clicks a "Sell" icon as seen in a process step 338. Server processor 64A communicates the requested sales information to data storage 66A which verifies the symbol input to see if that specific investment vehicle is in user 92's fund, and verifies the number of shares of the specific investment vehicle in user 92's fund.

The results are communicated from data storage 66A back to server processor 64A through connector 84A. As seen in a decision tree 340, if user 92 does not own the investment vehicle in his/her fund, a message 342 is shown to user 92 indicating that he/she does not own that investment vehicle in the fund and to recheck the investment vehicle symbol. User 92 is directed back to "Sell Investment" page 296.

On the other branch of decision tree 340, if user 92 owns the investment vehicle, the next step is to determine if user 92 owns enough shares to cover the requested sale. A decision tree 344 shows that if user 92 owns the investment vehicle, but the number of shares user 92 wants to sell exceeds the number of shares in user 92's fund, message 342 is shown to user 92 indicating the number of shares to be sold is greater than the number of shares in user 92's fund and indicates the number of shares owned in the fund. User 92 is directed back to "Sell Investment" page 296.

In the other branch of decision tree 344, if the investment vehicle is in the fund and the number of shares to be sold is less than or equal to the number of shares for the specific investment vehicle, server processor 64B communicates the transaction request to third party broker 68 who will conduct the trade on a regular basis, such as hourly. Third party broker 68 communicates the final sale transaction information back to server processor 64B through connector 78. Server processor 64B communicates the sale transaction information to data storage 66B through connector 84B, and data storage 66B is updated with the sale transaction information. The sale transaction proceeds amount is sent from third party broker 68 to internal payment system 70. A transaction confirmation message 346 is sent to user 92 detailing the sale information and the final monetary amount of the sale. The investment sale proceeds are transferred to the money market portion of user 92's investment fund from internal payment system 70 through server processor 64B.

FIG. 23 shows the preferred embodiment's increase monetary balance process as a flowchart. If user 92 wants to increase the monetary balance in user 92's fund, user 92 clicks on an "Increase Monetary Balance" icon 352 in any of the pages shown in FIG. 14, below "User Log In" page 292 in the preferred embodiment. "Increase Monetary Balance" page 302 appears, user 92 inputs the desired amount to add to the fund, and chooses the method to send/transfer money to user 92's fund as seen in a process step 354. Server processor 64A processes the request and a message 356 is sent to user 92 that informs user 92 about the transaction and when the check needs to be sent, if applicable.

The money is transferred to internal payment system 70 of the preferred embodiment by a bank transfer, brokerage transfer, credit card transfer, or other means. Internal payment system 70 communicates the monetary transfer to server processor 64B. Server processor 64B communicates the monetary transaction information to data storage 66. Data storage 66 is updated with the monetary transaction information when the transaction is complete and monetary funds have been received by internal payment system 70 of the preferred embodiment. The monetary amount is added to user 92's money market fund balance in user 92's fund in data storage 66 and a transfer confirmation is sent to user 92. Additional money can be automatically added to purchase additional securities or amounts of existing securities in user's 92 fund on a predetermined basis, with the money being transferred automatically out of direct deposits of paychecks, for example.

FIG. 24 depicts the preferred embodiment's decrease monetary balance process flowchart. If user 92 wants to withdraw money, user 92 clicks on a "Reduce Monetary Balance" icon 362 in any of the pages shown in FIG. 14, below "User Log In" page 292 in the preferred embodiment. "Reduce Monetary Balance" page 304 appears and user 92 inputs the desired amount that user 92 is withdrawing. User 92 also indicates which external account to transfer the money to as seen in a process step 364. User 92 then clicks a "Withdraw" icon on "Reduce Monetary Balance" page 304.

Server processor 64A communicates the withdrawal transaction information to data storage 66A through connector 84 to verify the money market fund balance of user 92's fund. As seen in a decision tree 368, if the amount to withdraw exceeds the monetary balance in user 92's fund, a message is sent to user 92 informing user 92 that the monetary amount requested for withdrawal exceeds the fund's cash balance as seen in a process step 366. User 92 remains on "Reduce Monetary Balance" page 304. If the withdrawal amount is less than or equal to the monetary balance in user 92's fund, a transfer confirmation message informs user 92 about the withdrawal transaction details as seen in a process step 370.

The money is transferred from user 92's fund's money market fund which is in internal payment system 70 to the external account user 92 requested. This is seen in a process step 372. Internal payment system 70 communicates the withdrawal transaction information to server processor 64B. Server processor 64B communicates the withdrawal transfer information to data storage 66B and data storage 66B is updated with the withdrawal transaction information.

System Overview—Information Exchange Forum

FIG. 25 illustrates a block diagram of the computer-based system for "Information Exchange" 144 on-line message board system component of the preferred embodiment. "Information Exchange" component 144, as seen previously in FIG. 3 and FIG. 15, provides a community of users 92a through 92d access to inquiries and discussions from other users 92a through 92d who are members of the preferred embodiment. Member users can learn from the collective experiences and knowledge of other member users. The on-line data service provides the community of users 92a through 92d with easier information extraction so that users 92a through 92d can filter topics and learn from the collective experiences, investment knowledge, and opinions of other community users.

On "Information Exchange" component 144, user 92a can search for previously posted messages containing specific concepts and terms by filtering on specific words or word combinations. User 92a can also initiate a message post on the on-line message board as well.

The messages are stored in data storage 66 so users 92a through 92d can access previous posts and view the question, answers, and string of comments related to that specific post. Data storage 66 contains a query device where user 92a can query for investment tools and strategies messages. The query device locates the selected messages. There are classification schemes that utilize the message postings that contain identifying parameters such as author (i.e. User ID or user's first name), an assigned unique posting number, key words, and date and time of the posting. The message posting record would contain the posting author, post number, text, and date and time of the post.

As an example of a message posting, user 92*a* submits a question to "Information Exchange" 144. The electronic question/comment message is routed from user 92*a* to an Internet 380 through a connector 378. Internet 380 communicates the electronic message to server processor 64 through a connector 382 which in turn sends the electronic message to data storage 66 storing the messages through connector 84. The message is now recorded, stored, and cataloged in data storage 66.

If user 92*b* is interested in viewing the message and potentially responding to a message posting, the message posting is retrieved from data storage 66 back to server 64 to Internet 380 where user 92*b* can view the message posting and respond. User 92*b* can view the messages in chronological order or search for messages by typing a word or phrase in a search data field. Server 64 can send the search data query parameters to data storage 66. Data storage 66 can run a query and transmit the messages that contain a key word or phrase in them back to server 64 which in turn sends the messages to Internet 380 where user 92*b* can view them.

System Process for Multiple Users

FIG. 26 depicts a block diagram of the computer-based system of the preferred embodiment. It shows user 92*a*'s computer connected to a communication network, such as Internet 380, connected via connector 378 to server processor 64 that stores the main program for controlling user's 92*a* access, trading, transactions, and education components. In FIG. 26, there are three other users' computers (92*b* through 92*d*) connected to server processor 64 through Internet 380. Server 64 connects to third party trading system 68 to execute the trades requested by users 92*a* through 92*d*.

Trade Aggregation and Netting Process—FIG. 27 Through FIG. 30

FIGS. 27 and 28, along with FIGS. 29 and 30, depict the trade transaction processes occurring on server processor 64. As seen in FIG. 1, server processor 64 provides communication between all users 92, the internal computer-based system such as internal payment system 70, and the systems that are external to the computer-based system of the preferred embodiment, such as third party payment system 76 and third party trading system 68.

The trades made in the preferred embodiment are, where applicable, aggregated and/or, where applicable, netted together in the internal system to reduce the total number of trades being executed by third party trading system 68. The process comprises first aggregating the transactions of all users 92 together for each security, then netting the transactions against the transactions of all users 92 for each security, and then executing any remaining transactions after netting has been performed.

By aggregating orders that are otherwise economically unviable—such as single shares, odd lots, fractional shares, and small orders—into one large order, the present embodiment creates an economy of scale that permits users 92 to inexpensively create, own, and manage a fund of securities that is tailored to each user 92's specific preferences. Aggregating buy and sell orders into one larger single buy or single sell order allows costs to be based on a small fee relative to each economically unviable order, rather than multiple fees that would make placing the economically unviable order impractical. The transactions can be aggregated over a time, such as every two hours, once daily, or at a selected number of times per day at selected predetermined times per day. Once the transactions are aggregated, they are netted and then at least one trade order is executed.

FIGS. 27 and 28 illustrate the aggregation and netting advantages of the computer-based system of the preferred embodiment. Specifically the number of trades based on user 92's purchases and sales that are to be executed externally in the system is dramatically reduced due to the netting that is performed by server 64X.

FIG. 27 illustrates the flowchart where user 92's trades are routed to the first level processing in server 64X. These are all the trades requested by users 92 when they implement either purchases or sales of investments. Users 92*a* through 92*c* access the pages used to create or modify the customizable investment funds as seen in a process step 398. The fund creations and modifications include the trade orders. First level processing in server 64X collects all the individual trade information. The trade information for all users 92*a* through 92*c* is tracked by server 64X.

FIG. 28 shows the next step in the overall transaction process where the trades are sent from first level processing 64X to second level processing 64Y within server 64. At second level processing 64Y, trades that can be aggregated together are aggregated so that the number of purchases in the same security are combined together to create one purchase of the security and the number of sales in the same security are combined together to create one sale of the security.

In addition, at second level processing in server 64Y, the purchase and sale trade orders of the same investment vehicle are netted. Netting combines the total purchases and sales of the same security and will create one overall trade for the security. The netting of the total purchases and sales of the same security can also be performed at selected times per day at selected predetermined times. The netted trades as well as trades that cannot be netted are sent to third party trading system 68 for order execution. The trade information is stored in data storage 66 of the preferred embodiment.

FIG. 29 illustrates an example of the first level transaction processing with various users purchasing and selling hypothetical investments. As indicated in FIG. 29, User (i) wants to sell 75 shares of security X, User (ii) wants to buy 100 shares of security X, User (iii) wants to buy 125 shares of security X, and User (iv) wants to sell 50 shares of security X. This gives a total of 225 shares of security X to be purchased and 125 shares of security X to be sold through the system as seen in the row Total Number of Shares for Buy and Sell Orders. The net result is that 100 shares of security X need to be purchased by the system of the preferred embodiment, which can be implemented with a single transaction through third party trading system 68 as seen in FIG. 28.

Also shown in FIG. 29, User (i) wants to buy 300 shares of security Y, User (ii) wants to sell 150 shares of security Y, User (iii) wants to sell 100 shares of security Y, and User (iv) wants to sell 50 shares of security Y. This gives a total of 300 shares of security Y to be purchased and 300 shares of security Y to be sold through the system as seen in the row Total Number of Shares for Buy and Sell Orders. The net result is that 0 shares of security Y need to be purchased or sold externally by the system of the preferred embodiment.

Also depicted in FIG. 29, User (i) wants to buy 150 shares of security Z, User (ii) wants to sell 200 shares of security Z, User (iii) wants to buy 100 shares of security Z, and User (iv) wants to buy 100 shares of security Z This gives a total of 350 shares of security Z to be purchased and 200 shares of security Z to be sold through the system of the preferred embodiment as seen in the row Total Number of Shares for Buy and Sell Orders. The net result is that 150 shares of security Z need to be bought by the system of the preferred embodiment. Only one trade needs to be executed externally through third party trading system 68 for this transaction as seen in FIG. 28.

With the internal netting of transactions, the system of the preferred embodiment internally tracks the various buy and sell transactions that would cause shares to be traded from one user to another. The ownership of the netted shares being traded internally among users of the preferred embodiment will be updated as well. For example, in FIG. 28, user 92A puts in an order in the preferred embodiment to sell 10 shares of investment vehicle X, while at the same time user 92B puts in an order in the preferred embodiment to buy 10 shares of investment vehicle X. The ownership of the shares in this example changes from user 92A to user 92B. The preferred embodiment will internally track which user owns which specific investment vehicles, and will change ownership of an investment vehicle when a change of ownership is made.

When the investment vehicles need to communicate information such as annual reports, mergers, etc. to the shareholders, the preferred embodiment will disseminate that information to user 92 who own shares in those specific companies. This dissemination of information can be electronic or paper, depending on which communication option user 92 chooses.

In the example in FIG. 30, which is a continuation from FIG. 29, for security X, the number of trades without netting the purchase and sales of the security would be 2, one purchase of 225 shares and one sale of 125 shares. If aggregation of the trades was implemented, but netting of the trades was not implemented, in the example of the three securities in FIG. 30, the total number of trades needed to execute user 92's transactions is reduced from 12 originally to 6 (one purchase and one sale for each security and there are three securities in the example).

As can be seen in FIG. 30, netting the purchase and sale trades together for security X would result in a maximum of 1 (one) external transaction. If netting of the trades was implemented in the example in FIG. 30, the number of trades needed to execute multiple user 92s' fund creations or modifications is greatly reduced from 12 to 2.

As another example, assume the system of the preferred embodiment was being used by 20,000 users who were creating and maintaining their individual funds from a list of 1,000 stocks. Also assume that each user is engaging in 5 (five) transactions relating to his/her fund during a specific period. The number of transactions that would normally be sent to an exchange or third party market maker or be executed by the broker as dealer would be 100,000 (20,000× 5).

By contrast, assuming no netting of buys against sells, but only aggregating the buys and sells of each security in the preferred embodiment, the maximum number of trades the system would theoretically execute would be 2,000 (two trades—a buy and a sell—in each stock). If transaction netting is implemented in the preferred embodiment, the maximum number of trades the system would theoretically execute would be 1,000 (one trade in each stock), either a single buy or single sell order depending on whether the total number of shares being bought exceeded the total number of shares being sold or vice versa.

In this example of 20,000 users and 100,000 trades, the computer-based system of the preferred embodiment saves the costs associated with 98,000 trades (i.e. 100,000–2,000) if netting is not utilized. If netting is implemented as seen in the second case, the computer-based system saves the costs associated with 99,000 trades (i.e. 100,000–1,000). This is a major reduction in transaction costs.

The computer-based system of the preferred embodiment, therefore, is advantageous with or without netting. As a further example, increasing the number of users in the above example to 50,000 would increase the number of trades under an ordinary brokerage to one half million. Employing the computer-based system of the preferred embodiment, the theoretical maximum number of trades remains at 2,000 without netting or 1,000 with netting. Therefore by using aggregation and netting, transaction costs can be maintained at a low level in part because so few actual trades need to be executed, even assuming every netted trade is sent to a third party for execution.

The Computer-Based System of the Preferred Embodiment

FIG. 31 depicts an embodiment of the overall computer-based system with electronic links. Within the computer-based system of the preferred embodiment is server 64, which executes a program B which controls the operation of the entire system. While another program may execute on a user 92's personal computer 408, program A, or a smart phone application 406, program C, user 92's customizable investment fund process can be completely performed by program B. Alternatively, these programs, A or B or C, can work together to download data to user 92's terminal and display this data through an interface based on selections made by user 92.

One possibility for either program A or C is a communication program that enables user 92 to establish a link to server 64, and set "criteria" which determines what data is sent back and forth to user 92. In this case, "criteria" consists of the investment vehicle information in user 92's fund. Once the personal account is created by user 92, program B then performs all of the analysis and computations required to inform user 92. This enables tight configuration control on user 92's software, which makes upgrading and security protection easier. Server 64 is a secure server since it will be transmitting information such as user 92's personal information (i.e. social security number, credit card information, bank routing number and bank account number).

Alternatively, by placing more of user 92's program functionality in either program A or C, the amount of time server 64 is accessed by user 92 is decreased, thereby enabling a cost reduction in the total amount of communication links required at server 64. In this embodiment, user 92 would only access server 64 to receive the data regarding user 92's investment vehicles and to engage in transactions once user 92 selected a transaction. The total time accessing server 64 would be similar in this case to accessing one's electronic mail. Thus, there is much flexibility in creating the levels of functionality in the programs A, B, and C. There are version numbers for each program so that any updated versions of the program are communicated to user 92's device (i.e. personal computer or smart phone application).

In addition user 92 can access server 64 via several communication links. First, user 92 can access server 64 via Internet 380 using user 92's Internet Service Provider (ISP), which ultimately connects user 92's personal computer 408 to server 64.

Second, user 92 can access server 64 directly using a dial-up modem connection 412. This has the potential advantage of security in that some people consider a telephone connection inherently more secure than an open connection over Internet 380.

Third, user 92 can access server 64 using an intermediary, which provides the service to user 92, such as a bank, brokerage, etc. In this case, user 92 either accesses the intermediary using dial-up modem 412, Internet 380, or in person. Once user 92 accesses the intermediary, the intermediary then accesses server 64 via an intermediary server 410 connected to Internet 380 or dial-up 412.

The computer-based system of the preferred embodiment also provides for an electronic payment mechanism to enable user 92 to make payments or transfer a monetary amount for investment on an ad-hoc basis or on a periodic basis, such as monthly, biweekly, etc. This enables user 92 to match his/her investments with his/her regular salary. The electronic payment mechanism includes an electronic withdrawal from user 92's checking or savings account, payroll deduction, credit card transaction, etc.

An electronic connection to third party trading system 68 is also provided which enables the program to make the external trades electronically. Typically, these electronic trading systems include a connection to clearinghouse 72 for settlement of the trades. This process is shown for completeness.

All of these communications links are standard and known communications links, so no further discussion is necessary. In addition, third party electronic payment system 76's connection consists of one of the many known ways of making this payment electronically, so no further discussion is required. Finally, third party trading system 68 could consist of a known trading system and therefore no additional discussion is required as well.

DESCRIPTION

Alternative Embodiment—FIG. 32 Through FIG. 33

As an alternative to FIG. 26, FIG. 32 depicts alternative embodiments including user 92's smart phone application 406 that is connected to server processor 64 through Internet 380. User 92e can utilize a "smart device" such as the iPhone, iPad, or Blackberry which can have an application (app) to create the fund, monitor the fund, research investment vehicles, view the fund's history, and discuss investment topics on "Information Exchange" component 144 with others who are using either smart phone applications or computers. There are videos and podcasts that can be viewed on the smart device apps with "How to" topics on investing, examples of investing, and what to look for when researching stocks, bonds, and other investment vehicles.

Also depicted is an alternative embodiment such as a user 92g's computer connected to server processor 64 directly through dial-up connection 412.

An additional embodiment illustrated is user 92f's computer connected to server processor 64 through an intermediary 418, such as a bank, brokerage, or agent such as a money-manager or financial planner that is providing the system as a service for its users 92f, which is then connected either directly to server 64 or through Internet 380 to server processor 64.

An additional embodiment utilizes a mail system 420 to communicate information to the preferred embodiment. These include certain items such as money and user 92h's personal identification information if user 92h does not wish to transfer money electronically or sign up on-line. Mail system 420 would send the physical money and user 92h's personal identification information to an office 422 which would input the information into server 64 and deposit the money into the account for user 92h's fund.

Server processor 64 is electronically connected to other users 92 and traders for executing trades to be made outside the computer-based system of the preferred embodiment through a variety of known standard interfaces. Some of the programs that perform the method of the preferred embodiment can reside on user 92's computer or server processor 64, with user 92 accessing server 64 to obtain updated information and to provide orders for execution.

FIG. 33 illustrates various security mechanisms and methods for transmitting sensitive information to the website as alternative embodiments. Some users 92 might not feel comfortable allowing their personal information over Internet 380 and prefer other methods to deliver confidential information to the system. FIG. 33 shows other methods to transmit credit card information and user 92's password or other confidential personal identification information to server 64 for first time user 92 in the preferred embodiment.

One method is where user 92, accessing the system over Internet 380 for the first time, will provide a User ID and password without having to provide any other confidential information such as credit card information through Internet 380 to server processor 64. Server processor 64 will then communicate to user 92 via a phone number or e-mail address supplied by user 92 or user 92 accesses server processor 64 directly via a telephone 424.

Using telephone 424, user 92 can supply server processor 64 with the necessary information by touch-tone, or voice input user 92's confidential credit card information. Once server processor 64 has the credit card information through telephone 424 or e-mail communication, it need not be provided to server processor 64 again. User 92 will use a unique User ID and password for communications. These User IDs and passwords will be useless for any purpose other than communicating with the website, and the credit card information never travels on Internet 380.

Another alternative embodiment is utilizing mail 420 or other written forms of communication to deliver the credit card information and user 92's ID and password to office 422 of the preferred embodiment. Employees at office 422 of the preferred embodiment can manually input user 92's personal information if user 92 does not want his/her personal information transmitted over Internet 380 or by telephone 424.

Operation

Alternative Embodiment—FIG. 34 Through FIG. 37

FIG. 34 illustrates an alternative embodiment where "Amount to Invest" process 104 follows "Create Fund" process 106 for a user creating a fund. In the preferred embodiment as depicted in FIG. 3, user 92 chooses an amount to invest and then the next step is to create the fund by determining the investment choices. In the alternative embodiment shown in FIG. 34, user 92 selects the investment choices first and then chooses an amount to invest in the fund.

FIG. 35 shows an alternative embodiment where the investment tool's education components are not included in the process. This would be aimed for those savvy investors who do not need the educational components of the process. FIG. 35 is similar to FIG. 3, but the education components are excluded in FIG. 35. "Information Exchange" 144 would still be included in the alternative embodiment.

FIG. 36 depicts an alternative embodiment where user 92 can create more than one customizable investment fund. Each fund that user 92 creates can have an individual name and be created for different purposes, for example saving for a college fund (shorter timeframe) or retirement (longer timeframe). FIG. 36 shows the alternative embodiment's process flowchart of a user investing money into user 92's account, naming the fund and then creating a fund. FIG. 36 is similar to FIG. 6, but a "Naming Fund" 426 step is added in FIG. 36. When user 92 chooses to create the fund, user 92 is directed to "Begin Fund" page 148. From "Begin Fund" page, user 92 is then directed to "Name Fund" page 426 where user 92 can name the specific fund he/she is creating. From "Name Fund"

page 426, user 92 is then directed to "Amount to Invest" page 104 where user 92 inputs the amount he/she wants to invest in that particular fund. For the deposit amount to invest, user 92 can transfer money from his/her bank account, brokerage account, credit card, or mailing a check.

The remaining process flow is similar to the process flow illustrated in FIG. 6. In the alternative embodiment, the name of the fund would be stored in data storage 66 with the associated fund transaction information. In this alternative embodiment, user 92 can create and maintain multiple customized funds and make modifications to each fund.

FIG. 37 illustrates an alternative embodiment which is a percentage allocation process that can be utilized in a budgeting or forecasting process. FIG. 37 shows the page where the percentage allocations are being created for various expense categories. The allocation process can consist of multiple items from a list. For example, user 92 can allocate specific percentages to various expense categories when user 92 is creating a budget or forecast. User 92 can select an expense account from a drop down menu of expense accounts and then allocate a percent of the total budget, or a budget or forecast amount excluding personnel costs to that specific expense account. The percentages can be modified during the process.

Although the present embodiment has been described herein in terms of a preferred embodiment and several illustrative alternatives, those of ordinary skill in the art will understand that numerous modifications and variations may be made with respect to the described embodiments without departing from the scope of the embodiment. The scope of the embodiment is limited only by the appended claims.

CONCLUSION, RAMIFICATIONS, AND SCOPE

Accordingly the reader will see that the various embodiments of the computer-based system and process can be used for small investors to create and manage a customizable investment fund of securities as well as to gain investing knowledge. To keep user's costs low, the system provides netting and aggregation of the trades. The securities traded by users include stocks, mutual funds, bonds, and options. Users will gain investing knowledge with discussion boards and investment education components that will give novice investors an education in investing strategies. The process and method of the various embodiments will help empower and educate individuals who currently are investors and those who want to be investors.

Furthermore, the computer-based system to create and manage the customizable fund has additional advantages in that:

1) it permits the benefit of asset diversification similar to a mutual fund, but without the expenses of a mutual fund;
2) it permits the investor to research securities, learn about investing, and create and maintain a tailored fund in one comprehensive place;
3) it permits the investor to manage the tax effects of securities purchases and sales based on when the investor wants to make the transactions, unlike a mutual fund;
4) it permits the investor to inexpensively acquire fractional and odd lots of shares of securities, unlike brokerages;
5) it permits the investor to choose the investments and how much money to allocate to those investments so that the fund is truly customized to the investor's needs, risk tolerance, and timeframe;
6) It permits the investor to be confident in investing through learning about investing basics, concepts, and strategies, as well as discussing investment topics with other investors.

Although the above description contains many specificities, these should not be construed as limitations on the scope of the embodiments, but as providing illustrations of one or several preferred embodiments thereof. Many other variations are possible. For example, the allocation process can be used to study and understand risk taking by individuals. The investor can allocate various percentages to investments or other risk/reward items to gauge the risk tolerance level. This can be studied by statisticians in experiments to see how various subjects react to risk and choices. Investment clubs can create investment funds together, make investment choices and utilize the Information Exchange message board to discuss their fund performance with other investors and groups.

The proposed system can be used for other commodities trading for large investors who can trade metals and commodities and for trading in foreign equities, derivatives, bonds, warrants, notes, limited partnership interests, private placement securities, futures, and other types of assets or liabilities.

A "Riskometer" can help the investors to compare their securities in their fund to the S & P 500 index to determine the risk of a security in the investment fund versus the S & P 500 index, or compare the risk of the whole customizable investment fund to the S & P 500 index.

While I have shown and described the preferred and additional embodiments in accordance with the present application, it should be clear to those skilled in the art that further embodiments may be made without departing from the scope of the present application. The specificities in the above description should not be construed as limitations on the scope of any embodiment, but as exemplifications of the presently preferred embodiments thereof. Accordingly, the scope should be determined by the appended claims and their legal equivalents, and not by the embodiments illustrated.

What is claimed is:

1. A computer implemented method to enable individuals to increase knowledge about investing as well as to trade one or more of a plurality of market tradable items including at least assets and liabilities for each one of the individuals to create at least one individualized, customizable investment fund according to each individual's goals and timeframes in a computer-based system comprising the steps of:
   (a) inputting data, including personal identification information, into a database in the computer-based system;
   (b) providing investment education tools for each one of the individuals in the computer-based system for enabling investments to be selected by the any one of the individuals for input in the customizable investment fund;
   (c) establishing by the any one of the individuals a money transfer strategy and receiving from at least one of the individuals an amount to invest in the computer-based system;
   (d) selecting by the any one of the individuals according to each individual's goals and timeframes at least one of the plurality of the market tradable items including at least assets and liabilities for inclusion in the customizable investment fund in the computer-based system;
   (e) developing by the any one of the individuals an individually tailored, unique weighting strategy according to each individual's goals and timeframes to determine a number of shares of each market tradable item including at least an asset and a liability of the plurality of market tradable items including at least assets and liabilities to be included in the customizable investment fund in the computer-based system;

(f) effecting an order to implement the customizable investment fund in the computer-based system utilizing at least the personal identification information;

(g) determining, based on the order to implement the customizable investment fund, trading orders for each of the plurality of market tradable items including at least assets and liabilities within the customizable investment fund to be traded in a market for each of the items including at least assets and liabilities in a plurality of future transactions in the computer-based system;

(h) implementing transactions in the computer-based system that modify the customizable investment fund;

(i) aggregating, where applicable, for each of the plurality of the trading orders for at least one of the individuals with another plurality of trading orders for at least another of the individuals, wherein said aggregating step includes the step of combining at least one trading order of each of the plurality of market tradable items including at least assets and liabilities with the shares of the other trading orders of each of the plurality of market tradable items including at least assets and liabilities which are identical to one another to create a single buy order and a single sell order of each of the identical market tradable items including at least assets and liabilities utilizing the computer-based system;

(j) netting, where applicable, the single buy and single sell orders for the plurality of the aggregated trading orders where there are single buy and single sell orders for all of the identical plurality of market tradable items including at least assets and liabilities utilizing the computer-based system; and (k) executing at least one or more trading orders of the plurality of the market tradable items including at least assets and liabilities based on, where applicable, said aggregating step and said netting step, to process at least one of the trading orders of the market tradable items including at least assets and liabilities utilizing the computer-based system to implement the customizable investment fund;

whereby the investment education tools as provided and the customizable investment fund as created by each of the individuals and based upon both the selected market tradable items including at least assets and liabilities and the weighting strategy, to determine the number of shares to be included in the customizable investment fund in the computer-based system.

2. The method of claim 1 further including the step of defining the market tradable item including at least an asset or liability wherein one or more assets or liabilities are selected from the following list: equity securities, exchange traded funds, mutual funds, debt securities, foreign securities, domestic securities, options, warrants, bonds, notes, limited partnership interests, private placement securities, commodities, futures, bank loan syndication interests, global warming rights, air pollution rights, water pollution rights, insurance claim interests, tradable assets, tradable liabilities, and combinations thereof.

3. The method of claim 1 wherein the trading orders in the computer-based system include single shares, fractional shares, odd lots of shares, and round lots of shares.

4. The method of claim 1 further including the step of defining the amount to invest to be greater than a predetermined value.

5. The method of claim 1, further including the step of maintaining in the computer-based system a money market fund in each customizable investment fund that can be used for payment of purchases made for the plurality of market tradable items including at least assets and liabilities in the customizable investment fund and further used as a depository of proceeds from sales of the plurality of market tradable items including at least assets and liabilities in the customizable investment fund.

6. The method of claim 1 wherein said money-transfer-strategy-establishing step includes the steps of:
effecting any one of an electronic funds transfer from a bank account, an electronic funds transfer from a brokerage account, a credit card funds transfer, or a commercial paper funds transfer utilizing the computer-based system;
requesting a request by at least one of the individuals a funds transfer from or to one of a plurality of the source of funds to or from, respectively, a monetary tracking system in the computer-based system; and
receiving, in response to the request, a transfer confirmation in the computer-based system.

7. The method of claim 1, wherein said weighting-strategy-developing step comprises the step of each one of the individuals allocating one of a plurality of percentages of an amount invested in the individually tailored, customizable investment fund to each selected market tradable item including at least an asset and a liability in the customizable investment fund, thereby determining a number of shares for each market tradable item including at least an asset and a liability selected for the customizable investment fund necessary for each one of the individuals to create the individually tailored, unique customizable investment fund utilizing the computer-based system.

8. The method of claim 1, wherein said step of developing by the any one of the individuals a individually tailored, unique weighting strategy includes the step of setting the sum of the percentage allocations of an amount invested in the customizable investment fund to be between a predetermined top value and a predetermined bottom value in the computer-based system.

9. The method of claim 1, wherein said aggregating step comprises the steps of:
aggregating the shares including single shares, odd lots of shares, or fractional shares of the plurality of market tradable items including at least assets and liabilities trading orders in the computer-based system; and
aggregating the shares at a selected number of times per day at selected predetermined times utilizing the computer-based system.

10. The method of claim 1, wherein said netting step comprises the steps of:
netting the single buy order and the single sell order of the plurality of market tradable items including at least assets and liabilities trading orders at selected times per day at selected predetermined times utilizing the computer-based system; and
transmitting using the computer-based system the single buy order or the single sell order to an electronic trading system for execution.

11. The method of claim 1, utilizing the computer-based system wherein said data-inputting step, said money-transfer-strategy-establishing step, said market-tradable-asset/liability-selecting step, and said weighting-strategy-developing step enables creation of the customizable investment fund by prompting the individual to select personal identification information, an amount to be invested, a strategy to transfer money for payment, a plurality of items including at least assets and liabilities, and the percentages of the total amount invested to be allocated to the selected items including at least assets and liabilities to create the customizable investment fund.

12. The method of claim 1, wherein said step of effecting the order to implement the customizable investment fund as a whole is based on a single instruction via a computer user interface utilizing the computer-based system.

13. The method of claim 1, further including the steps of:
receiving actual trading price information in the computer-based system from a third party trading system regarding the trading order execution for at least one of the items including at least assets and liabilities; and
transmitting the actual trading price information regarding each asset or liability traded for the customizable investment fund utilizing the computer-based system.

14. The method of claim 1, further including the steps of:
recording and tracking utilizing the computer-based system all trading order and transaction information including tax basis and dates of all trading orders and transactions occurring in the customizable investment fund for at least one of the individuals in the plurality of individuals; and
enabling at least one of the individuals in the plurality of individuals to view and monitor the transaction history of the customizable investment fund utilizing the computer-based system.

15. The method of claim 1 wherein said investment-education-tools-providing step includes the steps of:
utilizing an on-line message board system in the computer-based system associated with the plurality of the individuals who own customizable investment funds;
posting by the individuals, messages relating to investment topics including investment strategies and specific investments;
searching and retrieving selected messages posted on said on-line message board;
querying to locate selected messages of interest; and
viewing a list of a plurality of the messages associated with the query.

16. The method of claim 1 wherein said investment-education-tools-providing step includes the step of utilizing investment education components and tools in the computer-based system to provide information on investing basics, advantages of investing, concepts including diversification and risk versus return, a glossary of investment terms and definitions, and examples of investing techniques.

17. The method of claim 1, wherein said investment-education-tools-providing step includes the step of utilizing graphs in the computer-based system which represent the relative proportions of the items including at least assets and liabilities in the customizable investment fund after the investment fund has been created, where the graphs include depiction of the items including at least assets and liabilities by type or by company size classification for enabling viewing of the relative sizes and proportions of the asset and liability classes to each other in the customizable investment fund.

18. The method of claim 1 wherein said investment-education-tools-providing step includes the step of providing a process utilizing the computer-based system for enabling the accessing of information pertaining to a plurality of market tradable items including at least assets and liabilities and for enabling the viewing of information that will enable evaluation of the financial strength and health of an investment and assist in making a decision to trade one or more of a plurality of market tradable items including at least assets and liabilities.

19. The method of claim 18 wherein said information-enabling-process step used to evaluate a plurality of market tradable items including at least assets and liabilities includes the step of using current year and prior year metrics comprising revenue, gross margin, net margin, return on equity, return on assets, dividend yield, and trend graphs of stock prices.

20. The method of claim 1 wherein said investment-education-tools-providing step includes the step of providing a symbol lookup query process utilizing the computer-based system that enables insertion into a computer interface of one or a plurality of alphanumeric characters representing the beginning of the name of an asset or liability, wherein the results of a query in the query process includes the full name of the asset or liability containing the alphanumeric characters in the order of the alphanumeric characters as entered into the computer interface.

21. The method of claim 1, wherein each investment in the customizable investment fund includes a current value, a basis value, an investment fund total, and a purchase amount, further including the step of establishing a process including the steps of:
accessing a computer interface utilizing the computer-based system to calculate monetary and percentage changes of the current value versus the basis value of each investment in the customizable investment fund as well as the investment fund total; and
equalizing the basis value of each investment to the purchase amount of each investment in the customizable investment fund plus the value of any reinvested dividends plus any additional purchases of the identical investment in the customizable investment fund less any sales of the identical investment in the customizable investment fund, and the basis value of the investment fund total also accounts for monetary additions or subtractions in the customizable investment fund.

22. The method of claim 5, further including the steps of:
modifying the customizable investment fund with additional items including at least assets and liabilities purchases or sales utilizing the computer-based system; and
changing the monetary amount of the money market fund utilizing the computer-based system in the customizable investment fund through said money-transfer-strategy-establishing step.

23. The method of claim 1, wherein said step of determining the trading orders includes the step of providing a trading order of at least one of the market tradable items including at least assets and liabilities as implemented in a periodic monetary contribution to the customizable investment fund utilizing the computer-based system.

24. The method of claim 23, further including the step of utilizing the computer-based system to calculate a number of shares of market tradable items including at least assets and liabilities to be purchased by dividing the periodic monetary contribution by a current purchase price of a whole share of at least one of the market tradable items including at least assets and liabilities.

25. The method of claim 1, further including the step of each one of the individuals creating a plurality of unique customizable investment funds in the computer-based system in which each unique customizable investment fund encompasses different monetary investment amounts, market tradable asset or liability selections, and percentage allocations according to each one of the individual's goals and timeframes.

26. The method of claim 1, further including the steps of:
establishing a process utilizing the computer-based system that creates a version of the software program; and
downloading an updated version of the software program utilizing the computer-based system to devices including smart phone applications or personal computers.

27. The method of claim 1, further including the step of selecting an agent such as a money-manager or a financial planner to act on behalf of any one of the individuals to perform utilizing the computer-based system said steps of inputting personal identification information into the personal-identification database, of establishing the money transfer strategy, of selecting the items including at least assets and liabilities, of developing the weighting strategy, and of effecting trade orders to create a customizable investment fund.

28. A computer implemented method in a computer-based system to enable one or more individuals to make a minimum of one trade in an existing customizable investment fund of a plurality of market tradable items including at least assets and liabilities directly owned by the one or more individuals comprising the steps of:
(a) receiving a trading order for a the at least one of the market tradable items including at least assets and liabilities in the computer-based system;
(b) effecting the trading order utilizing the computer-based system for the at least one of the market tradable items including at least assets and liabilities to be transacted in a market therefore;
(c) aggregating, when there is more than one individual, for additional trading orders for identical ones of the at least market tradable items, wherein said aggregating step includes the step of combining the trading orders to create a single buy order and a single sell order of each of the identical market tradable items including at least assets and liabilities utilizing the computer-based system;
(d) netting, when there is more than one individual, the single buy and single sell orders for the plurality of the aggregated trading orders where there are single buy and sell orders for all of the identical market tradable items including at least assets and liabilities in the plurality of market tradable items including at least assets and liabilities utilizing the computer-based system; and
(e) executing the trading orders of the plurality of the market tradable items including at least assets and liabilities based on, said aggregating step and said netting step, to implement at least one of the trading orders for the market tradable items including at least assets and liabilities to be included in the customizable investment fund utilizing the computer-based system.

29. The method of claim 28, wherein said step of effecting at least one trading order in the computer-based system in the customizable investment fund results in an additional investment in a market tradable item including at least an asset and a liability that is owned directly by any one of the individuals.

30. The method of claim 28, wherein said step of effecting at least one trading order in the computer-based system in the customizable investment fund results in the sale of a market tradable item including at least an asset and a liability and the proceeds from the sale would reside in the customizable investment fund that is owned directly by any one of the individuals.

31. A computer implemented method to enable individuals to inexpensively trade a plurality of market tradable items including at least assets and liabilities for each one of the individuals to create at least one individualized, customizable investment fund according to each individual's goals and timeframes in a computer-based system comprising the steps of:
(a) inputting data, including personal identification information, into a database in the computer-based system;
(b) establishing by the any one of the individuals a money transfer strategy and receiving from at least one of the individuals an amount to invest in the computer-based system;
(c) selecting by the any one of the individuals according to each individual's goals and timeframes at least one of the plurality of the market tradable items including at least assets and liabilities for inclusion in the customizable investment fund in the computer-based system;
(d) developing by the any one of the individuals an individually tailored, unique weighting strategy according to each individual's goals and timeframes to determine a number of shares of each market tradable item including at least an asset or a liability of the plurality of market tradable items including at least assets and liabilities to be included in the customizable investment fund in the computer-based system;
(e) effecting an order to implement the customizable investment fund in the computer-based system utilizing at least the personal identification information;
(f) determining, based on the order to implement the customizable investment fund, trading orders for each of the plurality of market tradable items including at least assets and liabilities to be traded in a market for each of the items including at least assets and liabilities in a plurality of future transactions in the computer-based system;
(g) implementing transactions in the computer-based system that modify the customizable investment fund;
(h) aggregating, where applicable, for each of the plurality of the trading orders for at least one of the individuals with another plurality of trading orders for at least another of the individuals, wherein said aggregating step includes the step of combining at least one trading order including single shares, odd lots, or fractional shares of each of the plurality of market tradable items including at least assets and liabilities with the shares of the other trading orders of each of the plurality of market tradable items including at least assets and liabilities which are identical to one another to create a single buy order and a single sell order of each of the identical market tradable items including at least assets and liabilities utilizing the computer-based system;
(i) netting, where applicable, the single buy and single sell orders for the plurality of the aggregated trading orders where there are single buy and single sell orders for all of the identical plurality of market tradable items including at least assets and liabilities utilizing the computer-based system; and
(j) executing at least one or more trading orders of the plurality of the market tradable items including at least assets and liabilities based on, where applicable, said aggregating step and said netting step, to process at least one of the trading orders of the market tradable items including at least assets and liabilities utilizing the computer-based system to implement the customizable investment fund;
whereby the customizable investment fund as created by each individual and based upon the selected market tradable items including at least assets and liabilities and the weighting strategy to determine the number of shares to be included in the customizable investment fund in the computer-based system.

32. The method of claim 31 further comprising the step of defining the market tradable item including at least an asset or liability wherein one or more assets or liabilities are selected from the following list: equity securities, exchange traded funds, mutual funds, debt securities, foreign securities, domestic securities, options, warrants, bonds, notes, limited partnership interests, private placement securities, commodities, futures, bank loan syndication interests, global warming rights, air pollution rights, water pollution rights, insurance claim interests, tradable assets, tradable liabilities, and combinations thereof.

33. The method of claim 31 further including the step of defining the amount to invest to be greater than a predetermined value in the computer-based system.

34. The method of claim 31, wherein said money-transfer-strategy-establishing step includes the steps of:
effecting any one of an electronic funds transfer from a bank account, an electronic funds transfer from a brokerage account, a credit card funds transfer, or a commercial paper funds transfer in the computer-based system;
requesting a request by at least one of the individuals a funds transfer from or to one of a plurality of the source of funds to or from, respectively, a monetary tracking system in the computer-based system; and
receiving, in response to the request, a transfer confirmation in the computer-based system.

35. The method of claim 31, further including the step of maintaining in the computer-based system a money market fund in each customizable investment fund that can be used for payment of purchases made for the plurality of market tradable items including at least assets and liabilities in the customizable investment fund and further used as a depository of proceeds from sales of the plurality of market tradable items including at least assets and liabilities in the customizable investment fund.

36. The method of claim 31, wherein said weighting-strategy-developing step comprises the step of each one of the individuals allocating one of a plurality of percentages of an amount invested in the customizable investment fund to each selected market tradable item including at least an asset and a liability in the customizable investment fund, thereby determining a number of shares for each market tradable item including at least an asset and a liability selected for the customizable investment fund necessary for each of the individuals to create the individually tailored, unique customizable investment fund utilizing the computer-based system.

37. The method of claim 31, wherein said aggregating step comprises the steps of:
aggregating the shares including single shares, odd lots of shares, or fractional shares of the plurality of market tradable items including at least assets and liabilities trading orders in the computer-based system; and
aggregating the shares at a selected number of times per day at selected predetermined times utilizing the computer-based system.

38. The method of claim 31, wherein said step of effecting the order to implement the customizable investment fund as a whole is based on a single instruction via a computer user interface utilizing the computer-based system.

39. The method of claim 31 further including the steps of;
recording and tracking utilizing the computer-based system all trading order and transaction information including tax basis and dates of all trading orders and transactions occurring in the customizable investment fund for at least one of the individuals in the plurality of individuals; and
enabling at least one of the individuals in the plurality of individuals to exclusively view and monitor the transaction history of the customizable investment fund to the exclusion of any other of the individuals in the plurality of individuals utilizing the computer-based system.

40. The method of claim 35, further including the steps of:
modifying the customizable investment fund with additional items including at least assets and liabilities purchases or sales utilizing the computer-based system; and
changing the monetary amount of the money market fund utilizing the computer-based system in the customizable investment fund through said money-transfer-strategy step.

41. A system for enabling one or more of a plurality of individuals to increase knowledge about investing, as well as for each one of the individuals to create, manage and trade a plurality of market tradable items including at least assets and liabilities as a single customizable investment fund according to each individual's goals and timeframes directly owned by at least one of the plurality of individuals where the trades include one or more odd lots, fractional shares, or one or more small amounts of shares of one or more market tradable items including at least assets and liabilities, said system comprising:
(a) a server processor for
  (i) communicating with a plurality of individual personal computing devices via a plurality of communication links,
  (ii) receiving personal identification information,
  (iii) communicating a plurality of investment education tools with a plurality of individual personal computing devices,
  (iv) receiving individual trading data based on individual investment selections and individual assigned, individually tailored, unique weighting strategies to determine the number of shares for each investment traded from each of the plurality of individual personal computing devices, wherein the trading data includes one or more trading orders for the single customizable investment fund of market tradable items including at least assets and liabilities in which the trading order includes at least one of one or more fractional shares, one or more odd lots, or one or more small amounts of shares of one or more market tradable items including at least assets and liabilities,
  (v) executing trading of the market tradable items including at least assets and liabilities in each single customizable investment fund to create the single customizable investment fund, or to modify the single customizable investment fund of each of the plurality of individuals, wherein each of the single customizable investment funds is owned directly by each of the plurality of individuals after the trading,
  (vi) connecting a central computer to a third party trading computer system to implement purchase of the investments,
  (vii) aggregating, where applicable, buy orders and sell orders including one or more fractional shares, one or more odd lots, or one or more small amounts of shares of one or more market tradable items including at least assets and liabilities from each one of the plurality of individuals into one or more buy orders and one or more sell orders for each identical market tradable asset or liability of the plurality of market tradable items including at least assets and liabilities represented in the trading data received from the plurality of individuals' personal computing devices, (viii) netting, where applicable, buy orders and sell orders of the aggregated buy orders and sell orders of the market tradable items including at least assets and liabilities;

(b) a first data storage device coupled to said server processor for storing the plurality of trading orders and individuals' personal identification information from each of the plurality of individuals' personal computing devices, and for storing a plurality of messages resulting from discussions among the individuals relating to investing strategies and investment education tools; and (c) a second data storage device coupled to said server processor for storing information of the plurality of distinct market tradable items including at least assets and liabilities.

42. The system of claim 41, further including an authenticating device coupled to said server processor for authenticating the personal identification information as received therein, as authorized by the individuals by comparing at least one of the individuals' personal identification information with a plurality of at least one of the individuals' personal identification information as stored in said first storage device.

43. The system of claim 41, further including a database located in said second storage device for storing information of the plurality of the items including at least assets and liabilities, from which each one of the individuals can create or modify the individually tailored, unique customizable investment fund.

44. The system of claim 41 further including a query device coupled to said first storage device to receive and store data relating to the investment education tools and the investing strategies messages, in which at least some of the investment-education-tools-and-investing-strategies-message data are coded for classification thereof, wherein the query device includes a classification scheme and other identifying parameters for the investment-education-tools-and-strategies-message data.

* * * * *